(12) United States Patent
Agemizu et al.

(10) Patent No.: US 12,204,100 B2
(45) Date of Patent: Jan. 21, 2025

(54) OPTICAL SYSTEM FOR A DISPLAY SYSTEM PROJECTING A VIRTUAL IMAGE ONTO A TARGET SPACE

(71) Applicant: Panasonic Intellectual Property Management Co., Ltd., Osaka (JP)

(72) Inventors: Wahei Agemizu, Osaka (JP); Kazumasa Takata, Osaka (JP); Masaru Fujita, Osaka (JP); Tomohisa Sakaguchi, Kyoto (JP); Hiroki Hara, Osaka (JP); Masaki Amie, Shizuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/375,665

(22) Filed: Oct. 2, 2023

(65) Prior Publication Data
US 2024/0027759 A1    Jan. 25, 2024

Related U.S. Application Data

(63) Continuation of application No. 17/509,484, filed on Oct. 25, 2021, now Pat. No. 11,835,719, which is a
(Continued)

(30) Foreign Application Priority Data

Apr. 26, 2019  (JP) .................................. 2019-086747
Aug. 8, 2019   (JP) .................................. 2019-146730
(Continued)

(51) Int. Cl.
*G02B 27/01*  (2006.01)
*B60K 35/00*  (2006.01)
(Continued)

(52) U.S. Cl.
CPC .......... *G02B 27/0101* (2013.01); *B60K 35/00* (2013.01); *G02B 6/003* (2013.01);
(Continued)

(58) Field of Classification Search
CPC .. G02B 6/0036; G02B 6/0035; G02B 6/0033; G02B 6/003; G02B 6/0023; G02B 6/0013; F21V 2200/20
See application file for complete search history.

(56) References Cited

U.S. PATENT DOCUMENTS 3,241,256 A    3/1966   Viret
3,958,113 A    5/1976   Termohlen
(Continued)

FOREIGN PATENT DOCUMENTS

CN    103375732    10/2013
CN    103542332    1/2014
(Continued)

OTHER PUBLICATIONS

Reconsideration Report by Examiner before Appeal issued Sep. 25, 2023 in Japanese Patent Application No. 2019-086747, with English translation.
(Continued)

*Primary Examiner* — Ismael Negron
(74) *Attorney, Agent, or Firm* — Wenderoth, Lind & Ponack, L.L.P.

(57) ABSTRACT

An optical system includes a light guide member having an incident surface, a first surface and a light emergent surface; and at least one prism provided on the first surface and configured to reflect light received by the incident surface and travelling inside the light guide member, towards the light emergent surface. The light guide member provides an optical path along which the light that has entered through the incident surface is directly reflected from the prism and
(Continued)

allowed to emerge from the light emergent surface. The light guide member also provides another optical path along which the light that has entered through the incident surface is once reflected from the second surface, reflected again from the prism, and then allowed to emerge from the light emergent surface. The optical system is configured to be coupled to a light source, to illuminate a display system which projects a virtual image onto a target space.

22 Claims, 31 Drawing Sheets

Related U.S. Application Data continuation of application No. PCT/JP2020/017389, filed on Apr. 22, 2020.

(30) Foreign Application Priority Data

| Aug. 8, 2019 | (JP) | 2019-146731 |
| Aug. 8, 2019 | (JP) | 2019-146732 |
| Aug. 8, 2019 | (JP) | 2019-146733 |

(51) Int. Cl.
  *F21V 8/00* (2006.01)
  *B60K 35/23* (2024.01)

(52) U.S. Cl.
  CPC ............ *G02B 6/0036* (2013.01); *B60K 35/23* (2024.01); *B60K 2360/23* (2024.01); *B60K 2360/336* (2024.01); *G02B 2027/0118* (2013.01)

(56) References Cited

U.S. PATENT DOCUMENTS

| 4,737,896 | A | * | 4/1988 | Mochizuki | ........... G02B 6/0068 |
|           |   |   |        |           | 362/335 |
| 5,303,322 | A |   | 4/1994 | Winston | |
| 5,390,436 | A |   | 2/1995 | Ashall | |
| 5,584,556 | A |   | 12/1996 | Yokoyama | |
| 6,167,182 | A |   | 12/2000 | Shinohara | |
| 6,671,013 | B1 |  | 12/2003 | Ohkawa | |
| 6,712,481 | B2 |  | 3/2004 | Parker | |
| 6,805,456 | B2 | * | 10/2004 | Okuwaki | ............. G02B 6/0036 |
|           |    |   |         |         | 362/558 |
| 8,248,560 | B2 | * | 8/2012 | Kim | .......... F21V 7/04 |
|           |    |   |        |     | 349/56 |
| 10,775,544 | B2 |  | 9/2020 | Osumi | |
| 10,859,754 | B2 |  | 12/2020 | Sugiyama | |
| 2009/0190070 | A1 | | 7/2009 | Nagata et al. | |
| 2016/0273731 | A1 | | 9/2016 | Schiccheri et al. | |
| 2017/0160458 | A1 | | 6/2017 | Asakawa et al. | |
| 2018/0045970 | A1 | | 2/2018 | Shinohara | |
| 2019/0113672 | A1 | | 4/2019 | Sugiyama et al. | |

FOREIGN PATENT DOCUMENTS

| EP | 0 495 273 | 7/1992 |
| JP | 62-278505 | 12/1987 |
| JP | 1-209479 | 8/1989 |
| JP | 10-253833 | 9/1998 |
| JP | 10-326515 | 12/1998 |
| JP | 11-224518 | 8/1999 |
| JP | 2002-289023 | 10/2002 |
| JP | 2003-297127 | 10/2003 |
| JP | 2004-171966 | 6/2004 |
| JP | 2004-259688 | 9/2004 |
| JP | 2005-243259 | 9/2005 |
| JP | 2006-235288 | 9/2006 |
| JP | 2014-182939 | 9/2014 |
| JP | 2016-100087 | 5/2016 |
| JP | 2017-106961 | 6/2017 |
| JP | 2017-142491 | 8/2017 |
| JP | 2017-188298 | 10/2017 |
| JP | 2019-3081 | 1/2019 |
| WO | 2008/013146 | 1/2008 |
| WO | 2017/154993 | 9/2017 |

OTHER PUBLICATIONS

Notice of Reasons for Refusal issued Oct. 17, 2023 in Japanese Patent Application No. 2023-052583, with English translation.
International Search Report issued Jun. 9, 2020 in corresponding International Application No. PCT/JP2020/017389.
Office Action issued May 9, 2023 in corresponding Japanese Patent Application No. 2019-146730, with English language translation.
Office Action issued May 30, 2023 in corresponding Japanese Patent Application No. 2019-086747, with English-language translation.
Office Action issued Sep. 27, 2022 in corresponding Japanese Patent Application No. 2019-086747, with English language translation.
Office Action issued Jan. 24, 2023 in corresponding Japanese Patent Application No. 2019-086747, with English language translation.
Office Action issued Feb. 28, 2023 in corresponding Japanese Patent Application No. 2019-146732, with English language translation.
Office Action issued May 28, 2024 in corresponding Japanese Patent Application No. 2023-184216, with English translation.
Office Action issued May 28, 2024 in corresponding Japanese Patent Application No. 2023-184217, with English translation.

\* cited by examiner

FIG. 21A, FIG. 21B, FIG. 21C

OPTICAL SYSTEM FOR A DISPLAY SYSTEM PROJECTING A VIRTUAL IMAGE ONTO A TARGET SPACE

CROSS-REFERENCE TO RELATED APPLICATIONS

The present application is a continuation of U.S. application Ser. No. 17/509,484, filed Oct. 25, 2021, which is a Bypass Continuation of International Application No. PCT/JP2020/017389 filed on Apr. 22, 2020, which is based upon, and claims the benefit of priority to, Japanese Patent Application No. 2019-086747 filed on Apr. 26, 2019, Japanese Patent Application No. 2019-146730 filed on Aug. 8, 2019, Japanese Patent Application No. 2019-146731 filed on Aug. 8, 2019, Japanese Patent Application No. 2019-146732 filed on Aug. 8, 2019, and Japanese Patent Application No. 2019-146733 filed on Aug. 8, 2019. The entire contents of both applications are incorporated herein by reference.

TECHNICAL FIELD

The present disclosure generally relates to an optical system, an illumination system, a display system, and a moving vehicle. More particularly, the present disclosure relates to an optical system configured to control light which has been incident through an incident surface to make the light emerge from an emergent surface, an illumination system, a display system, and a moving vehicle.

BACKGROUND ART

JP 2017-142491 A discloses an image display device (display system) for projecting a virtual image onto a target space. This image display device is a head-up display (HUD) device for automobiles. Projected light, emerging as image light from the HUD device (optical system) provided in a dashboard of an automobile, is reflected from the windshield thereof toward a driver who is a viewer. This allows the user (driver) to view an image such as a navigation image as a virtual image as if the virtual image is superimposed on a view of the background such as a road surface.

SUMMARY

The present disclosure provides an optical system, an illumination system, a display system, and a moving vehicle, all of which are configured to contribute to increasing the light extraction efficiency.

An optical system according to an aspect of the present disclosure includes a light guide member and a prism. The light guide member has: an incident surface on which light is incident; and a first surface and a second surface facing each other. The second surface is a light emergent surface. The prism is provided for the first surface and reflects, toward the second surface, the light passing inside the light guide member. The light guide member includes a direct optical path, along which the light that has entered the light guide member through the incident surface is directly reflected from the prism and allowed to emerge from the second surface.

An illumination system according to another aspect of the present disclosure includes the optical system described above and a light source. The light source emits light toward the incident surface through the light control member.

A display system according to still another aspect of the present disclosure includes the illumination system described above and a display. The display receives the light emerging from the illumination system and displays an image thereon.

A moving vehicle according to yet another aspect of the present disclosure includes the display system described above and a moving vehicle body to be equipped with the display system.

BRIEF DESCRIPTION OF DRAWINGS

The figures depict one or more implementations in accordance with the present teaching, by way of example only, not by way of limitations. In the figures, like reference numerals refer to the same or similar elements.

FIG. 21A schematically illustrates light rays passing inside the light control member;

FIG. 21B schematically illustrates light rays passing inside a light control member according to a comparative example;

FIG. 21C schematically illustrates light rays passing inside a light control member according to another comparative example;

DETAILED DESCRIPTION

First Embodiment (1) Overview

Figure 1A:
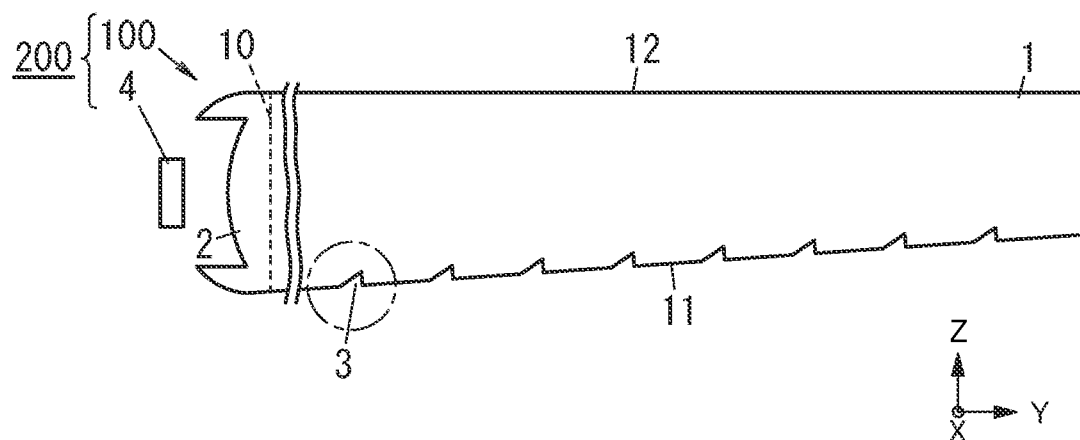
FIGS. 1A and 1B are cross-sectional views indicating an outline of an optical system according to a first embodiment of the present disclosure.
Figure 1B:
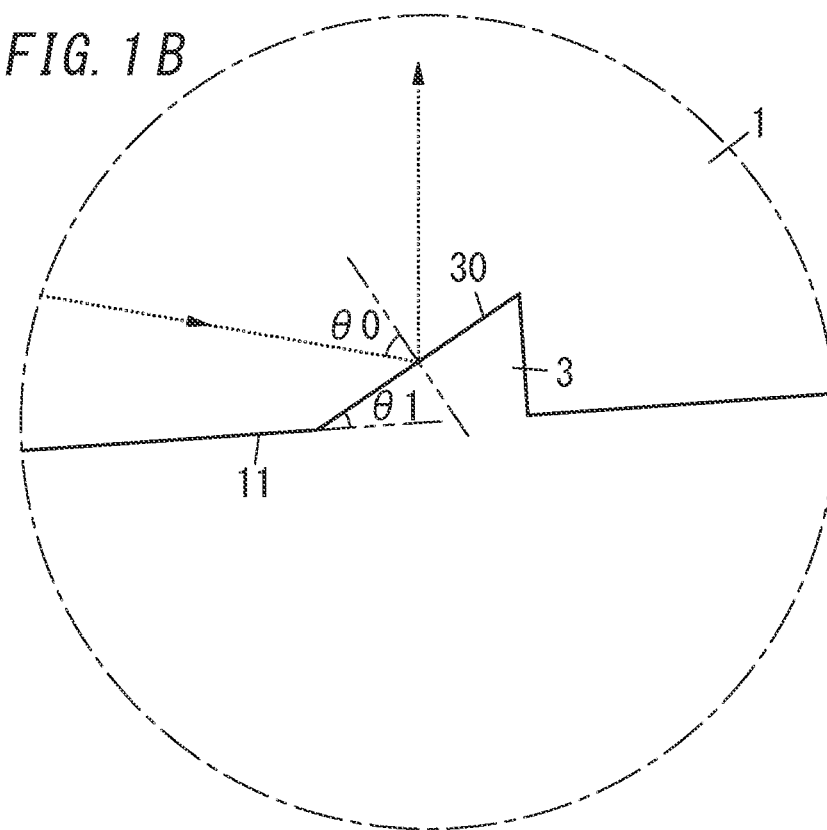

An optical system 100 (see FIGS. 1A and 1B) according to an exemplary embodiment has the capability of controlling light incident through an incident surface 10 and allowing the light to emerge from an emergent surface (second surface 12). The optical system 100 includes a light guide member 1, a light control member 2, and a prism 3 as shown in FIG. 1. The optical system 100 forms, along with a light source 4, an illumination system 200. In other words, the illumination system 200 includes the optical system 100 and the light source 4. The light source 4 emits light toward the incident surface 10 through the light control member 2.

The light guide member 1 has the incident surface 10 on which the light is incident and a first surface 11 and the second surface 12 facing each other. The second surface 12 is a light emergent surface. The light guide member 1 is a so-called "light guide plate." In this embodiment, the light guide member 1 has the shape of a flat plate and the two surfaces thereof facing each other along the thickness of the light guide member 1 are the first surface 11 and the second surface 12. Also, one of the four side surfaces of the light guide member 1 is the incident surface 10. That is to say, the light guide member 1 is configured such that when light is incident through a side surface serving as the incident surface 10, the second surface 12 serving as the emergent surface provides surface-emitting light.

The light control member 2 condenses the light traveling toward the incident surface 10 and directs the condensed light toward the incident surface 10. In this embodiment, the light emitted from the light source 4 is incident on the incident surface 10 of the light guide member 1 through the light control member 2. Then, the light that has entered the light control member 2 is controlled to have its divergence angle narrowed and be directed toward the incident surface 10. In this embodiment, the light control member 2 controls the divergence angle of the light that has entered the light control member 2 such that the optical path of the light directed toward the incident surface 10 becomes as close as possible to an optical path parallel to the second surface 12.

The prism 3 is provided for the first surface 11 and reflects, toward the second surface 12, the light passing inside the light guide member 1. In this embodiment, a plurality of prisms 3 are provided for the first surface 11. Each of the prisms 3 is configured to totally reflect the light incident thereon. Naturally, the prism 3 does not have to be configured to totally reflect the incident light entirely. Alternatively, in another implementation, part of the incident light is not totally reflected but may pass through the inside of the prism 3.

In the light guide member 1, most of the light that has entered the light guide member 1 through the incident surface 10 is reflected from the prisms 3, without being reflected from the rest of the first surface 11 or the second surface 12 other than the prisms 3, before emerging from the second surface 12. That is to say, the light guide member 1 includes a direct optical path L1, along which the light that has entered the light guide member 1 through the incident surface 10 is directly reflected from the prisms 3 and allowed to emerge from the second surface 12 (see FIG. 3B).

As can be seen, according to this embodiment, the light, which has had its divergence angle controlled through the light control member 2, is directly reflected from the prisms 3 provided for the first surface 11 of the light guide member 1 and then allowed to emerge from the second surface 12. Thus, this embodiment achieves the advantage of contributing to increasing the light extraction efficiency, compared to an implementation in which the incident light is repeatedly totally reflected from the first surface 11 and the second surface 12 of the light guide member 1 before emerging from the second surface 12. As used herein, the "extraction efficiency" refers to the proportion of the quantity of the light emerging from the second surface 12 (emergent surface) of the light guide member 1 with respect to the quantity of the light incident on the incident surface 10 of the light guide member 1.

(2) Details

An optical system 100 according to this embodiment and a display system 300 that uses the optical system 100 will be described.

(2.1) Display System

First, the display system 300 will be described. The display system 300 may be used in, for example, a head-up display to be installed in an automobile (moving vehicle) B1 to present, within the user's U1 sight, various types of driver assistance information including velocity information, condition information, and driving-related information about the automobile B1. Examples of the driving-related information about the automobile B1 include navigation-related information presenting proposed traveling routes and adaptive cruise control (ACC) related information for use to keep the traveling velocity and the distance between the vehicles constant.

Figure 4:
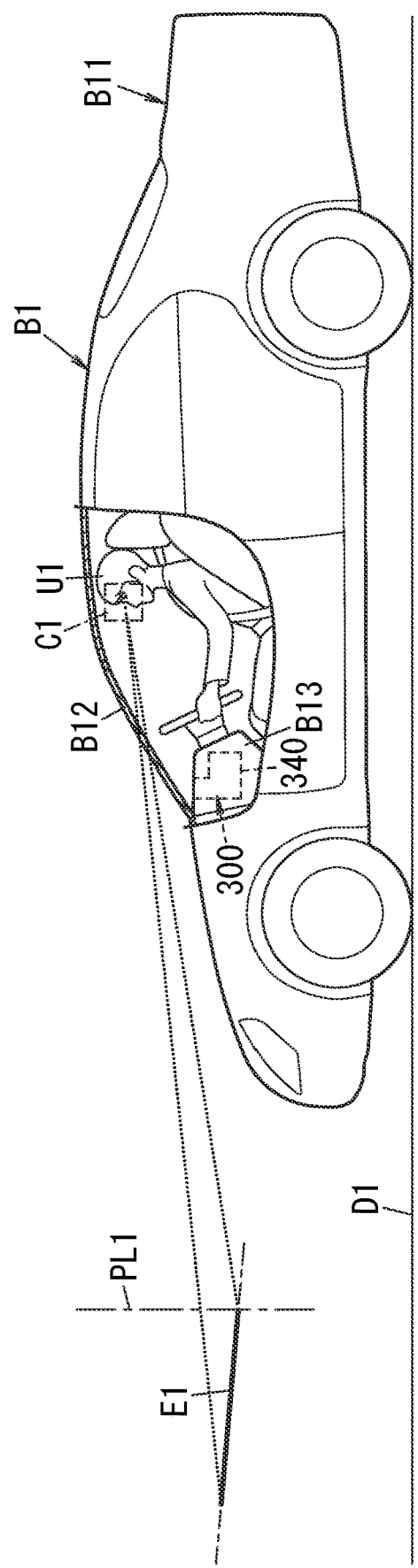
FIG. 4 illustrates a moving vehicle including a display system that uses the optical system.
Figure 5:
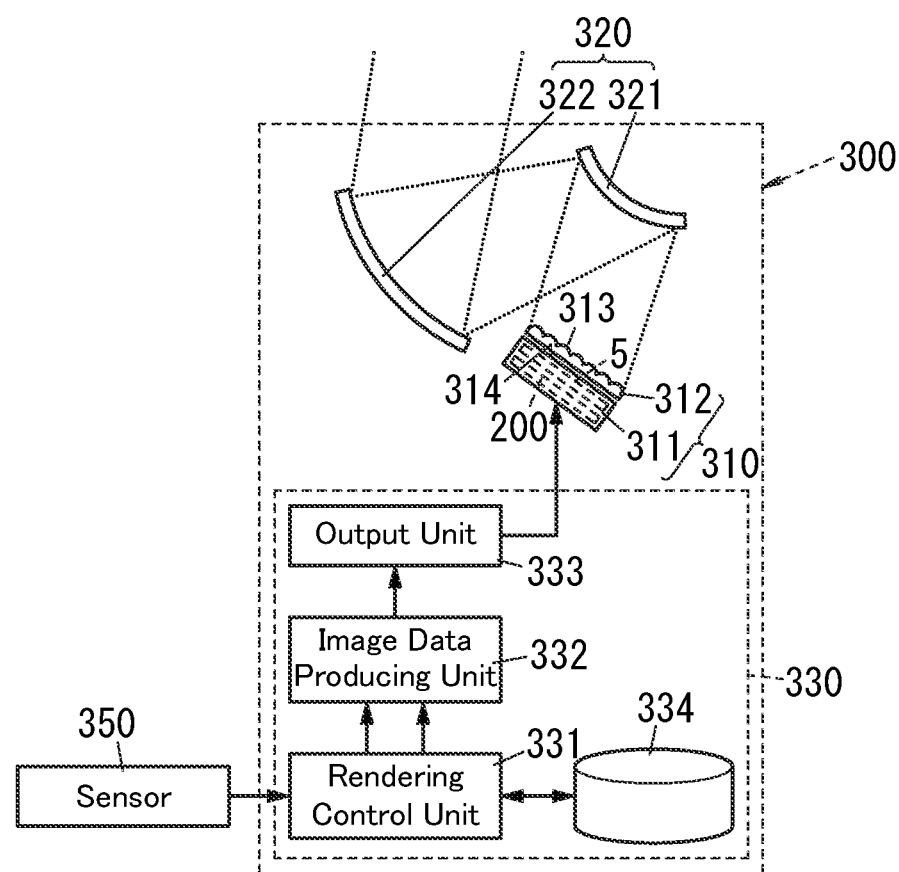
FIG. 5 illustrates the display system.

As shown in FIGS. 4 and 5, the display system 300 includes an image display unit 310, an optical system 320, and a control unit 330. The display system 300 further includes a housing 340 for housing the image display unit 310, the optical system 320, and the control unit 330 therein.

The display system 300 is installed in the moving vehicle body B11 of the automobile B1 as an exemplary moving vehicle. That is to say, the moving vehicle (automobile) B1 includes the display system 300 and the moving vehicle body B11 in which the display system 300 is installed.

The housing 340 may be a molded product of a synthetic resin, for example. In the housing 340, housed are the image display unit 310, the optical system 320, the control unit 330, and other members. The housing 340 is installed in a dashboard B13 of the moving vehicle body B11. The light beam reflected from a second mirror 322 (to be described later) of the optical system 320 passes through an opening provided through the upper surface of the housing 340 to emerge toward a reflective member (windshield B12). Then, the light beam is reflected from the windshield B12 and condensed into an eye box C1. The reflective member may be implemented as, for example, a combiner provided for the moving vehicle body B11.

The image display unit 310 includes a display device 311 and a lens array 312 arranged on a display screen 313 of the display device 311. The image display unit 310 has the capability of displaying a stereoscopic image by the light field method, according to which an object in an image captured is made to look stereoscopic by reproducing light beams emerging from the object in a plurality of directions.

The display device 311 is housed in the housing 340 such that the display screen 314 faces a first mirror 321 (to be described later). The display screen 314 of the display device 311 has a shape (e.g., a rectangular shape) corresponding to the range of the image to be projected toward the user U1 (i.e., the shape of the windshield B12). On the display screen 314 of the display device 311, a plurality of pixels are arranged to form an array. The plurality of pixels of the display device 311 emits light beams under the control of the control unit 330. As a result, an image to be displayed on the display screen 314 is formed by the light beams emerging from the display screen 314 of the display device 311. The display device 311 may be implemented as an illumination system 200 including a display 5 and an optical system 100. The display 5 may be implemented as, for example, a liquid crystal display or an organic electroluminescent (OEL) display, for example, and displays an image thereon on receiving the light emerging from the illumination system 200. That is to say, it can be said that the display system 300 includes the illumination system 200 and the display 5.

On the display screen 314 of the display device 311, arranged is the lens array 312. In this case, the surface of the lens array 312 constitutes the display screen 313 of the image display unit 310. The lens array 312 includes a plurality of lenses which are arranged to form an array.

The image displayed on the display screen 314 of the display device 311 is viewed by the user U1 who has a viewpoint inside the eye box C1 through the lens array 312 and the optical system 320. This allows the user U1 to view a virtual image E1 superimposed along the traveling surface D1 of the automobile B1 and a virtual image rendered stereoscopically along a plane PL1 perpendicular to the traveling surface D1.

Note that the light field method is not the only method allowing the image display unit 310 to display the virtual image of the stereoscopic rendering target stereoscopically. Alternatively, the image display unit 310 may also adopt a parallax method, which allows the user U1 to view a virtual image of the stereoscopic rendering target by projecting a pair of images with a parallax onto the user's U1 right and left eyes, respectively.

The optical system 320 condenses the light emerging from the display screen 313 of the image display unit 310 into the eye box C1. In this embodiment, the optical system 320 includes: the first mirror 321, which may be a convex mirror, for example; the second mirror 322, which may be a concave mirror; and the windshield B12.

The first mirror 321 reflects the light emerging from the image display unit 310 to make the light incident on the second mirror 322. The second mirror 322 reflects the light, which has been incident thereon from the first mirror 321, toward the windshield B12. The windshield B12 reflects the light, which has been incident thereon from the second mirror 322, to make the light incident into the eye box C1.

The control unit 330 includes a computer system, for example. The computer system may include one or more processors and one or more memories as principal hardware components. The functions of the control unit 330 (e.g., the functions of the rendering control unit 331, the image data producing unit 332, and the output unit 333) may be performed by making the one or more processors execute a program stored in the one or more memories or the storage unit 334 of the computer system. The program may be stored in advance in the one or more memories or the storage unit 334 of the computer system. Alternatively, the program may also be downloaded through a telecommunications line or be distributed after having been recorded in some non-transitory storage medium such as a memory card, an optical disc, or a hard disk drive, any of which is readable for the computer system.

The storage unit 334 may be implemented as, for example, a non-transitory storage medium such as a programmable nonvolatile semiconductor memory. The storage unit 334 stores a program to be executed by the control unit 330 and other data. In addition, the display system 300 according to this embodiment is used to present, within the user's U1 sight, driver assistance information including velocity information, condition information, and driving information about the automobile B1 as described above. Thus, the type of the virtual images displayed by the display system 300 are determined in advance. The image data to display the virtual images (including a virtual image E1 as a plane rendering target and a virtual image as a stereoscopic rendering target) is stored in advance in the storage unit 334.

The rendering control unit 331 receives detection signals from various sensors 350 installed in the automobile B1. The sensors 350 may be sensors for detecting various types of information for use in an advanced driver assistance system (ADAS), for example. The sensors 350 include at least one sensor selected from the group consisting of: sensors for measuring the velocity, temperature, and residual fuel of the automobile B1; an image sensor for shooting video presenting the surroundings of the automobile B1; and a milli-wave radar and a light detection and ranging (LiDAR) sensor for detecting objects present around the automobile B1.

The rendering control unit 331 retrieves, in accordance with the detection signals supplied from the sensors 350, a single or multiple items of image data for displaying information about the detection signals from the storage unit 334. In this case, when multiple types of information are displayed on the image display unit 310, the rendering control unit 331 acquires multiple items of image data for displaying the multiple types of information. In addition, the rendering control unit 331 also obtains, in accordance with the detection signals supplied from the sensors 350, location information about the display location of the virtual image in a target space where the virtual image is displayed. Then, the rendering control unit 331 outputs the image data of the virtual image(s) to display and the location information to the image data producing unit 332.

The image data producing unit 332 produces, based on the image data and location information provided by the rendering control unit 331, image data for displaying the virtual image(s) to display.

The output unit 333 outputs the image data that has been produced by the image data producing unit 332 to the display device 311 to have an image based on the image data displayed on the display screen 314 of the display device 311. The light representing the image displayed on the display screen 314 is condensed into the eye box C1 through the lens array 312 and the optical system 320, thus making the user U1 view the virtual image.

(2.2) Optical System

Next, the optical system 100 will be described with reference to FIGS. 1A-3B. The optical system 100 includes a light guide member 1, a plurality of light control members 2, and a plurality of prisms 3. The optical system 100 forms, along with a plurality of light sources 4, the illumination system 200. In the following description, a width direction defined with respect to the light guide member 1 (i.e., a direction in which the plurality of light sources 4 are arranged side by side in FIG. 2) will be hereinafter referred to as an "X direction" and a depth direction defined with respect to the light guide member 1 (i.e., a direction in which the plurality of prisms 3 are arranged side by side in FIG. 1A) will be hereinafter referred to as a "Y direction." Furthermore, in the following description, a thickness direction defined with respect to the light guide member 1 (i.e., a direction in which the first surface 11 and the second surface 12 are arranged one on top of the other in FIG. 1A) will be hereinafter referred to as a "Z direction."

Figure 2:
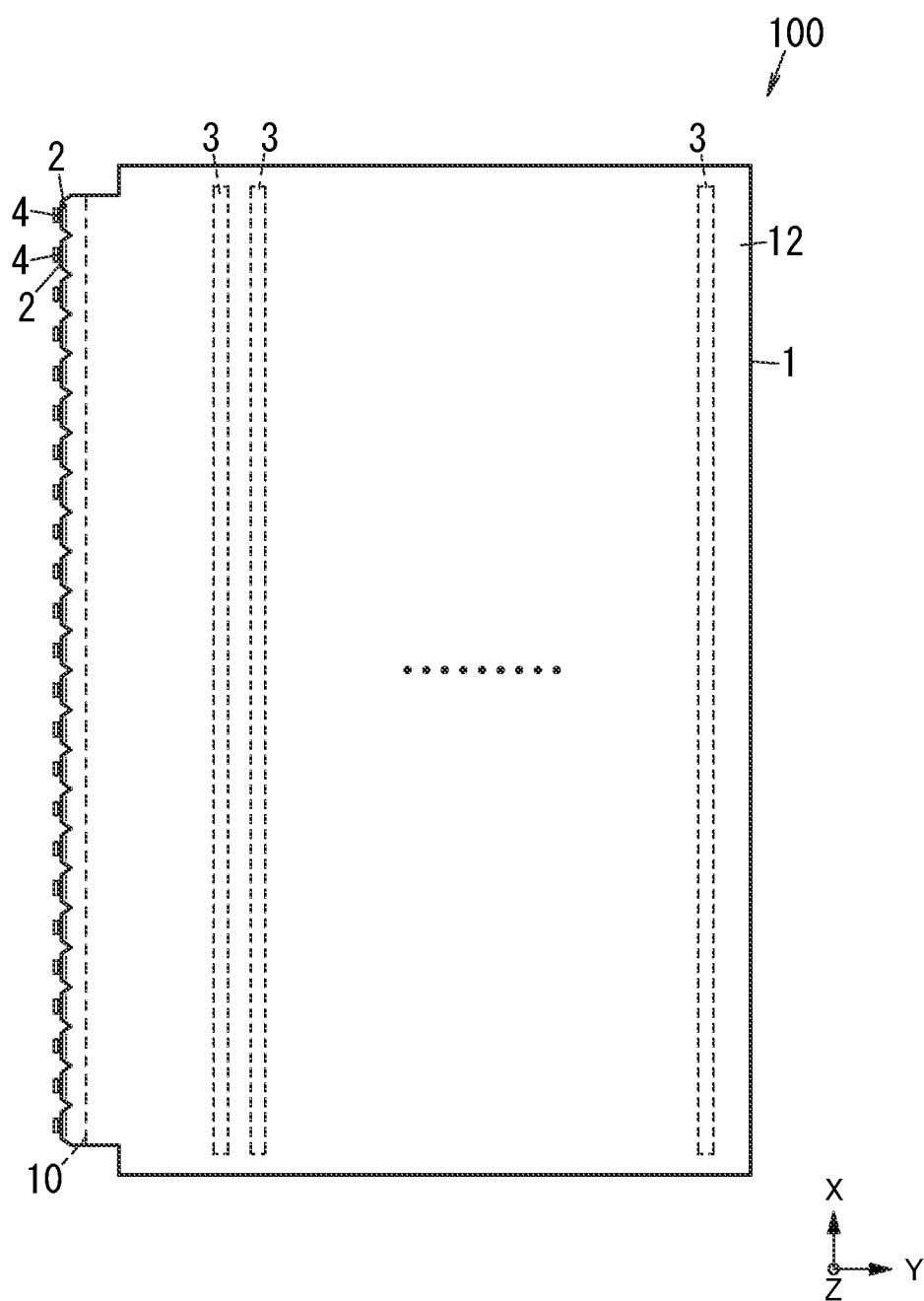
FIG. 2 is a plan view indicating an outline of the optical system.

Note that the arrows indicating the "X direction," "Y direction," and "Z direction" on the drawings are shown there just as an assistant to description and are insubstantial ones. Also, the dotted arrows shown on the drawings conceptually indicate an optical path of the light emitted from any of the light sources 4 and passing inside the light guide member 1. The light sources 4 are each implemented as a solid-state light-emitting element such as a light-emitting diode (LED) or an organic electroluminescent (OEL) element. The plurality of light sources 4 are arranged to be spaced from each other in the X direction and to face the incident surface 10 of the light guide member 1 as shown in FIG. 2. Each of the plurality of light sources 4 is provided one to one for an associated one of the plurality of light control members 2 provided on the incident surface 10 of the light guide member 1.

The light guide member 1 is made of a material having a light-transmitting property such as an acrylic resin and has a flat plate shape. Of two side surfaces, facing each other in the Y direction, of the light guide member 1, one side surface (i.e., the left side surface shown in FIG. 1A) is the incident surface 10 on which the light beams emitted from the plurality of light sources 4 are incident through the plurality of light control members 2. The two surfaces, facing each other in the Z direction, of the light guide member 1 are the first surface 11 and the second surface 12, respectively. The first surface 11 corresponds to the lower surface shown in FIG. 1A and the second surface 12 corresponds to the upper surface shown in FIG. 1A. The second surface 12 is an emergent surface, from which the light passing inside the light guide member 1 emerges out of the light guide member 1.

In this embodiment, the second surface 12 is surface perpendicular to the incident surface 10, i.e., a surface parallel to an XY plane. On the other hand, the first surface 11 is a surface which is not perpendicular to the incident surface 10 but is tilted with respect to the XY plane. Specifically, the first surface 11 is tilted such that as the distance from the incident surface 10 increases, the first surface 11 comes closer toward the second surface 12. That is to say, in this embodiment, the first surface 11 and the second surface 12 are tilted with respect to each other.

Figure 3A:
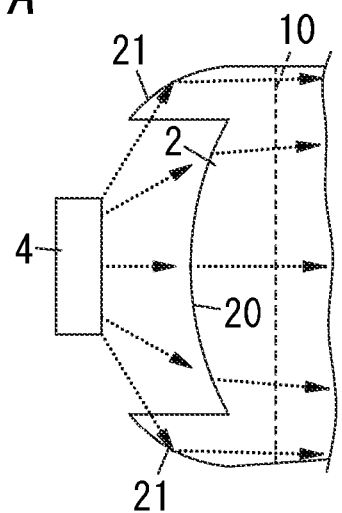
FIGS. 3A and 3B show optical paths in the optical system.

Each of the light control members 2 may be configured as, for example, a collimator lens which condenses the light traveling toward the incident surface 10 and directs the condensed light toward the incident surface 10. Specifically, each light control member 2 has a refractive surface 20 and a totally reflective surface 21 as shown in FIG. 3A. The refractive surface 20 refracts a part of the light emitted from the light source 4 and directs the refracted light toward the incident surface 10. The totally reflective surface 21 totally reflects a part of the light emitted from the light source 4 and directs the totally reflected light toward the incident surface 10. In this manner, the light control member 2 controls the light emitted from the light source 4 to narrow its divergence angle by refracting part or all of the light emitted from the light source 4. Thus, the light control member 2 controls the divergence angle of the light emitted from the light source 4 such that the optical path of the light going out of the light control member 2 is as close as possible to an optical path perpendicular to the incident surface 10, i.e., an optical path parallel to the second surface 12.

In this embodiment, the plurality of light control members 2 are arranged in the X direction at an end portion, forming the incident surface 10, of the light guide member 1 as shown in FIG. 2. That is to say, in this embodiment, the light control members 2 are integrated with the light guide member 1. In addition, the plurality of light control members 2 correspond one to one to the plurality of light sources 4 as described above. Thus, each of the plurality of light control members 2 controls the divergence angle of the light emitted from an associated one of the light sources 4 and directs the light toward the incident surface 10.

The prism 3 is formed on the first surface 11 by patterning an end portion, forming the first surface 11, of the light guide member 1 such that its cross section as viewed in the X direction forms a triangular recess. The prism 3 has a reflective surface 30 for reflecting, toward the second surface 12, the light that has been incident thereon by passing inside the light guide member 1 as shown in FIG. 1B. Note that FIG. 1B is an enlarged view of the portion encircled with a one-dot chain circle in FIG. 1A.

The angle θ1 formed between the reflective surface 30 and the first surface 11 (i.e., the tilt angle of the reflective surface 30) is defined such that the angle of incidence θ0 of the light incident on the reflective surface 30 becomes equal to or greater than a critical angle. That is to say, the reflective surface 30 is tilted with respect to the first surface 11 to totally reflect the incident light. In addition, the tilt angle θ1 of the reflective surface 30 is set such that the light totally reflected from the reflective surface 30 travels in a direction including a direction that is substantially perpendicular to the second surface 12. In this case, the angles of incidence θ0 of the light incident on the plurality of prisms 3 vary from one prism 3 to another.

In this embodiment, each of the plurality of prisms 3 is formed to extend linearly parallel to the X direction when viewed in plan in the Z direction as shown in FIG. 2. In addition, the plurality of prisms 3 are arranged on the end portion, forming the first surface 11, of the light guide member 1 to be spaced from each other in the Y direction. That is to say, in this embodiment, the plurality of prisms 3 are provided to be arranged side by side in the direction in which the light is incident on the incident surface 10 (i.e., in the Y direction). Specifically, the plurality of prisms 3 are provided to be spaced from each other in the Y direction such that the light traveling toward the first surface 11 by passing inside the light guide member 1 is reflected from any one of the plurality of prisms 3.

Next, the light emission principle of the optical system 100 according to this embodiment will be described with reference to FIGS. 3A and 3B. First, as shown in FIG. 3A, the light emitted from each light source 4 has its divergence angle controlled by passing through an associated light control member 2. Then, the light with the divergence angle thus controlled is directed from the light control member 2 toward the incident surface 10 of the light guide member 1. The optical path of the light directed from the light control member 2 becomes an optical path substantially perpendicular to the incident surface 10, i.e., an optical path substantially parallel to the second surface 12. In addition, the first surface 11 is tilted such that as the distance from the incident surface 10 increases, the first surface 11 comes closer toward the second surface 12. As a result, most of the light incident on the incident surface 10 reaches the first surface 11 without reaching the second surface 12 or a side surface 13, facing the incident surface 10, of the light guide member 1.

Figure 3B:
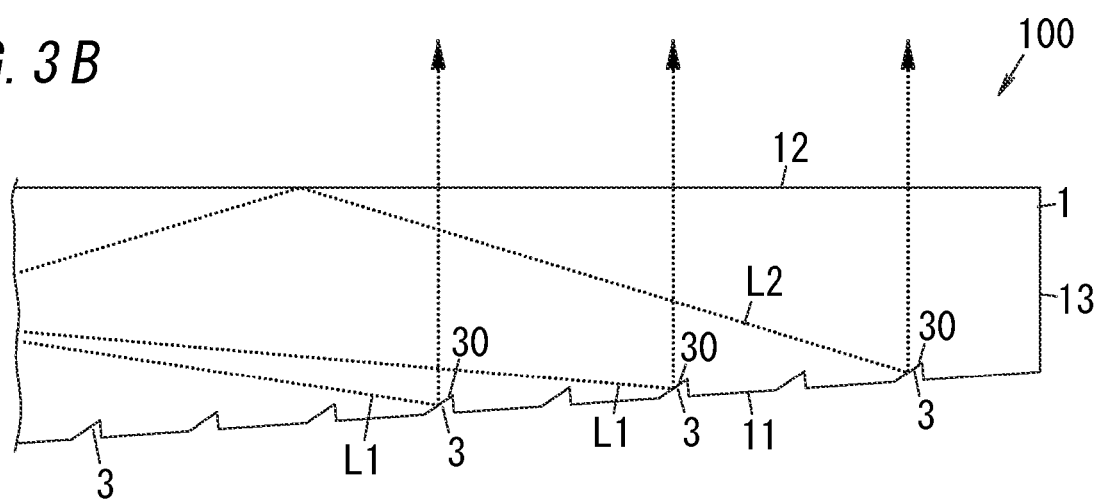

In addition, most of the light incident on the incident surface 10 is totally reflected from the reflective surface 30 of any of the plurality of prisms 3 on the first surface 11 without being reflected from the first surface 11 or the second surface 12 as shown in FIG. 3B. That is to say, the light guide member 1 includes a direct optical path L1, along which the light that has entered the light guide member 1 through the incident surface 10 is directly reflected from any of the prisms 3 and allowed to emerge from the second surface 12. Furthermore, in this embodiment, the direct optical path L1 includes the optical path of the light totally reflected from any of the prisms 3. The light totally reflected from the reflective surface 30 of each of the prism 3 travels along an optical path which is substantially perpendicular to the second surface 12 and emerges from the second surface 12. This causes the light emitted to be transmitted through the entire second surface 12 (i.e., allows the entire second surface 12 to provide surface-emitting light).

In this case, part of the light incident through the incident surface 10 is directed toward the second surface 12 without traveling toward the first surface 11 or the side surface 13. The light directed toward the second surface 12 may be totally reflected from the second surface 12. Then, the light totally reflected from the second surface 12 is directed toward the first surface 11, and therefore, totally reflected from the reflective surface 30 of any of the plurality of prisms 3. The light totally reflected from the reflective surface 30 of the prism 3, as well as the light traveling along the direct optical path L1, travels along an optical path substantially perpendicular to the second surface 12 and emerges from the second surface 12. That is to say, the light guide member 1 may further include an indirect optical path L2, along which the light that has entered the light guide member 1 through the incident surface 10 is once reflected from the second surface 12, reflected again from any of the prisms 3, and then allowed to emerge from the second surface 12.

Figure 6A:
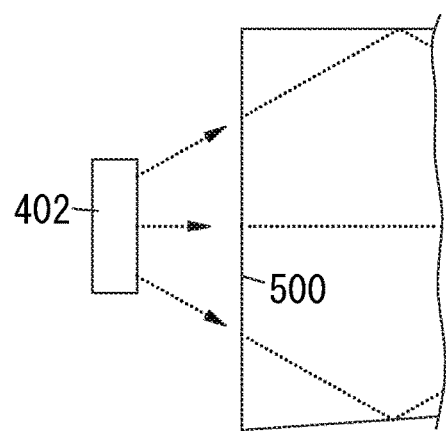
FIGS. 6A and 6B are cross-sectional views indicating an outline of an optical system according to a comparative example.
Figure 6B:
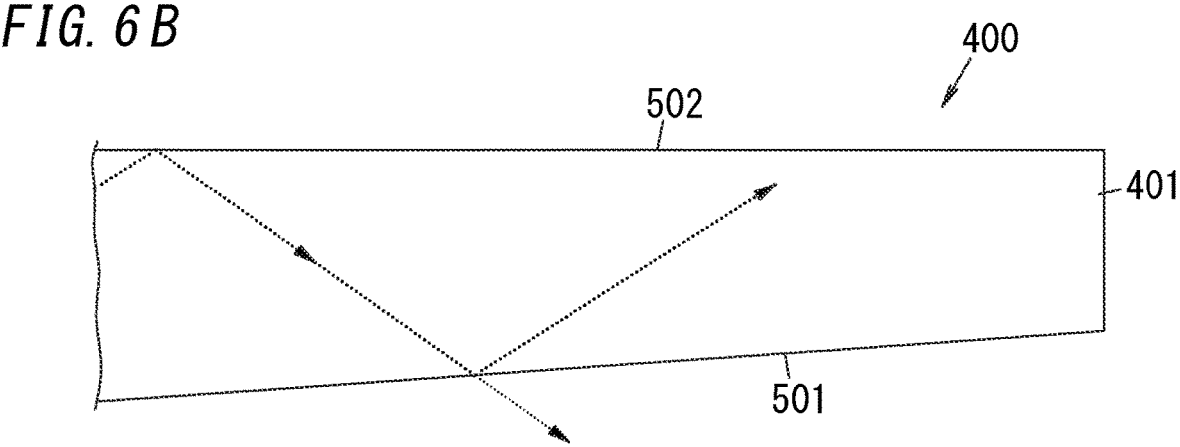

Next, an advantage to be achieved by the optical system 100 according to this embodiment will be described in comparison with an optical system 400 according to a comparative example. As shown in FIGS. 6A and 6B, the optical system 400 according to the comparative example includes neither the plurality of light control members 2 nor the plurality of prisms 3, which is a major difference from the optical system 100 according to this embodiment. In addition, in the optical system 400 according to the comparative example, a first surface 501 is tilted with respect to a second surface 502 such that the light incident on the first surface 501 of the light guide plate 401 is totally reflected, which is another major difference from the optical system 100 according to this embodiment.

In the optical system 400 according to the comparative example, the light emitted from a light source 402 is incident on an incident surface 500 of the light guide plate 401 without having its divergence angle controlled. Thus, the optical system 400 according to the comparative example almost evenly splits the light incident on the incident surface 500 into light traveling toward the first surface 501 and light traveling toward the second surface 502. Then, in the optical system 400 according to the comparative example, the light incident on the incident surface 500 is repeatedly totally reflected from the first surface 501 and the second surface 502 before emerging from the second surface 502 as in a general light guide plate. Thus, the optical system 400 according to the comparative example allows the entire second surface 502 to provide surface-emitting light.

However, the optical system 400 according to the comparative example is designed to allow the entire second surface 502 to provide surface-emitting light by having the incident light repeatedly totally reflected from the first surface 501 and the second surface 502 of the light guide plate 401. Thus, the larger the number of times the light is totally reflected, the more likely the condition for the total reflection (i.e., angle of incidence≥critical angle) fails to be satisfied, thus increasing the chances of the light leaking through the first surface 501.

Particularly when applied to a head-up display installed in an automobile B1 as in the display system 300 according to this embodiment, the optical system is required to achieve a narrower viewing angle and a higher light intensity than a general optical system including a light guide plate. To narrow the viewing angle, the emergent surface of the light guide plate needs to have a decreased area (i.e., the light guide plate needs to be downsized). However, the smaller the light guide plate is, the shorter the distance that the light incident on the light guide plate may reach (hereinafter referred to as a "light guide distance") is. The shorter the light guide distance is, the larger the proportion of the light leaking through a side surface facing the incident surface without emerging from the emergent surface of the light guide member becomes. This makes it increasing difficult to ensure a sufficient light intensity (in other words, to ensure a sufficient light extraction efficiency).

Thus, to ensure a sufficient light intensity even with a light guide member having a short light guide distance, the first surface 501 of the light guide plate 401 may be tilted with respect to the second surface 502 thereof as in the optical system 400 according to the comparative example. However, as described above, the optical system 400 according to the comparative example also allows the light to leak through the first surface 501 easily. Consequently, it is also difficult even for the optical system 400 according to the comparative example to ensure a sufficient light extraction efficiency.

In contrast, the optical system 100 according to this embodiment includes the light control members 2 and the prisms 3 as described above, and therefore, allows most of the light that has entered the light guide member 1 through the incident surface 10 to travel along the direct optical path L1. That is to say, according to this embodiment, most of the light that has entered the light guide member 1 through the incident surface 10 is directly incident on any of the prisms 3 and allowed to emerge from the second surface 12 without being repeatedly totally reflected from the first surface 11 and the second surface 12. Therefore, according to this embodiment, the condition for the total reflection rarely fails be satisfied, unlike the optical system 400 according to the comparative example. This reduces the chances of the light leaking out through the first surface 11 and eventually contributes to increasing the light extraction efficiency.

Note that part of the light that has entered the light guide member 1 through incident surface 10 travels along the indirect optical path L2. Even in that case, the incident light is totally reflected only once from the second surface 12 before reaching any of the prisms 3, thus reducing the chances of the condition for the total reflection failing to be satisfied and allowing the light to leak out through the first surface 11 much less often, compared to the optical system 400 according to the comparative example.

As can be seen, the optical system 100 according to this embodiment is designed to minimize the number of times the light passing inside the light guide member 1 is totally reflected, and therefore, contributes to increasing the light extraction efficiency more effectively, compared to the optical system 400 according to the comparative example.

In addition, according to this embodiment, the first surface 11 and the second surface 12 are tilted with respect to each other. Thus, according to this embodiment, the light control members 2 need to narrow the divergence angle of the light incident on the incident surface 10 to a lesser degree than in a situation where the first surface 11 and the second surface 12 are parallel to each other. Consequently, unlike the situation where the first surface 11 and the second surface 12 are parallel to each other, there is no need according to this embodiment to increase the distance between each of the light control members 2 and an associated one of the light sources 4, thus achieving the advantage of contributing more effectively to downsizing the illumination system 200.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. The drawings referred to in the foregoing description of embodiments are all schematic representations. That is to say, the ratio of the dimensions (including thicknesses) of respective constituent elements illustrated on the drawings does not always reflect their actual dimensional ratio.

Next, variations of the exemplary embodiment will be enumerated one after another. Note that any the variations to be described below may be adopted as appropriate in combination with the exemplary embodiment described above.

(3.1) First Variation

Figure 7A:
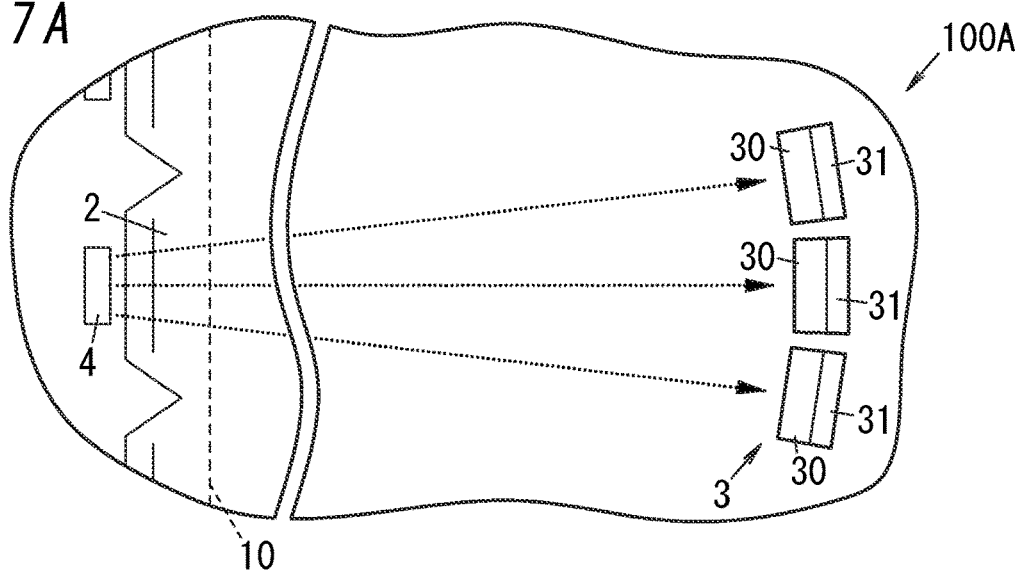
FIGS. 7A-7C indicate an outline of optical systems according to a first variation of the first embodiment of the present disclosure.

In an optical system 100A according to a first variation, each prism 3 is divided into a plurality of (e.g., three in this variation) small prisms 31 as shown in FIG. 7A, which is a major difference from the optical system 100 according to the exemplary embodiment described above. That is to say, according to this variation, each prism 3 includes a plurality of small prisms 31, which are divided to be spaced apart from each other. Note that in FIG. 7A, only one of a plurality of prisms 3 which are arranged in the Y direction is shown. Also, in FIG. 7A, only a part, facing a single light source 4 and a single light control member 2, of the single prism 3 is shown.

The plurality of small prisms 31 are arranged side by side to draw an arc-shaped curve when viewed in the Z direction. That is to say, according to this embodiment, at least part of each prism 3 (i.e., the small prisms 31) is tilted with respect to the incident surface 10 when viewed in the direction in which the first surface 11 and the second surface 12 are arranged one on top of the other (in the Z direction). In addition, according to this variation, two or more of the plurality of small prisms 31 are arranged to form a curved pattern when viewed in the direction in which the first surface 11 and the second surface 12 are arranged one on top of the other (in the Z direction).

In order for the optical system to achieve a narrow viewing angle, the optical path of the light emerging from the second surface 12 is suitably as closely perpendicular to the second surface 12 as possible. In this case, the light emitted from each light source 4 has its divergence angle narrowed by an associated light control member 2. However, as shown in FIG. 7A, not all of the light incident through the incident surface 10 travels along an optical path perpendicular to the incident surface 10 within an XY plane but some rays of the light travel along an optical path spreading in the X direction. Thus, if the prisms 3 extend linearly parallel to the X direction as in the embodiment described above, those rays of the light that have been incident on the incident surface 10 impinge obliquely on the reflective surface 30 of the prisms 3 within the XY plane. In that case, those light rays totally reflected from the reflective surface 30 of the prisms 3 do not travel along an optical path perpendicular to the second surface 12 but travel along an optical path angled with respect to the second surface 12, thus possibly decreasing the chances of achieving a narrow viewing angle.

On the other hand, according to this variation, at least part of each prism 3 is tilted with respect to the incident surface 10 when viewed in the Z direction. That is to say, according to this variation, the light incident on the incident surface 10 impinges substantially perpendicularly onto the reflective surface 30 of each of the small prisms 31 within the XY plane. Thus, this variation achieves the advantage of increasing the chances of the light that has been totally reflected from the reflective surface 30 of the small prisms 31 traveling along an optical path substantially perpendicular to the second surface 12, thus eventually achieving a narrow viewing angle more easily.

Figure 7B:
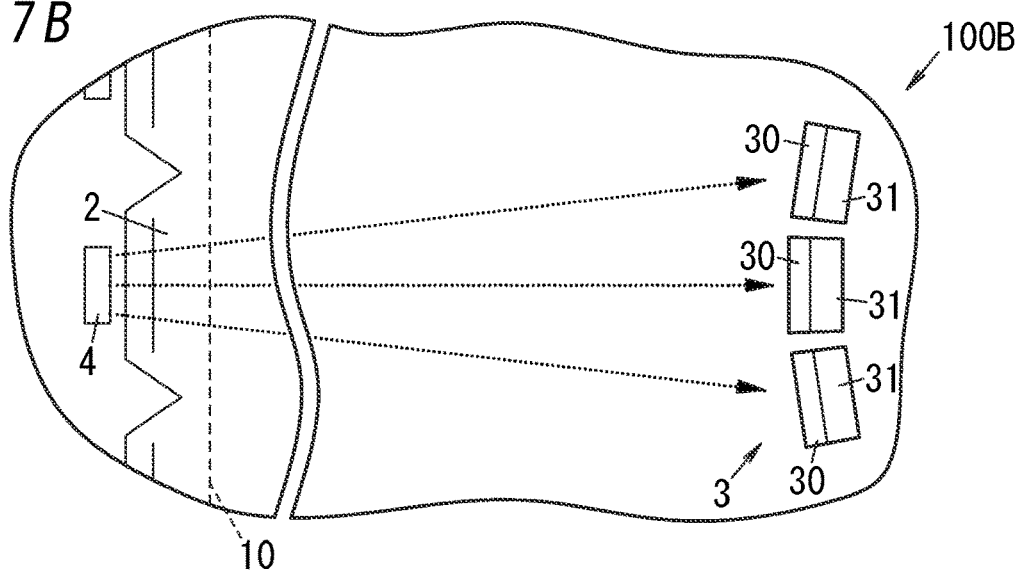

Alternatively, according to this variation, the plurality of small prisms 31 may also be arranged such that the center of an arc, approximate to the curved pattern, is located opposite from the light control member 2 with respect to the prism 3 when viewed in the Z direction as shown in FIG. 7B.

Figure 7C:
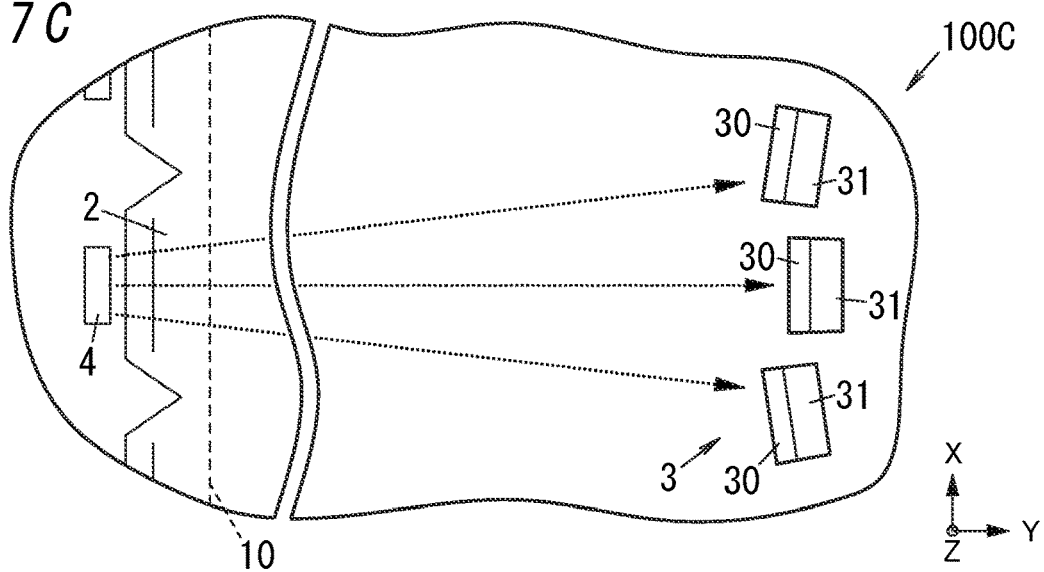

Still alternatively, according to this variation, the plurality of small prisms 31 may also be arranged not to form a curved pattern when viewed in the Z direction as shown in FIG. 7C. This arrangement achieves the advantage of requiring a shorter time to perform the patterning process of forming the plurality of small prisms 31. In addition, according to this arrangement, the plurality of small prisms 31 are arranged at random, thus achieving the advantage of more easily reducing the unevenness of the light emerging from the second surface 12.

(3.2) Second Variation

Figure 8A:
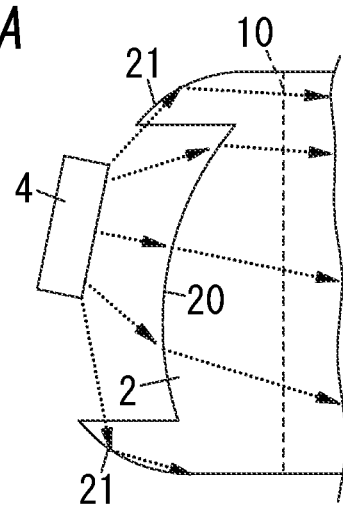
FIGS. 8A and 8B are cross-sectional views indicating an outline of an optical system according to a second variation of the first embodiment of the present disclosure.
Figure 8B:
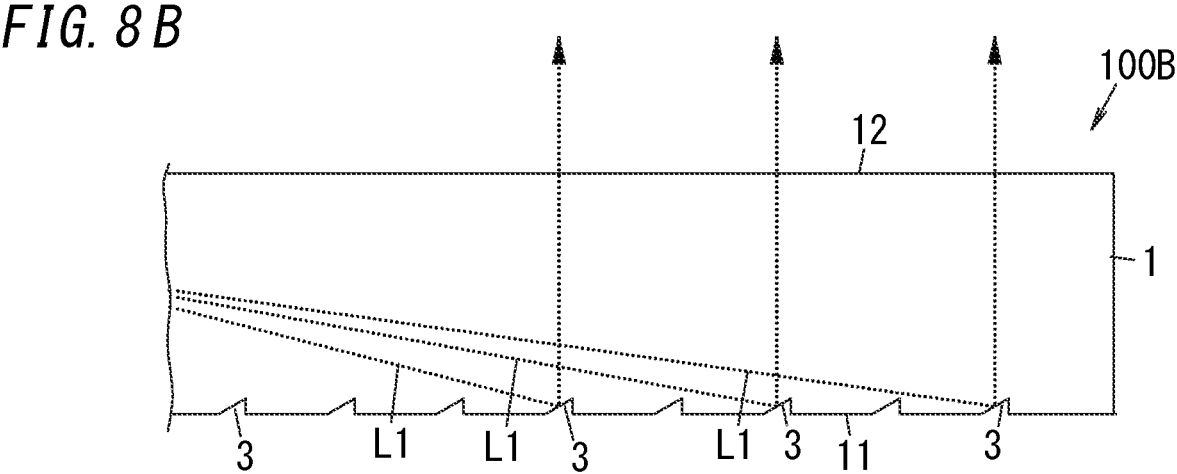

In an optical system 100B according to a second variation, the first surface 11 and second surface 12 of the light guide member 1 are not tilted with respect to each other but are both perpendicular to the incident surface 10 as shown in FIGS. 8A and 8B, which is a major difference from the optical system 100 according to the embodiment described above. In addition, in the optical system 100B according to this variation, the light sources 4 and the light control members 2 are arranged to be tilted with respect to the incident surface 10, which is another major difference from the optical system 100 according to the embodiment described above.

That is to say, the optical system 100B according to this variation is designed such that most of the light incident on the incident surface 10 is directed toward the first surface 11 by making the light sources 4 and the light control members 2 tilted with respect to the incident surface 10. Thus, according to this variation, most of the light incident through the incident surface 10 travels, as in the embodiment described above, along the direct optical path L1, thus contributing to increasing the light extraction efficiency without performing the patterning process of providing the tilted surface for the light guide member 1. Consequently, this variation achieves the advantage of facilitating the design of the light guide member 1 compared to the embodiment described above.

Note that although the light guide member 1 includes only the direct optical path L1 in FIG. 8B, the light guide member 1 may also include an indirect optical path L2.

(3.3) Third Variation

Figure 9:
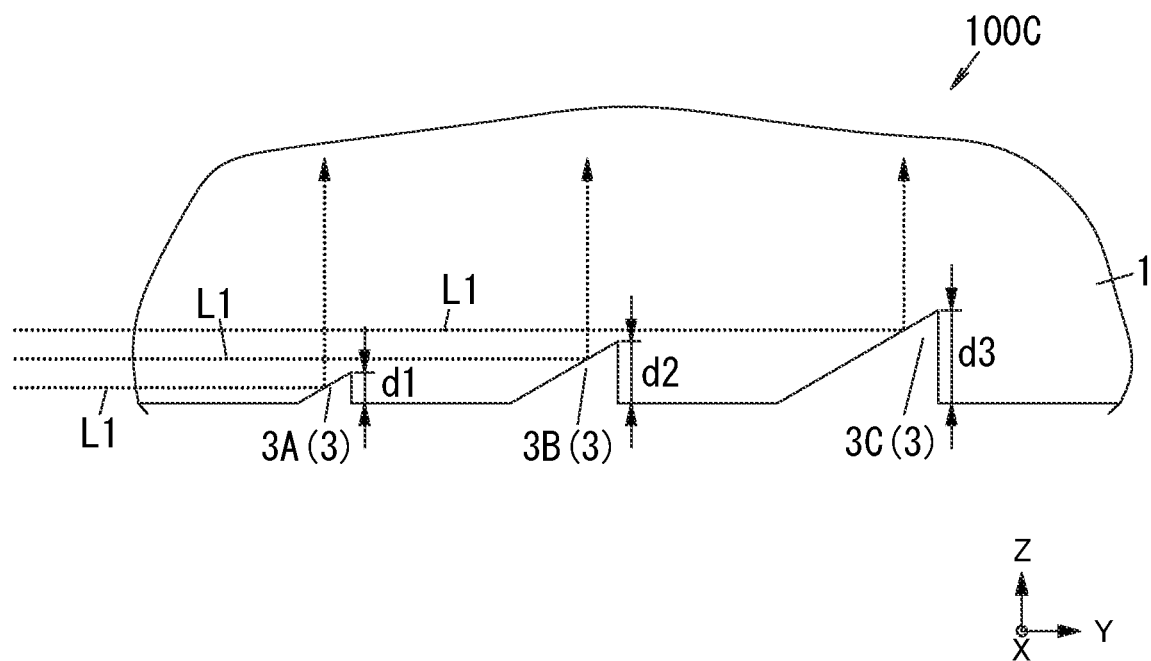
FIG. 9 is a cross-sectional view indicating an outline of an optical system according to a third variation of the first embodiment of the present disclosure.

In an optical system 100C according to a third variation, the first surface 11 and second surface 12 of the light guide member 1 are not tilted with respect to each other but are both perpendicular to the incident surface 10, which is a major difference from the optical system 100 according to the embodiment described above. In addition, in the optical system 100C according to this variation, the plurality of prisms 3 (e.g., three prisms 3A, 3B, 3C in this example) have mutually different depths d1, d2, d3 as shown in FIG. 9, which is another major difference from the optical system 100 according to the embodiment described above. The respective depths d1, d2, d3 of the three prisms 3 increase as the light incident on the incident surface 10 travels deeper inside the light guide member 1 (i.e., to the right in FIG. 9).

That is to say, the optical system 100C according to this variation is designed such that most of the light incident through the incident surface 10 is totally reflected from any of the plurality of prisms 3 by making the respective depths of the plurality of prisms 3 different from each other. Thus, according to this variation, most of the light incident through the incident surface 10 travels, as in the embodiment described above, along the direct optical path L1, thus contributing to increasing the light extraction efficiency without performing the patterning process of providing the tilted surface for the light guide member 1. Consequently, this variation achieves the advantage of facilitating the design of the light guide member 1 compared to the embodiment described above.

Note that although the light guide member 1 includes only the direct optical path L1 in FIG. 9, the light guide member 1 may also include an indirect optical path L2.

(3.4) Other Variations

The embodiment described above may be modified such that the first surface 11 is perpendicular to the incident surface 10 and the second surface 12 is not perpendicular to the incident surface 10 but is tilted with respect to an XY plane. Alternatively, the embodiment described above may also be modified such that neither the first surface 11 nor the second surface 12 is perpendicular to the incident surface 1010 but both the first surface 11 and the second surface 12 are tilted with respect to an XY plane.

Alternatively, the embodiment described above may also be modified such that the first surface 11 is provided with only one prism 3, instead of the plurality of prisms 3. In that case, the prism 3 may have a plurality of reflective surfaces 30, which are formed over the entire first surface 11 and have mutually different tilt angles.

Furthermore, in the embodiment described above, the prisms 3 are formed by patterning an end portion, forming the first surface 11, of the light guide member 1. However, this is only an example and should not be construed as limiting. Alternatively, the prisms 3 may be provided for the first surface 11 by affixing a prism sheet, on which the prism(s) 3 is/are formed, onto the first surface 11. In that case, a single prism 3 may be formed on the prism sheet or a plurality of prisms 3 may be formed on the prism sheet.

Furthermore, the prisms 3 may also be divided to be spaced apart from each other in the X direction not only in the first variation but also in the embodiment, the second variation, and the third variation as well. Furthermore, the first variation may also be modified such that the prism 3 may be a connected one without being divided into the plurality of small prisms 31.

Second Embodiment (1) Overview

First, an overview of an optical system 1100 according to this embodiment and an illumination system 1200 including the optical system 1100 will be described with reference to FIGS. 10A-12.

Figure 10A:
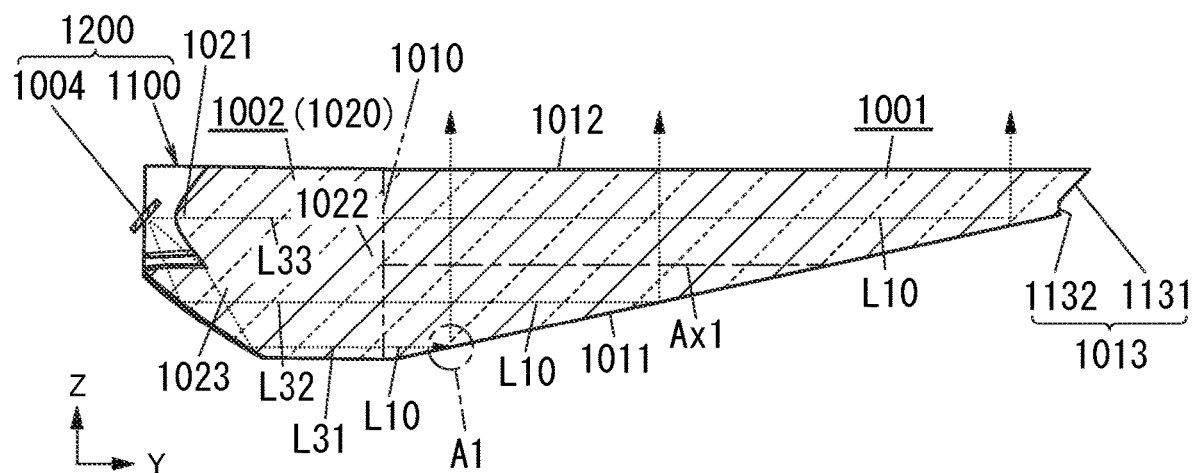
FIG. 10A is a cross-sectional view indicating an outline of an optical system according to a second embodiment.
Figure 10B:
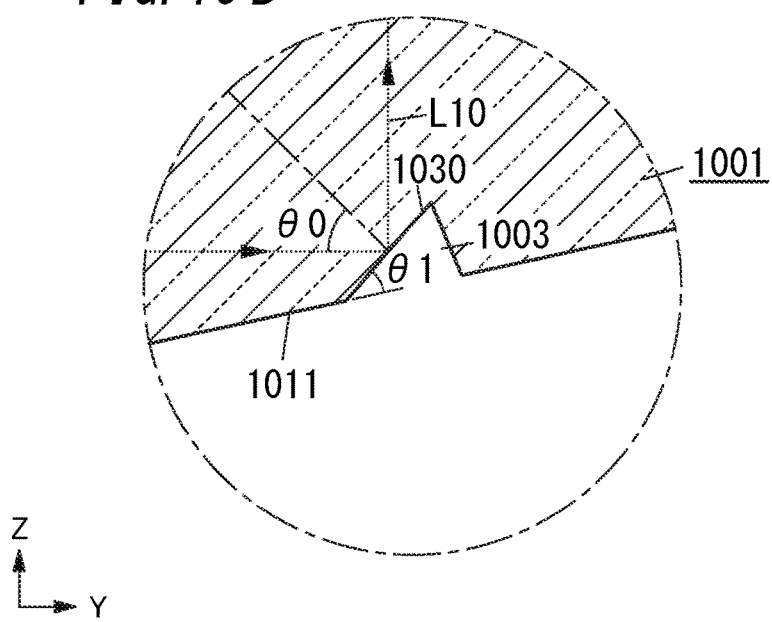
FIG. 10B is a schematic representation illustrating, on a larger scale, the region A1 shown in FIG. 10A.

An optical system 1100 according to this embodiment (see FIGS. 10A and 10B) has the capability of controlling light incident through an incident surface 1010 and allowing the light to emerge from an emergent surface (second surface 1012). The optical system 1100 includes a light guide member 1001, a light control member 1002, and a prism 1003 as shown in FIGS. 10A and 10B.

The optical system 1100 forms, along with a light source 1004, an illumination system 1200. In other words, the illumination system 1200 according to this embodiment includes the optical system 1100 and the light source 1004. The light source 1004 emits light to be incident on the incident surface 1010. As will be described in detail later, if the optical system 1100 includes a light control member 1002, the light emitted from the light source 1004 does not enter the light guide member 1001 directly but enters the light guide member 1001 indirectly through the light control member 1002. That is to say, the light source 1004 emits the light toward the incident surface 1010 (of the light guide member 1001) through the light control member 1002.

As can be seen, according to this embodiment, the optical system 1100 includes not only the light guide member 1001 and the prism 1003 but also the light control member 1002 as well. The light control member 1002 is provided between the light source 1004 and the incident surface 1010 of the light guide member 1001 to control the light that has been emitted from the light source 1004 and is going to be incident on the incident surface 1010. Particularly, in this embodiment, the light guide member 1001 and the light control member 1002 are integrated together as an integrally molded product. That is to say, in this embodiment, the light guide member 1001 and the light control member 1002 form an integrally molded product and are inseparable from each other. In other words, the light control member 1002 is seamlessly continuous with the incident surface 1010 of the light guide member 1001. That is to say, the light guide member 1001 and the light control member 1002 are integrated together seamlessly. Thus, in this embodiment, the incident surface 1010 of the light guide member 1001 is a "virtual plane" defined inside the integrally molded product of the light guide member 1001 and the light control member 1002 and is an insubstantial one.

In this embodiment, the light guide member 1001 has the incident surface 1010, on which light is incident, and a first surface 1011 and a second surface 1012 facing each other. The second surface 1012 is a surface from which the light emerges. The prism 1003 is provided on the first surface 1011. The prism 1003 reflects, toward the second surface 1012, the light passing inside the light guide member 1001.

In this embodiment, the light guide member 1001 includes a direct optical path L10 (see FIGS. 10A and 10B). The direct optical path L10 is an optical path, along which the light that has entered the light guide member 1001 through the incident surface 1010 is directly reflected from the prism 3 and allowed to emerge from the second surface 1012. Stated otherwise, the light guide member 1001 includes an optical path (direct optical path L10), along which the light that has entered the light guide member 1001 through the incident surface 1010 is reflected only once from the prism 1003 inside the light guide member 1001 before emerging from the second surface 1012. Once the light has entered the light guide member 1001 through the incident surface 1010, the light traveling along the direct optical path L10 is reflected only once from the prism 1003 to reach the second surface 1012 without being reflected from any part other than the prism 1003. Then, the light emerges as it is from the second surface 1012 out of the light guide member 1001.

In this embodiment, most of the light that has entered the light guide member 1001 through the incident surface 1010 and then emerges from the second surface 1012 is guided along the direct optical path L10 inside the light guide member 1001. Thus, according to this embodiment, most of the light that has entered the light guide member 1001 through the incident surface 1010 is reflected only once from the prism 1003, without being reflected from any part other than the prism 1003, before emerging from the second surface 1012 out of the light guide member 1001.

In the optical system 1100 according to this embodiment, the optical axis Ax1 of the light that has been incident through the incident surface 1010 is tilted with respect to the first surface 1011 such that as the distance from the incident surface 1010 increases, the gap distance between the optical axis Ax1 and the first surface 1011 decreases as shown in FIG. 10A. That is to say, in this embodiment, the optical axis Ax1 of the light incident through the incident surface 1010 is not parallel to, but is tilted with respect to, the first surface 1011, and comes closer toward the first surface 1011 due to its tilt, as the distance from the incident surface 1010 increases.

Thus, the light that has been incident through the incident surface 1010 comes closer toward the first surface 1011 as the light goes farther away from the incident surface 1010 (i.e., as the light goes deeper inside the light guide member 1001). This allows the light to be incident on the first surface 1011 (including the prisms 1003) more easily. This facilitates most of the light that has been incident through the incident surface 1010 being incident on the first surface 1011 before reaching the end surface 1013, facing the incident surface 1010, of the light guide member 1001. In other words, this reduces the chances of most of the light that has been incident through the incident surface 1010 reaching the end surface 1013, located opposite from the incident surface 1010, of the light guide member 1001, thus reducing leakage of light from the end surface 1013. Consequently, this may increase the proportion of the light emerging from the second surface 1012 out of the light guide member 1001 after having traveled along the direct optical path L10 to the overall light that has been incident through the incident surface 1010, thus contributing to increasing the light extraction efficiency.

Figure 11:
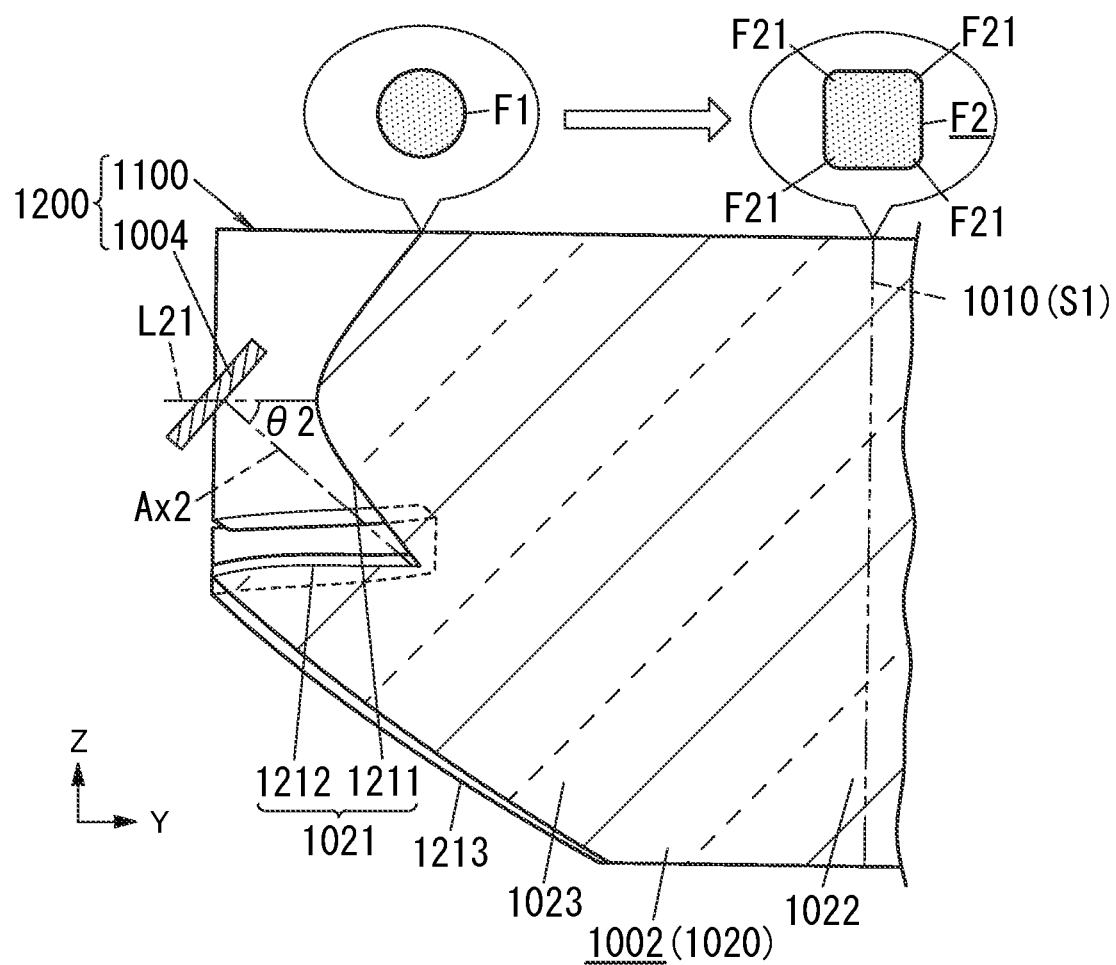
FIG. 11 is a schematic representation indicating an outline of a light control member of the optical system.

In addition, in the optical system 1100 according to this embodiment, the light control member 1002 has a shape transformation function as shown in FIG. 11. As used herein, the shape transformation function is the function of transforming the shape of the light projected onto a projection plane S1 parallel to the incident surface 1010 from a first shape F1 of the light emitted from the light source 1004 into a second shape F2 of the light that is going to be incident on the incident surface 1010. In this case, the projection plane S1 is a "virtual plane" defined inside the light control member 1002 and is an insubstantial one. In this embodiment, the projection plane S1 is supposed to be the same plane as the incident surface 1010, for example. That is to say, in this embodiment, the light control member 1002 provided between the light source 1004 and the incident surface 1010 of the light guide member 1001 transforms the shape of the light projected onto the projection plane S1 parallel to the incident surface 1010 (i.e., the incident surface 1010 in this embodiment) from the first shape F1 into the second shape F2.

This makes the range that the light incident through the incident surface 1010 may reach inside the light guide member 1001 controllable irrespective of the first shape F1 that is the shape of the light emitted from the light source 1004. That is to say, the range that the light incident through the incident surface 1010 may reach inside the light guide member 1001 derives from the second shape F2 that is the shape of the light incident on the incident surface 1010. This optical system 1100 may transform the shape from the first shape F1 into the second shape F2. Thus, this optical system 1100 may control the light incident through the incident surface 1010 so that the light may reach a relatively broad range inside the light guide member 1001. Consequently, this optical system 1100 increases the chances of the light reaching the entire first surface 1011, thus facilitating uniformly extracting the light from the entire second surface 1012 serving as an emergent surface.

Figure 12:
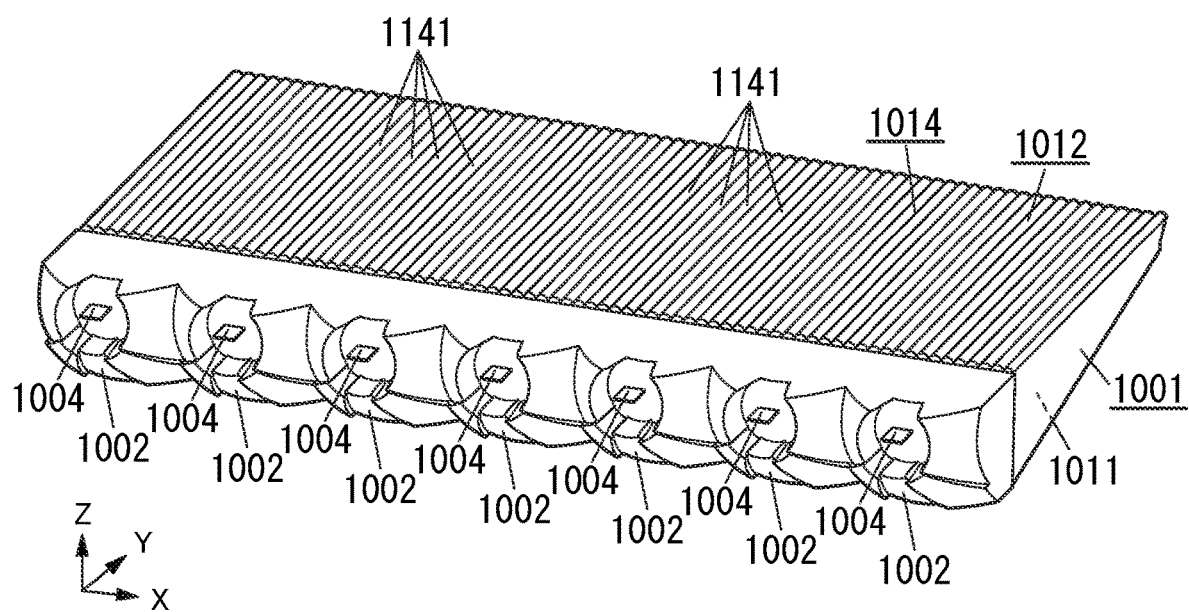
FIG. 12 is a perspective view indicating an outline of the optical system.

In addition, in the optical system 1100 according to this embodiment, at least one of the first surface 1011 or the second surface 1012 includes a luminous intensity distribution control member 1014 as shown in FIG. 12. The luminous intensity distribution control member 1014 controls the luminous intensity distribution of the light extracted from the second surface 1012. In this embodiment, only the second surface 1012, out of the first surface 1011 and the second surface 1012, includes the luminous intensity distribution control member 1014 as an example. That is to say, the luminous intensity distribution control member 1014 is provided for the second surface 1012.

This enables the luminous intensity distribution of the light extracted from the second surface 1012 of the light guide member 1001 to be controlled by the luminous intensity distribution control member 1014 provided for the light guide member 1001. In particular, the light guide member 1001 includes a direct optical path L10, along which the light that has entered the light guide member 1001 through the incident surface 1010 is reflected only once from the prism 1003 inside the light guide member 1001 before emerging from the second surface 1012. That is to say, the light traveling along the direct optical path L10 is reflected, after having entered the light guide member 1001 through the incident surface 1010, only once from the prism 1003, without being reflected from any part other than the prism 1003, before emerging from the second surface 1012 out of the light guide member 1001. Thus, the shapes of the first surface 1011 and the second surface 1012 do not contribute to guiding the light inside the light guide member 1001. Therefore, even if the luminous intensity distribution control member 1014 is provided for the light guide member 1001, the light guiding performance of the light guide member 1001 hardly deteriorates. Consequently, this allows the light traveling along the direct optical path L10 to be extracted efficiently from the second surface 1012 out of the light guide member 1001 while enabling the luminous intensity distribution to be controlled, thus contributing to increasing the light extraction efficiency.

Furthermore, as shown in FIG. 11, an optical member 1020 for use as the light control member 1002 in the optical system 1100 according to this embodiment includes an incident lens 1021 and an outlet portion 1022. The optical member 1020 allows the light that has been incident on the incident lens 1021 from the light source 1004 to go out of the optical member 1020 from the outlet portion 1022. The incident lens 1021 has a main incident surface 1211 and an auxiliary incident surface 1212. The main incident surface 1211 is arranged to face the light source 1004. The auxiliary incident surface 1212 is arranged to face toward a normal L21 to the main incident surface 1211. The auxiliary incident surface 1212 is located at least partially along a circumference of the main incident surface 1211. An optical axis Ax2 of the light source 1004 is tilted with respect to the normal L21 to the main incident surface 1211. In this case, if the main incident surface 1211 has a dome shape, the normal L21 to the main incident surface 1211 is a normal to the main incident surface 1211 at a tip portion (i.e., a peak portion of the dome) thereof. The normal L21 to the main incident surface 1211 is a "virtual line" and is an insubstantial one.

Since the optical axis Ax2 of the light source 1004 is tilted with respect to the normal L21 to the main incident surface 1211, the light emitted from the light source 1004 is incident on the incident lens 1021 of the optical member 1020 asymmetrically to the normal L21 to the main incident surface 1211. This allows making the intensity of the light incident from the light source 1004 imbalanced between the main incident surface 1211 of the incident lens 1021 and the auxiliary incident surface 1212 located around the main incident surface 1211. Consequently, this allows the optical member 1020 to have increased light harvesting efficiency.

(2) Details

Next, the optical system 1100 according to this embodiment, an illumination system 1200 including the optical system 1100, a display system 300 including the illumination system 1200, and a moving vehicle B1 will be described in detail with reference to FIGS. 10A-21C.

(2.1) Premise

In the following description, a width direction defined with respect to the light guide member 1001 (i.e., a direction in which the plurality of light sources 1004 are arranged side by side in FIG. 12) will be hereinafter referred to as an "X-axis direction" and a depth direction defined with respect to the light guide member 1001 (i.e., a direction in which the optical axis Ax1 extends in FIG. 10A) will be hereinafter referred to as a "Y-axis direction." Furthermore, in the following description, a thickness direction defined with respect to the light guide member 1001 (i.e., a direction in which the first surface 1011 and the second surface 1012 are arranged one on top of the other in FIG. 10A) will be hereinafter referred to as a "Z-axis direction." The X-, Y-, and Z-axes defining these directions are perpendicular to each other. Note that the arrows indicating the "X-axis direction," "Y-axis direction," and "Z-axis direction" on the drawings are shown there just as an assistant to description and are insubstantial ones.

As used herein, the "extraction efficiency" refers to the proportion of the quantity of the light emerging from the second surface 1012 (emergent surface) of the light guide member 1001 with respect to the quantity of the light incident on the incident surface 1010 of the light guide member 1001. That is to say, as the proportion of the quantity of the light emerging from the second surface 1012 of the light guide member 1001 with respect to the quantity of the light incident on the incident surface 1010 of the light guide member 1001 increases, the light extraction efficiency increases (rises). For example, supposing the quantity of the light emerging from the second surface 1012 is "10" while the quantity of the light incident on the incident surface 1010 of the light guide member 1001 is "100," then the light extraction efficiency of the light guide member 1001 is 10%.

Also, as used herein, the "harvesting efficiency" refers to the proportion of the quantity of light entering the optical member 1020 (light control member 1002) with respect to the quantity of light emitted (or output) from the light source 1004. That is to say, as the proportion of the quantity of the light entering the optical member 1020 with respect to the quantity of the light output from the light source 1004 increases, the light harvesting efficiency increases (rises). For example, supposing the quantity of the light entering the optical member 1020 is "10" while the quantity of the light output from the light source 1004 is "100," the light harvesting efficiency of the optical member 1020 is 10%. Furthermore, as used herein, the "optical axis" refers to a virtual light ray representing a light beam passing through the entire system. For example, the optical axis Ax2 of the light source 1004 agrees with the axis of rotational symmetry of the light emitted from the light source 1004.

Furthermore, as used herein, if something is "parallel to" something else, this expression means that these two things are substantially parallel to each other. That is to say, these two things may naturally be exactly parallel to each other but may also form an angle within several degrees (e.g., less than 5 degrees) between themselves.

Likewise, as used herein, if something is "perpendicular to" something else, this expression means that these two things are substantially perpendicular to each other. That is to say, these two things may naturally be exactly perpendicular to each other but may also form an angle within 90±several degrees (e.g., 90±less than 5 degrees) between themselves.

(2.2) Display System

First, the display system 1300 will be described with reference to FIGS. 13 and 14.

Figure 13:
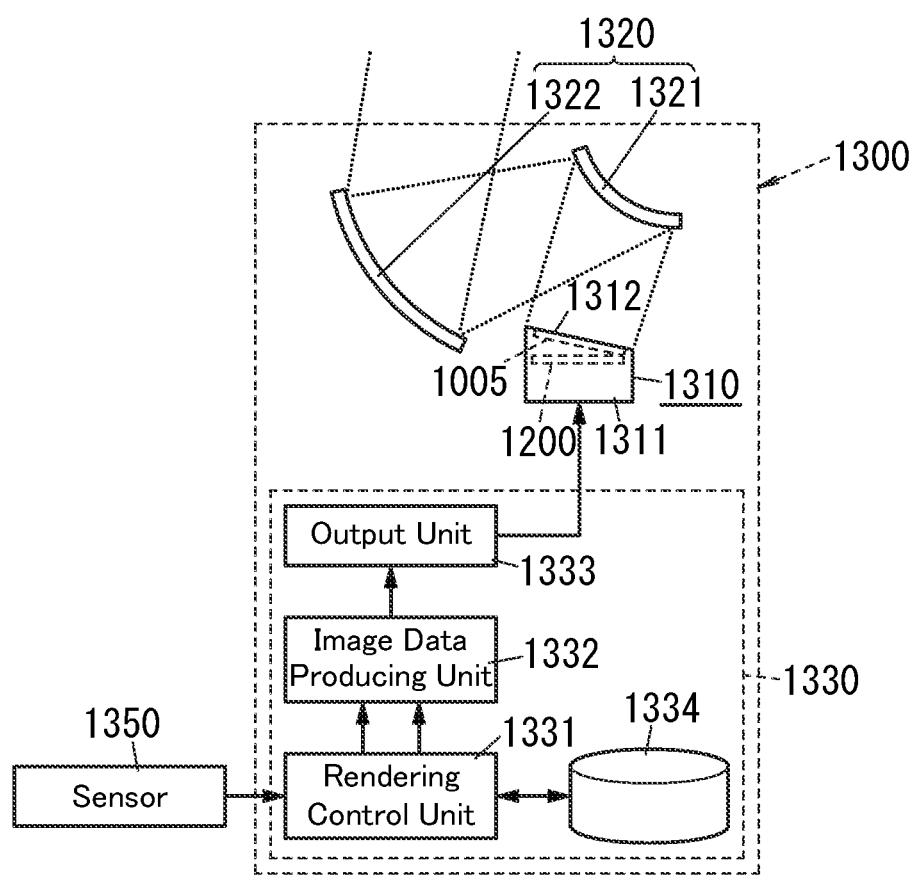
FIG. 13 illustrates a display system that uses the optical system.

The illumination system 1200 according to this embodiment forms, along with a display 1005, a display system 1300 as shown in FIG. 13. In other words, the display system 1300 according to this embodiment includes the illumination system 1200 and the display 1005. The display 1005 receives the light emerging from the illumination system 1200 and displays an image thereon. As used herein, the "image" refers to an image displayed in such a mode that allows the user U1 (see FIG. 14) to view the image and may be a figure, a sign, a character, a numeral, a pattern, a photo, or a combination thereof. Examples of the images displayed by the display system 300 include a moving picture (movie) and a still picture (still image). Furthermore, the "moving picture" further includes an image composed of a plurality of still pictures captured by stop motion shooting, for example.

Figure 14:
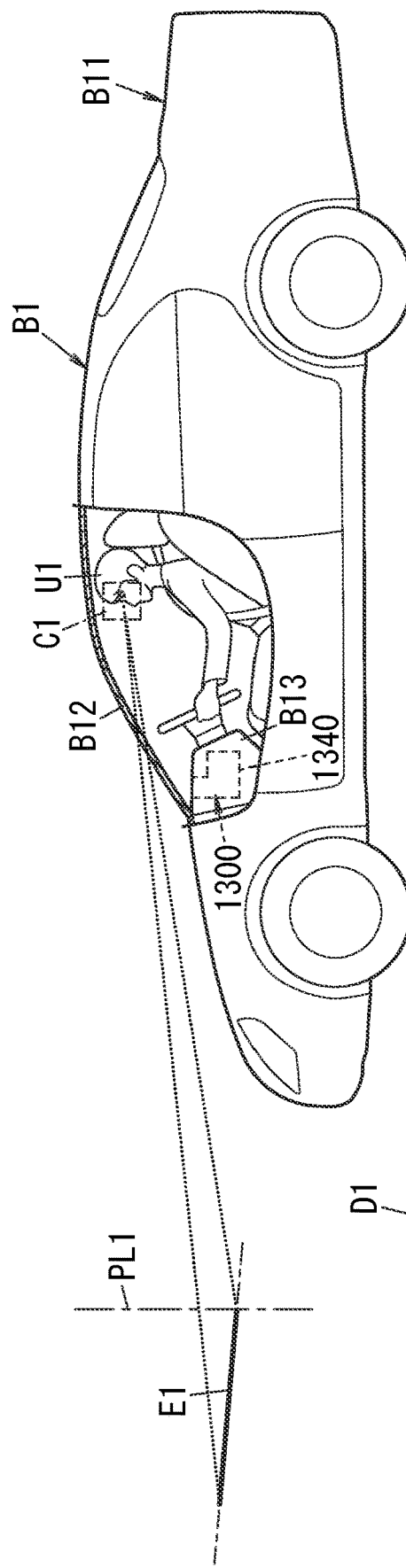
FIG. 14 illustrates a moving vehicle including the display system.
Figure 15A:
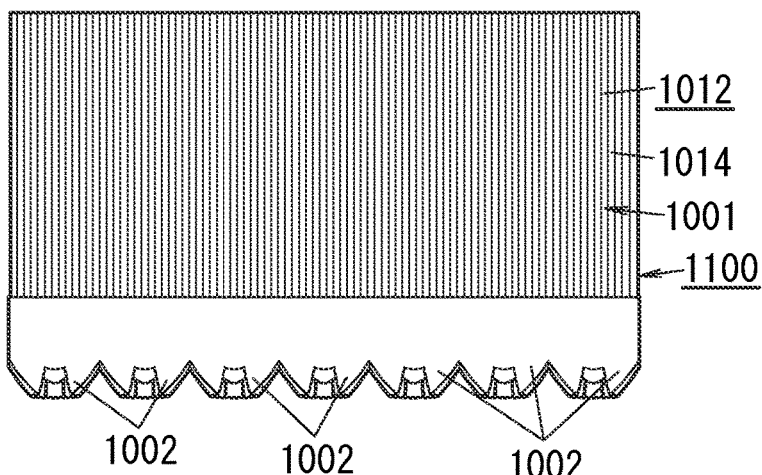
FIG. 15A is a plan view of the optical system.
Figure 15B:
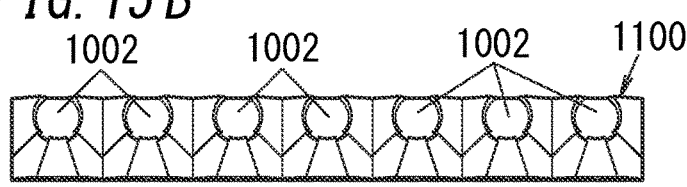
FIG. 15B is a front view of the optical system.
Figure 15D:
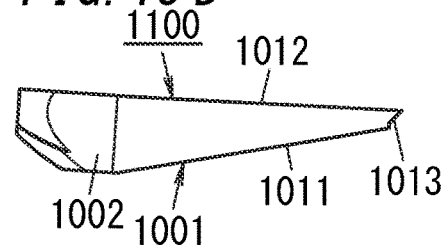
FIG. 15D is a side view of the optical system.
Figure 15C:
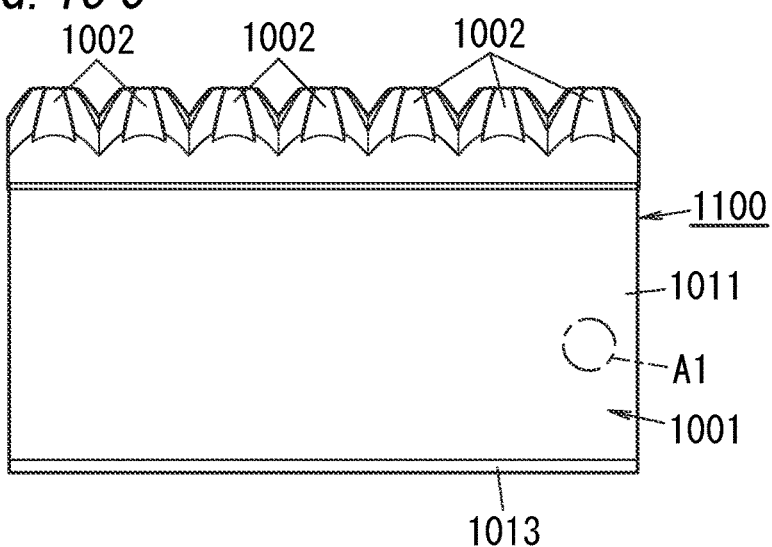
FIG. 15C is a bottom view of the optical system.

In addition, the display system 1300 according to this embodiment forms, along with the moving vehicle body B11, a moving vehicle B1 such as an automobile as shown in FIG. 14. In other words, the moving vehicle B1 according to this embodiment includes the display system 1300 and the moving vehicle body B11. The moving vehicle body B11 is equipped with the display system 1300. In this embodiment, the moving vehicle B1 is supposed to be an automobile to be driven by a human (i.e., a passenger car), as an example. In that case, the user U1 who views the image displayed by the display system 1300 is a passenger on the moving vehicle B1. In this embodiment, the user U1 is supposed to be the driver of the automobile as the moving vehicle B1 as an example.

In this embodiment, the display system 1300 may be used in, for example, a head-up display (HUD) to be installed in the moving vehicle B1. The display system 1300 is used to present, within the user's U1 sight, various types of driver assistance information including velocity information, condition information, and driving-related information about the moving vehicle B1. Examples of the driving-related information about the moving vehicle B1 include navigation-related information presenting proposed traveling routes, for example, and adaptive cruise control (ACC) related information for use to keep the traveling velocity and the distance between the vehicles constant.

As shown in FIGS. 13 and 14, the display system 1300 includes an image display unit 1310, an optical system 1320, and a control unit 1330. The display system 1300 further includes a housing 1340 for housing the image display unit 1310, the optical system 1320, and the control unit 1330 therein.

The housing 1340 may be a molded product of a synthetic resin, for example. In the housing 1340, housed are the image display unit 1310, the optical system 1320, the control unit 1330, and other members. The housing 1340 is installed in a dashboard B13 of the moving vehicle body B11. The light reflected from a second mirror 1322 (to be described later) of the optical system 1320 passes through an opening provided through the upper surface of the housing 1340 to emerge toward a reflective member (windshield B12). Then, the light is reflected from the windshield B12 and condensed into an eye box C1. The reflective member does not have to be the windshield B12 but may also be implemented as, for example, a combiner provided on the dashboard B13 of the moving vehicle body B11.

This display system 1300 allows the user U1 to view, through the windshield B12, a virtual image projected toward the space in front of the moving vehicle B1 (outside of the automobile B1). As used herein, the "virtual image" refers to an image formed by a ray of the light emerging from the display system 1300 and diverging from the windshield B12 or any other reflective member as if there actually were an object in the space. This allows the user U1 who is driving the moving vehicle B1 to view the image as a virtual image projected by the display system 1300 and superimposed on the real space in front of the moving vehicle B1. In short, the display system 1300 according to this embodiment displays a virtual image as an image. Examples of the images (virtual images) to be displayed by the display system 1300 include a virtual image E1 superimposed along the traveling surface D1 of the moving vehicle B1 and a virtual image to be rendered stereoscopically along a plane PL1 perpendicular to the traveling surface D1.

The image display unit 1310 includes a case 1311. The image display unit 1310 has the capability of displaying a stereoscopic image by the light field method, according to which an object in an image captured is made to look stereoscopic by reproducing light beams emerging from the object in a plurality of directions. Note that the light field method is not the only method allowing the image display unit 1310 to display the virtual image of the stereoscopic rendering target stereoscopically. Alternatively, the image display unit 1310 may also adopt a parallax method, which allows the user U1 to view a virtual image of the stereoscopic rendering target by projecting a pair of images with a parallax onto the user's U1 right and left eyes, respectively.

The image display unit 1310 includes the display 1005 and the illumination system 1200 including the optical system 1100. The display 1005 may be implemented as, for example, a liquid crystal display, and receives the light emerging from the illumination system 1200 to display an image thereon. That is to say, the illumination system 1200 emits light from behind the display 1005 toward the display 1005. The light that has come from the illumination system 1200 is transmitted through the display 1005, thus allowing the display 1005 to display an image thereon. In other words, the illumination system 1200 serves as a backlight for the display 1005.

The image display unit 1310 includes a case 1311. In the case 1311, housed are the illumination system 1200 including the optical system 1100 and the light source 1004 and the display 1005. The illumination system 1200 and the display 1005 are held by the case 1311. In this embodiment, the display 1005 is arranged along the upper surface of the case 1311 and one surface of the display 1005 is exposed on the upper surface of the case 1311. The illumination system 1200 is arranged under the display 1005 inside the case 1311 to emit light toward the display 1005 from under the display 1005. Thus, the upper surface of the case 1311 constitutes a display screen 1312 on which the image is displayed.

The image display unit 1310 is housed in the internal space of the housing 1340 such that the display screen 1312 thereof faces a first mirror 1321 (to be described later). The display screen 1312 of the image display unit 1310 has a shape (e.g., a rectangular shape) corresponding to the range of the image to be projected toward the user U1 (i.e., the shape of the windshield B12). On the display screen 1312 of the image display unit 1310, a plurality of pixels are arranged to form an array. The plurality of pixels of the image display unit 1310 emits light beams under the control of the control unit 1330. As a result, an image to be displayed on the display screen 1312 is formed by the light beams emerging from the display screen 1312 of the image display unit 1310.

The light representing the image displayed on the display screen 1312 of the image display unit 1310 emerges from the display screen 1312 toward the windshield B12. Then, the light is reflected from the windshield B12 and condensed into the eye box C1. That is to say, the image displayed on the display screen 1312 is viewed, through the optical system 1320, by the user U1 who has a viewpoint inside the eye box C1. At this time, the user U1 views, through the windshield B12, the virtual image projected onto a space in front of the moving vehicle B1 (i.e., outside of the moving vehicle B1).

The optical system 1320 condenses the light emerging from the display screen 1312 of the image display unit 1310 into the eye box C1. In this embodiment, the optical system 1320 includes: the first mirror 1321, which may be a convex mirror, for example; the second mirror 1322, which may be a concave mirror; and the windshield B12.

The first mirror 1321 reflects the light emerging from the image display unit 1310 to make the light incident on the second mirror 1322. The second mirror 1322 reflects the light, which has been incident thereon from the first mirror 1321, toward the windshield B12. The windshield B12 reflects the light, which has been incident thereon from the second mirror 1322, to make the light incident into the eye box C1.

The control unit 1330 includes a computer system, for example. The computer system may include one or more processors and one or more memories as principal hardware components. The functions of the control unit 1330 (e.g., the functions of a rendering control unit 1331, an image data producing unit 1332, and an output unit 1333) may be performed by making the one or more processors execute a program stored in the one or more memories or a storage unit 1334 of the computer system. The program may be stored in advance in the one or more memories or the storage unit 1334 of the computer system. Alternatively, the program may also be downloaded through a telecommunications line or be distributed after having been recorded in some non-transitory storage medium such as a memory card, an optical disc, or a hard disk drive, any of which is readable for the computer system.

The storage unit 1334 may be implemented as, for example, a non-transitory storage medium such as a programmable nonvolatile semiconductor memory. The storage unit 1334 stores a program to be executed by the control unit 1330 and other data. In addition, the display system 1300 is used to present, within the user's U1 sight, driver assistance information including velocity information, condition information, and driving information about the moving vehicle B1. Thus, the types of the virtual images displayed by the display system 1300 are determined in advance. The image data to display the virtual images (including a virtual image E1 as a plane rendering target and a virtual image as a stereoscopic rendering target) is stored in advance in the storage unit 1334.

The rendering control unit 1331 receives detection signals from various sensors 1350 installed in the automobile B1. The sensors 1350 may be sensors for detecting various types of information for use in an advanced driver assistance system (ADAS), for example. The sensors 1350 include at least one sensor selected from the group consisting of sensors for detecting the conditions of the moving vehicle B1 and sensors for detecting the circumstances surrounding the moving vehicle B1. Examples of such sensors for detecting the conditions of the moving vehicle B1 include sensors for measuring the velocity, temperature, and residual fuel of the moving vehicle B1. Examples of such sensors for detecting the circumstances surrounding the moving vehicle B1 include an image sensor, a milli-wave radar, or a light detection and ranging (LiDAR) sensor for shooting video presenting the surroundings of the moving vehicle B1.

The rendering control unit 1331 acquires, in accordance with the detection signals supplied from the sensors 1350, a single or multiple items of image data for displaying information about the detection signals from the storage unit 1334. In this case, when multiple types of information are displayed on the image display unit 1310, the rendering control unit 1331 acquires multiple items of image data for displaying the multiple types of information. In addition, the rendering control unit 1331 also obtains, in accordance with the detection signals supplied from the sensors 1350, location information about the display location of the virtual image in a target space where the virtual image is displayed. Then, the rendering control unit 1331 outputs the image data of the virtual image(s) to display and the location information thereof to the image data producing unit 1332.

The image data producing unit 1332 produces, based on the image data and location information provided by the rendering control unit 1331, image data for displaying the virtual image(s) to display.

The output unit 1333 outputs the image data that has been produced by the image data producing unit 1332 to the image display unit 1310 to have an image based on the produced image data displayed on the display screen 1312 of the image display unit 1310. Light representing the image displayed on the display screen 1312 is projected onto the windshield B12, thus having the image (virtual image) displayed by the display system 1300. In this manner, the image (virtual image) displayed by the display system 300 is viewed by the user U1.

(2.3) Optical System

Next, the optical system 1100 will be described with reference to FIGS. 10A-12 and FIGS. 15A-16B.

In this embodiment, the optical system 1100 includes a light guide member 1001, a plurality of light control members 1002, and a plurality of prisms 1003. That is to say, the optical system 1100 according to this embodiment includes a plurality of light control members 1002 and a plurality of prisms 1003.

Also, in this embodiment, the optical system 1100 forms, along with the plurality of light sources 1004, the illumination system 1200. In other words, the illumination system 1200 according to this embodiment includes the optical system 1100 and the plurality of light sources 1004.

A common configuration is adopted for the plurality of light control members 1002. Thus, unless otherwise stated, the description of a configuration for a single light control member 1002 is equally applicable to the other light control members 1002 as well. Likewise, a common configuration is adopted for the plurality of prisms 1003. Thus, unless otherwise stated, the description of a configuration for a single prism 1003 is equally applicable to the other prisms 1003 as well. Likewise, a common configuration is adopted for the plurality of light sources 1004. Thus, unless otherwise stated, the description of a configuration for a single light source 1004 is equally applicable to the other light sources 1004 as well.

The light sources 1004 are each implemented as a solid-state light-emitting element such as a light-emitting diode (LED) or an organic electroluminescent (OEL) element. In this embodiment, each light source 1004 is implemented as a light-emitting diode element with a chip shape. Such a light source 1004 actually emits light from a certain area of its surface (light-emitting surface). Ideally, such a light source 1004 may be regarded as a point light source which emits light from a point on its surface. Thus, in the following description, the light source 1004 will be described on the supposition that the light source 1004 is an ideal point light source.

In this embodiment, the light source 1004 is arranged to face the incident surface 1010 of the light guide member 1001 with a predetermined interval left between the light source 1004 and the incident surface 1010 as shown in FIG. 11. In addition, the light control member 1002 is provided between the light source 1004 and the incident surface 1010 of the light guide member 1001.

In this embodiment, the light control member 1002 is integrated with the light guide member 1001. As used herein, if a plurality of elements (or portions) are "integrated" with each other, this phrase refers to an arrangement in which the plurality of elements may be handled as a physically integrated one. That is to say, the expression "a plurality of elements are integrated together" herein refers to an arrangement in which the plurality of elements are aggregated together and may be handled as if those elements were a single member. In that case, those elements may be integrated together and inseparable from each other as in an integrally molded product. Alternatively, a plurality of elements that have been formed separately may be mechanically joined together by welding, bonding, or caulking, for example. That is to say, the light guide member 1001 and the light control member 1002 may be integrated together in any appropriate manner.

More specifically, in this embodiment, the light guide member 1001 and the light control member 1002 are integrated together to form an integrally molded product as described above. That is to say, in this embodiment, the light guide member 1001 and the light control member 1002 form an integrally molded product and are integrated and inseparable from each other. Thus, the incident surface 1010 of the light guide member 1001 is a "virtual plane" defined inside the integrally molded product of the light guide member 1001 and the light control member 1002 as described above and is an insubstantial one.

In this embodiment, the plurality of light sources 1004 are arranged at regular intervals in the X-axis direction as shown in FIG. 12. Each of the plurality of light sources 4 is provided one to one for an associated one of the plurality of light control members 2. That is to say, the plurality of light control members 1002, as well as the plurality of light sources 1004, are also arranged side by side in the X-axis direction. In this case, the arrangement pitch of the plurality of light sources 1004 in the X-axis direction is equal to the arrangement pitch of the plurality of light control members 1002 in the X-axis direction.

The light guide member 1001 allows the light emitted from the light sources 1004 to enter the light guide member 1001 itself through the incident surface 1010 and guides the light thus entered toward the second surface 1012 as an emergent surface by letting the light pass inside the light guide member 1001 itself. That is to say, the light guide member 1001 is member for guiding the light. In this embodiment, the light guide member 1001 is a molded product of a light-transmitting resin material such as an acrylic resin and is formed in the shape of a plate. That is to say, the light guide member 1001 is a light guide plate having a certain thickness.

The light guide member 1001 has the incident surface 1010 on which the light is incident, and a first surface 1011 and a second surface 1012 (emergent surface) that face each other. The light guide member 1001 further has an end surface 1013 facing the incident surface 1010.

Specifically, in this embodiment, the light guide member 1001 has a rectangular plate shape and the two surfaces thereof facing each other in the thickness direction defined with respect to the light guide member 1001 are the first surface 1011 and the second surface 1012, respectively, as shown in FIGS. 15A-15D. Also, one of the four end surfaces (peripheral surfaces) of the light guide member 1001 is the incident surface 1010. That is to say, the light guide member 1001 is formed in a rectangular shape in a plan view (i.e., when viewed from one end in the Z-axis direction). In this embodiment, the light guide member 1001 may be formed, for example, in the shape of a rectangle, of which the dimension measured in the Y-axis direction is smaller than its dimension measured in the X-axis direction. In addition, both surfaces in the thickness direction (i.e., the Z-axis direction) defined with respect to the light guide member 1001 constitute the first surface 1011 and the second surface 1012, respectively. Furthermore, both surfaces in the latitudinal direction (i.e., the Y-axis direction) defined with respect to the light guide member 1001 constitute the incident surface 1010 and the end surface 1013, respectively.

As can be seen, one end surface (i.e., the left surface in FIG. 10A) out of the two end surfaces, facing each other in the Y-axis direction, of the light guide member 1001 is the incident surface 1010, on which the light beams emitted from the plurality of light sources 1004 are incident through the plurality of light control members 1002. The two surfaces, facing each other in the Z-axis direction, of the light guide member 1001 are the first surface 1011 and the second surface 1012, respectively. The first surface 1011 corresponds to the lower surface in FIG. 10A and the second surface 1012 corresponds to the upper surface in FIG. 10A. In addition, the second surface 1012 is an emergent surface, through which the light emerges from inside to outside of the light guide member 1001. Thus, letting the light enter the light guide member 1001 through one end surface serving as the incident surface 1010 allows the second surface 1012, serving as an emergent surface, to provide surface-emitting light.

Furthermore, in this embodiment, the second surface 1012 is a plane parallel to an X-Y plane and the incident surface 1010 is a plane parallel to an X-Z plane. As used herein, the "X-Y plane" refers to a plane that includes the X-axis and the Y-axis and that intersects at right angles with the Z-axis. Likewise, as used herein, the "X-Z plane" refers to a plane that includes the X-axis and the Z-axis and that intersects at right angles with the Y-axis. In other words, the second surface 1012 is a plane that intersects at right angles with the Z-axis and the incident surface 1010 is a plane that intersects at right angles with the Y-axis. Thus, the second surface 1012 and the incident surface 1010 intersect at right angles with each other.

On the other hand, the first surface 1011 is a plane that is not parallel to, but tilted with respect to, the X-Y plane. That is to say, the first surface 1011 and the incident surface 1010 do not intersect at right angles with each other. Specifically, the first surface 1011 is tilted with respect to the X-Y plane such that as the distance from the incident surface 1010 increases, the first surface 1011 comes closer toward the second surface 1012. That is to say, in this embodiment, the first surface 1011 and the second surface 1012 are tilted with respect to each other.

Furthermore, according to this embodiment, the second surface 1012 is provided with the luminous intensity distribution control member 1014. The luminous intensity distribution control member 1014 includes a lens. In this embodiment, the luminous intensity distribution control member 1014 includes a cylindrical lens as an example. The luminous intensity distribution control member 1014 will be described in detail later in the "(2.7) Luminous intensity distribution control member" section.

The light control members 1002 are arranged between the light sources 1004 and the incident surface 1010 of the light guide member 1001. Each of the light control members 1002 controls the light that has been emitted from an associated one of the light sources 1004 and is going to be incident on the incident surface 1010. In this embodiment, each light control member 1002 has the capability of substantially collimating the light emitted from the associated light source 1004 into parallel rays. That is to say, the light control member 1002 is a collimator lens which condenses, toward the incident surface 1010, the radially divergent light that has come from the light source 1004, thereby substantially collimating the incident light into parallel rays. In this case, the light emitted from the light source 1004 is incident on the incident surface 1010 of the light guide member 1001 through the light control member 1002. Thus, the light emitted from the light source 1004 is controlled to have its divergence angle narrowed by the light control member 1002 with the collimating capability and directed toward the incident surface 1010 of the light guide member 1001. In the following description, this embodiment will be described on the supposition that the light emitted from the light source 1004 serving as an ideal point light source is controlled by the light control member 1002 to be collimated into ideal parallel rays.

As will be described in detail later in the "(2.4) Obliquely incident light" section, the optical axis Ax1 of the light incident through the incident surface 1010 of the light guide member 1001 is tilted in this embodiment with respect to the first surface 1011 such that as the distance from the incident surface 1010 increases, the gap distance between the optical axis Ax1 and the first surface 1011 decreases as shown in FIG. 10A. Thus, the parallel rays directed from the light control member 1002 toward the incident surface 1010 of the light guide member 1001 are parallel rays tilted with respect to the first surface 1011 such that as the distance from the incident surface 1010 increases, the gap distance between the parallel rays and the first surface 1011 decreases. Note that the dotted arrows shown on the drawings indicate the light rays (or optical paths) just conceptually and are insubstantial ones.

In this embodiment, the plurality of light control members 1002 are provided for the end portion, serving as the incident surface 1010, of the light guide member 1001 to be arranged side by side in the X-axis direction as shown in FIG. 12. That is to say, in this embodiment, the light control members 1002 are integrated with the light guide member 1001. In addition, the plurality of light control members 1002 correspond one to one to the plurality of light sources 1004 as described above. Thus, each of the plurality of light control members 1002 controls the divergence angle of the light emitted from an associated one of the light sources 1004 and directs the light toward the incident surface 1010. The shape of the light control member 1002 will be described in detail later in the "(2.5) Shape transformation function" section and the "(2.6) Asymmetric shape" section.

The prisms 1003 are provided for the first surface 1011 and is each configured to reflect the light passing inside the light guide member 1001 toward the second surface 1012. In this embodiment, a plurality of prisms 1003 are provided for the first surface 1011. Each of the prisms 1003 is configured to totally reflect the incident light. Naturally, the prism 1003 does not have to be configured to totally reflect all the incident light. Alternatively, according to another arrangement, part of the incident light is not totally reflected but may pass through the inside of the prism 1003.

In the light guide member 1001, most of the light that has entered the light guide member 1001 through the incident surface 1010 is reflected from the prisms 1003, without being reflected from the rest of the first surface 1011 or the second surface 1012 other than the prisms 3, before emerging from the second surface 1012. That is to say, the light guide member 1001 includes a direct optical path L10, along which the light that has entered the light guide member 1001 through the incident surface 1010 is directly reflected from the prisms 1003 and allowed to emerge from the second surface 1012.

In this embodiment, the prisms 3 are each formed on the first surface 1011 such that its cross section as viewed from one end in the X-axis direction forms a triangular recess. The prisms 1003 may be formed by patterning the first surface 1011 of the light guide member, for example. Each prism 1003 has a reflective surface 1030 for reflecting, toward the second surface 1012, the light that has been incident thereon by passing inside the light guide member 1001 as shown in FIG. 10B. Note that FIG. 10B is a schematic representation providing an enlarged view of the end surface region A1 encircled with a one-dot chain circle in FIG. 10A.

The angle θ1 formed between the reflective surface 1030 and the first surface 1011 (i.e., the tilt angle of the reflective surface 1030) is defined such that the angle of incidence θ0 of the light incident on the reflective surface 1030 becomes equal to or greater than a critical angle. That is to say, the reflective surface 1030 is tilted with respect to the first surface 1011 to totally reflect the incident light. In addition, the tilt angle θ1 of the reflective surface 1030 is also set such that the light totally reflected from the reflective surface 1030 is incident perpendicularly onto the second surface 1012.

Figure 16A:
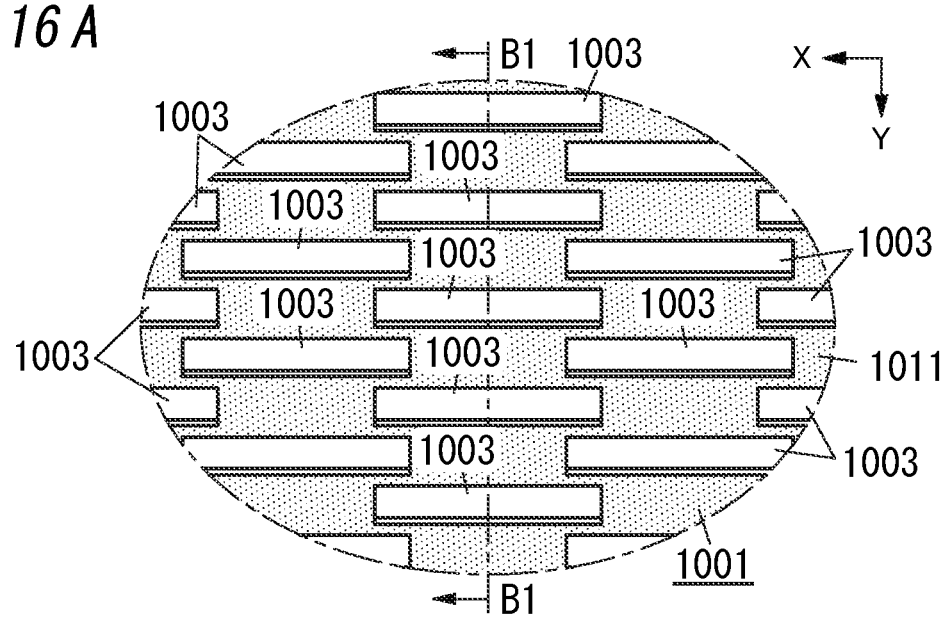
FIG. 16A is a schematic representation illustrating, on a larger scale, the region A1 shown in FIG. 15C
Figure 16B:
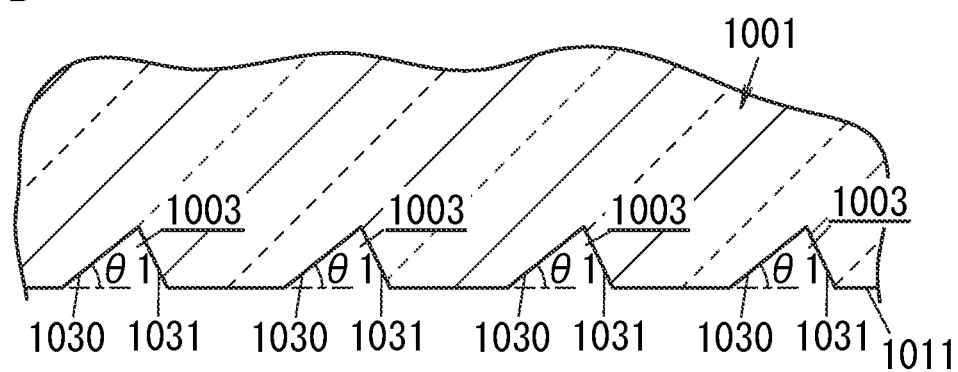
FIG. 16B is a cross-sectional view thereof taken along the plane B1-B1 shown in FIG. 16A.

In this embodiment, the plurality of prisms 1003 are arranged in a zigzag pattern on the first surface 1011 as shown in FIGS. 16A and 16B when viewed from one end in the Z-axis direction. FIG. 16A is a schematic plan view illustrating, on a larger scale, the region A1 shown in FIG. 15C. FIG. 16B schematically illustrates a cross section of an end surface taken along the plane B1-B1 shown in FIG. 16A. Although only a part of the first surface 1011 is shown in FIG. 16A, a plurality of prisms 1003 are actually formed over almost the entire area of the first surface 1011.

Specifically, each prism 1003 has a length in the X-axis direction. The plurality of prisms 1003 are arranged to be spaced from each other along the longitudinal axis thereof (i.e., in the X-axis direction). In addition, the plurality of prisms 1003 are also arranged to be spaced apart from each other in the Y-axis direction. Supposing multiple banks of prisms 1003, each being arranged in the X-axis direction, are counted a first bank, a second bank, a third bank, and so on, from the one located closest to the incident surface 1010 in the Y-axis direction, the plurality of prisms 1003 included in an even-numbered bank are shifted in the X-axis direction from the plurality of prisms 1003 included in an odd-numbered bank. In this embodiment, the plurality of prisms 1003 included in the even-numbered bank and the plurality of prisms 1003 included in the odd-numbered bank are arranged such that their longitudinal ends (in the X-axis direction) overlap with each other in the Y-axis direction. According to such an arrangement, the plurality of prisms 1003 are densely arranged in the X-axis direction with no gap left between themselves when viewed from the incident surface 1010. This allows the light that has entered the light guide member 1001 through the incident surface 1010 to be reflected from any of the plurality of prisms 1003.

In this embodiment, the plurality of prisms 1003 may all have the same shape, for example. Therefore, in the plurality of prisms 1003 arranged in the Y-axis direction, their respective reflective surfaces 1030 have the same tilt angle θ1 as shown in FIG. 16B. In addition, the dimensions of prisms 1003, including the respective longitudinal dimensions of the prisms 1003 and the respective depths of the recesses serving as the prisms 1003 (in other words, the respective heights of the prisms 1003) are the same between the plurality of prisms 1003. That is to say, in this embodiment, a plurality of prisms 1003 are arranged side by side in the direction in which the light is incident on the incident surface 1010 (i.e., in the Y-axis direction). In this case, the plurality of prisms 1003 have the same shape. Thus, if the angle of incidence of the light incident on the reflective surfaces 1030 is constant, then the light is reflected in the same direction from the respective reflective surfaces 1030 of the prisms 1003, no matter which of the plurality of prisms 1003 the light has been incident on. This allows all the light beams reflected from the plurality of prisms 1003 to be incident perpendicularly onto the second surface 1012.

Furthermore, the recesses serving as the prisms 1003 may have a depth (in other words, the prisms 1003 may have a height) falling within the range from 1 μm to 100 μm, for example. Likewise, the plurality of prisms 1003 may have an arrangement pitch in the Y-axis direction falling within the range from 1 μm to 1000 μm, for example. As a specific example, the recesses serving as the prisms 1003 may have a depth of 10-odd μm and the plurality of prisms 1003 may have an arrangement pitch in the Y-axis direction of 100 and a few ten μm.

Next, the light emission principle of the optical system 1100 according to this embodiment will be described with reference to FIGS. 10A and 10B.

First, as shown in FIG. 10A, the light emitted from each light source 1004 has its divergence angle controlled by passing through an associated light control member 1002. Then, the light with the divergence angle thus controlled travels from the light control member 1002 toward the incident surface 1010 of the light guide member 1001. In this embodiment, the light transmitted through the light control member 1002 turns into parallel rays, which are parallel to the second surface 1012 and are incident perpendicularly onto the incident surface 1010.

Also, as described above, the optical axis Ax1 of the light that has entered the light guide member 1001 through the incident surface 1010 is tilted with respect to the first surface 1011 such that as the distance from the incident surface 1010 increases, the gap distance between the optical axis Ax1 and the first surface 1011 decreases. Thus, most of the light incident through the incident surface 1010 reaches the first surface 1011 without reaching the second surface 1012 or the end surface 1013, facing the incident surface 1010, of the light guide member 1001.

Then, as shown in FIG. 10B, most of the light incident through the incident surface 10 is totally reflected from the reflective surface 1030 of any of the plurality of prisms 1003 provided for the first surface 1011, without being reflected from the first surface 11 or the second surface 12. That is to say, the light guide member 1 includes a direct optical path L10, along which the light that has entered the light guide member 1 through the incident surface 1010 is directly reflected from the prisms 3 and allowed to emerge from the second surface 1012. Furthermore, in this embodiment, the direct optical path L10 includes the optical paths of the light beams totally reflected from the prisms 1003. The light beams totally reflected from the respective reflective surfaces 1030 of the prisms 1003 travel along the optical paths that intersect at right angles with the second surface 1012 before emerging from the second surface 1012.

In this embodiment, the respective reflective surfaces 1030 of the plurality of prisms 1003 all have the same tilt angle θ1 as described above. When parallel beams, which are parallel to the second surface 1012, are incident on the plurality of prisms 1003, the angles of incidence θ0 defined by the light beams incident on the reflective surfaces 1030 also become constant. Thus, the light is reflected in the same direction from the reflective surface 1030 of any of the plurality of prisms 1003. Consequently, in this embodiment, every light bam reaching the second surface 1012 after having traveled along the direct optical path L10 is incident on the second surface 1012 at the same angle. As used herein, the "same angle" does not have to be exactly the same angle but may also refer to two angles which are slightly different from each other by not more than 2 or 3 degrees. Ideally, every light beam reaching the second surface 1012 after having traveled along the direct optical path L10 is incident on the second surface 1012 to form an angle of 90 degrees with respect to (i.e., perpendicularly to) the second surface 1012.

In this embodiment, the plurality of prisms 1003 are arranged over the entire area of the second surface 1012, and therefore, the light that has traveled along the direct optical path L10 described above emerges uniformly from the entire second surface 1012 of the light guide member 1001. This allows the entire second surface 1012 to provide surface-emitting light.

Next, an advantage to be achieved by the optical system 1100 according to this embodiment will be described in comparison with a general light guide member (light guide plate).

In the general light guide member, the light that has entered the light guide member through an incident surface thereof is guided inside the light guide member while being reflected a number of times from both surfaces along the thickness (corresponding to the first surface 1011 and the second surface 1012) of the light guide member. Then, the condition for the total reflection (i.e., angle of incidence ≥ critical angle) is no longer satisfied when the light is reflected from a prism provided for one surface (corresponding to the first surface 1011) along the thickness of the light guide member. As a result, the light emerges from the other surface, serving as an emergent surface (and corresponding to the second surface 1012), of the light guide member. This allows the general light guide member to provide surface-emitting light from the entire emergent surface thereof as well.

In the general light guide member described above, however, the light that has entered the light guide member through the incident surface thereof is repeatedly reflected a number of times from both surfaces along the thickness of the light guide member and thereby guided to a portion, distant from the incident surface, of the light guide member. Therefore, the larger the number of times the light is totally reflected, the more likely the condition for the total reflection (i.e., angle of incidence ≥ critical angle) fails to be satisfied. This increases the chances of the light leaking out through one surface (corresponding to the first surface 1011) along the thickness of the light guide member.

Particularly when an optical system including a light guide member is applied to a head-up display to be installed in a moving vehicle B1 as in the display system 300 according to this embodiment, the light guide member is required to provide a relatively narrow viewing angle and a high light intensity. That is to say, in the head-up display, the luminous intensity distribution of the light emerging from the light guide member is suitably controlled according to the optical system 1320, and therefore, a narrower viewing angle is required compared to a general light guide member for use in a backlight for a liquid crystal display. It is difficult for the general light guide member to provide a narrower viewing angle. Thus, using the general light guide member in a head-up display often allows the light to emerge in unwanted directions as well.

In contrast, the optical system 1100 according to this embodiment includes the light control members 1002 and the prisms 1003 as described above, and therefore, allows the light that has entered the light guide member 1001 through the incident surface 1010 to travel along the direct optical path L10. That is to say, according to this embodiment, most of the light that has entered the light guide member 1001 through the incident surface 1010 is directly incident on any of the prisms 1003 and allowed to emerge from the second surface 1012 without being repeatedly totally reflected from the first surface 1011 and the second surface 1012. Therefore, according to this embodiment, the condition for the total reflection rarely fails be satisfied, compared to the general light guide member. This reduces the chances of the light leaking out through the first surface 1011 and eventually contributes to increasing the light extraction efficiency. In addition, most of the light incident on the incident surface 1010 is parallel beams. This reduces the chances of the light diverging, and therefore, a relatively narrow angle of emergence may be maintained even for the light reflected from the prism 1003 and emerging from the second surface 1012. Consequently, the optical system 1100 according to this embodiment allows most of the light incident through the incident surface 1010 to emerge at such a narrow angle and achieves a relatively high light intensity by using the direct optical path L10.

In this embodiment, the light emerging from the second surface 1012 after having traveled along the direct optical path L10 accounts for 50% or more of the light that has entered the light guide member 1001 through the incident surface 1010. That is to say, part of the light that has entered the light guide member 1001 through the incident surface 1010 does not travel along the direct optical path L10. In this embodiment, however, the majority (i.e., a half or more) of the light incident through the incident surface 1010 emerges from the second surface 1012 after having traveled along the direct optical path L10. This makes the light extraction efficiency of the light guide member 1001 at least equal to 50%. The light extraction efficiency of the light guide member 1001 is more suitably equal to or greater than 70% and may even be 80% or more.

Increasing the light extraction efficiency of the light guide member 1001 in this manner eliminates the need to provide a reflective sheet, a prism sheet, a dual brightness enhancement film (DBEF), a Fresnel lens sheet, or any other optical elements for the first surface 1011 of the light guide member 1001. That is to say, this reduces the leakage of the light from the first surface 1011, and therefore, a sufficiently high light extraction efficiency is achievable even with none of these optical elements arranged on the first surface 1011 of the light guide member 1001.

(2.4) Obliquely Incident Light

Next, a configuration for allowing incoming light to enter the light guide member 1001 through the incident surface 1010 thereof will be described in detail with reference to FIGS. 10A and 10B.

Specifically, in the optical system 1100 according to this embodiment, the optical axis Ax1 of the light incident through the incident surface 1010 is tilted with respect to the first surface 1011 such that the gap distance between the optical axis Ax1 and the first surface 1011 narrows as the distance from the incident surface 1010 increases (i.e., as the incident light goes farther away from the incident surface 1010). In particular, in this embodiment, parallel light is incident from the light control members 1002 onto the incident surface 1010 of the light guide member 1001, and therefore, each of the light beams included in the parallel light is tilted with respect to the first surface 1011. Moreover, in this embodiment, the first surface 1011 is a plane and the light beams included in the parallel light that has been incident on the incident surface 1010 of the light guide member 1001 are tilted at the same angle with respect to the first surface 1011.

Specifically, the first surface 1011 and the second surface 1012 are not parallel to each other but tilted with respect to each other. That is to say, as described above, the second surface 1012 is a plane parallel to the X-Y plane, while the first surface 1011 is a plane which is not parallel to, but tilted with respect to, the X-Y plane. In this case, the first surface 1011 is tilted with respect to the X-Y plane such that as the distance from the incident surface 1010 increases, the first surface 1011 comes closer toward the second surface 1012. In short, the first surface 1011 and second surface 1012, i.e., both surfaces along the thickness, of the light guide member 1001 are tilted with respect to each other. Thus, the thickness of the light guide member 1001 is not constant but varies to gradually decrease in a certain direction. In this embodiment, the first surface 1011 is tilted with respect to the second surface 1012 such that as the distance from the incident surface 1010 increases in the Y-axis direction, the first surface 1011 comes closer toward the second surface 1012. Therefore, the thickness of the light guide member 1001 is the largest at the end portion thereof with the incident surface 1010 and decreases gradually as the distance from the incident surface 1010 increases (i.e., as the distance to the end surface 1013 decreases) in the Y-axis direction.

On the other hand, the light entering the light guide member 1001 through the incident surface 1010 has been controlled by the light control members 1002 into parallel light parallel to the second surface 1012. That is to say, the optical axis Ax1 of the light incident through the incident surface 1010 is parallel to the second surface 1012. Therefore, the optical axis Ax1 of the light incident through the incident surface 1010 is tilted at a predetermined tilt angle with respect to the first surface 1011. The tilt angle of the incident light is the same as the tilt angle defined by the first surface 1011 with respect to the X-Y plane (i.e., the second surface 1012).

More specifically, each light control member 1002 includes a path generating portion 1023 that forms paths L31, L32, L33 for the light between its associated light source 1004 and the incident surface 10 as shown in FIG. 10A. The path generating portion 1023 extends along a line tilted with respect to the first surface 1011 (e.g., along the optical axis Ax1 in this example) when viewed from the incident surface 1010 and forms the paths L31, L32, L33 for the light between the light source 1004 and the incident surface 10. That is to say, in this embodiment, the light control member 1002 is integrated with the light guide member 1001.

In other words, the light control member 1002 includes a portion (i.e., the path generating portion 1023) protruding along the optical axis Ax1 that is tilted with respect to the first surface 1011 when viewed from the incident surface 1010 of the light guide member 1001. In addition, the light control member 1002 makes the path generating portion 1023 form the path L31, L32, L33 for the light between the light source 1004 and the incident surface 1010. Thus, the light emitted from the light source 1004 passes through the path generating portion 1023 of the light control member 1002 to be incident along the optical axis Ax1, which is tilted with respect to the first surface 1011, onto the incident surface 1010. That is to say, the light emitted from the light source 1004 is incident on the incident surface 1010 of the light guide member 1001 after having passed through the inside of the light control member 1002 (i.e., via the path generating portion 1023). The optical axis Ax1 of the light incident through the incident surface 1010 is tilted at a predetermined tilt angle with respect to the first surface 1011.

According to this configuration, the light entering the light guide member 1001 through the incident surface 1010 travels inside the light guide member 1001 to be obliquely incident on the first surface 1011. In other words, the light entering the light guide member 1001 through the incident surface 1010 is intentionally directed toward the first surface 1011. At this time, when the light beams are incident on the plurality of prisms 1003 provided on the first surface 1011, the light beams are reflected from the respective reflective surfaces 1030 of the prisms 1003 toward the second surface 1012 as shown in FIG. 10B. As a result, the light that has entered the light guide member 1001 through the incident surface 1010 travels along the direct optical path L10 to emerge from the second surface 1012.

As can be seen, the light incident through the incident surface 1010 comes closer toward the first surface 1011 as the light goes farther away from the incident surface 1010 i.e., as the light travels deeper inside the light guide member 1001. This increases the chances of the incoming light being incident on the first surface 1011 (including the prisms 1003). In other words, most of the light incident through the incident surface 1010 is more likely to be incident on the first surface 1011 before reaching the end surface 1013, facing the incident surface 1010, of the light guide member 1001. In particular, intentionally directing the incoming light toward the first surface 1011 allows most of the light incident through the incident surface 1010 to travel along the direct optical path L10 and emerge from the second surface 1012 while reducing the dimension in the Y-axis direction of the light guide member 1001. In other words, this enables the light to emerge efficiently from the second surface 1012 while reducing the leakage of the light from the end surface 1013. Consequently, this facilitates increasing the proportion of the light, traveling along the direct optical path L10 to emerge from the second surface 1012 out of the light guide member 1001, to the light that has been incident through the incident surface 1010, thus contributing to increasing the light extraction efficiency.

In addition, in this embodiment, the end surface 1013 is divided in the Z-axis direction into a sloped surface 1131 and a vertical surface 1132 as shown in FIG. 10A. In other words, the end surface 1013 includes the sloped surface 1131 and the vertical surface 1132. The sloped surface 1131 is a plane which is tilted with respect to the incident surface 1010 such that the distance in the Y-axis direction from the incident surface 1010 is longer in a portion thereof adjacent to the second surface 1012 than in another portion thereof adjacent to the first surface 1011. On the other hand, the vertical surface 1132 is a plane parallel to the incident surface 1010. In this case, the sloped surface 1131 is adjacent to the second surface 1012 and the vertical surface 1132 is adjacent to the first surface 1011.

Providing the end surface 1013 with such a sloped surface 1131 allows, even if any part of the light incident through the incident surface 1010 reaches the end surface 1013 without being incident on the first surface 1011, such light to emerge from the second surface 1012. That is to say, if part of the light incident through the incident surface 1010 is incident on the sloped surface 1131 of the end surface 1013, the light is totally reflected from the sloped surface 1131 toward the second surface 1012 and emerges from the second surface 1012. This enables effectively extracting, from the second surface 1012, not only the light emerging from the second surface 1012 out of the light guide member 1001 after having traveled along the direct optical path L10 but also even the light that has reached the end surface 1013, thus contributing to further increasing the light extraction efficiency.

(2.5) Shape Transformation Function

Next, the shape transformation function of each light control member 1002 will be described in detail with reference to FIG. 11 and FIGS. 17A-20B.

Specifically, in the optical system 1100 according to this embodiment, each light control member 1002 has the shape transformation function of transforming a shape projected onto a projection plane S1, which is parallel to an incident surface 1010, from a first shape F1 of the light emitted from its associated light source 1004 into a second shape F2 of the light incident on the incident surface 1010 as shown in FIG. 11. In FIG. 11, the shape (first shape F1), projected onto the projection plane S1, of the light emitted from the light source 1004 and the shape (second shape F2), projected onto the projection plane S1, of the light incident on the incident surface 1010 are schematically shown in balloons. As can be seen, the light control member 1002 according to this embodiment has not only the function of substantially collimating the light emitted from the light source 1004 into parallel rays but also the shape transformation function, i.e., the function of transforming the shape of the light projected onto the projection plane S1 (e.g., the incident surface 1010 in this embodiment).

The shape transformation function allows the light emitted from the light source 1004 to have its shape projected onto the projection plane S1 transformed from the first shape F1 into the second shape F2 before being incident on the incident surface 1010. The second shape F2 is a shape, to which the first shape F1 as its base shape has been transformed by the shape transformation function and which is different from the first shape F1. In this embodiment, for example, the first shape F1 is a circle-based shape, while the second shape F2 is a square-based shape, as shown in FIG. 11.

More specifically, the second shape F2 is formed by deforming the circle-based first shape F1 such that the first shape F1 is turned into a shape closer to a quadrangle by making at least one corner portion F21 thereof protruding. That is to say, the shape formed by expanding the first shape F1 in four directions is the second shape F2. Such a shape transformation function allows the first shape F1 to be approximated by an incircle of the second shape F2. Thus, the circumcircle of the second shape F2 is larger than the circumcircle of the first shape F1.

In other words, the second shape F2 is formed by adding at least one corner portion F21 to the first shape F1 to turn the first shape F1 into a shape closer to a polygon. Such a shape transformation function allows light, of which a projection (irradiation) area has the second shape F2 which is less round than the first shape F1, to be incident on the incident surface 1010. That is to say, this allows the light to be incident on an area around a corner of the incident surface 1010 as well, thus making the light incident more uniformly over the entire incident surface 1010.

In this embodiment, a plurality of light sources 1004 and a plurality of light control members 1002 are provided as described above. Therefore, each of the plurality of light control members 1002 transforms, through the shape transformation function, the shape of the light that has come from its associated light source 1004 and is going to be incident on the incident surface 1010, thus allowing the light to be incident more uniformly on the entire incident surface 1010. For example, if the light having the circle-based first shape F1 is incident on the incident surface 1010, two light beams incident on the incident surface 1010 from two adjacent light sources 1004 often leave a gap between themselves or overlap with each other. On the other hand, making light beams having the square-based second shape F2 incident on the incident surface 1010 reduces the chances of leaving such a gap or overlapping with each other between the light beams that have been incident on the incident surface 1010 from two adjacent light sources 1004.

Such a shape transformation function may be provided by, for example, the light control member 1002 having the following configuration.

Figure 17A:
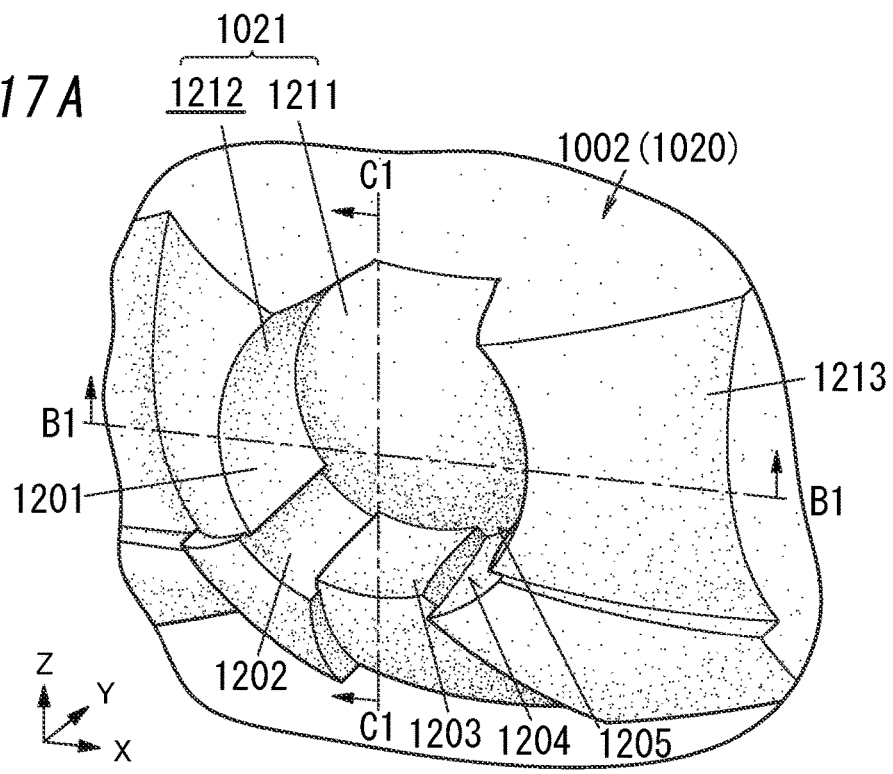
FIG. 17A is a perspective view illustrating the shape of the light control member.
Figure 17B:
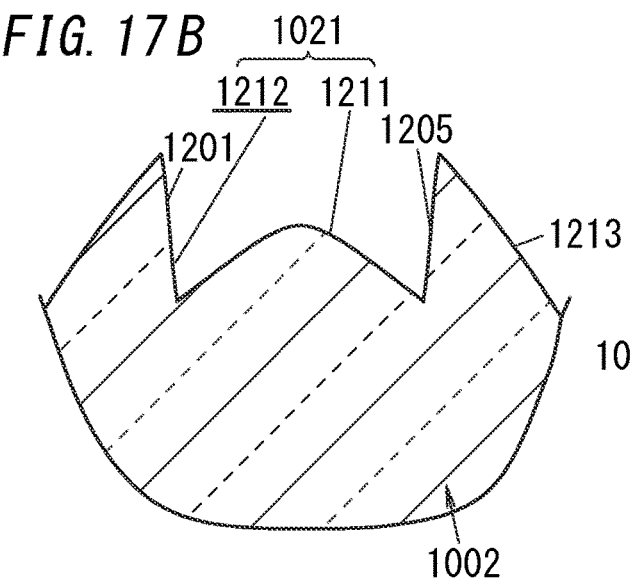
FIG. 17B is a cross-sectional view thereof taken along the plane B1-B1 shown in FIG. 17A.
Figure 17C:
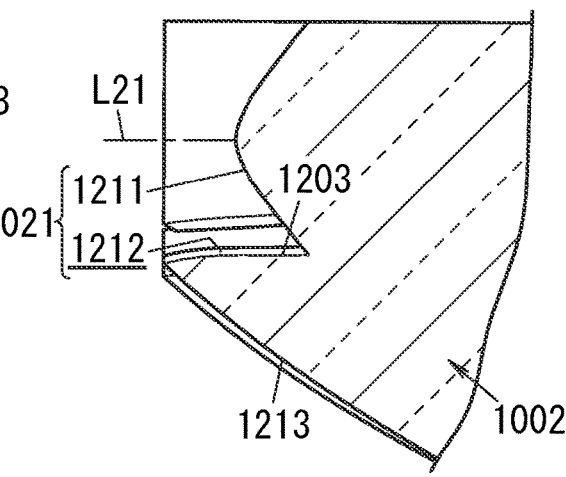
FIG. 17C is a cross-sectional view thereof taken along the plane C1-C1 shown in FIG. 17A.

Specifically, in this embodiment, the light control member 1002 (optical member 1020) includes an incident lens 1021 as shown in FIGS. 17A-17C. FIG. 17B is a cross-sectional view thereof taken along the plane B1-B1 shown in FIG. 17A. FIG. 17C is a cross-sectional view thereof taken along the plane C1-C1 shown in FIG. 17A.

The incident lens 1021 has a main incident surface 1211 and an auxiliary incident surface 1212. The main incident surface 1211 is arranged to face the light source 1004. The auxiliary incident surface 1212 is arranged to face toward a normal L21 to the main incident surface 1211 and located at least partially along a circumference of the main incident surface 1211. The auxiliary incident surface 1212 may be parallel to (i.e., not tilted), or tilted with respect to, the normal L21 to the main incident surface 1211.

In this case, the incident lens 1021 allows the light emitted from the light source 1004 to enter itself through the main incident surface 1211 and the auxiliary incident surface 1212. Thus, at least part of the light that has come from the light source 1004 is refracted, while passing through the incident lens 1021, by either the main incident surface 1211 or the auxiliary incident surface 1212 according to the angle of incidence defined by the light ray with respect to either the main incident surface 1211 or the auxiliary incident surface 1212. In this manner, the light control member 1002 refracts at least part of the light incident on either the main incident surface 1211 or the auxiliary incident surface 1212 to direct the incident light toward the incident surface 1010 of the light guide member 1001.

In addition, the light control member 1002 further has an outer peripheral surface 1213. The outer peripheral surface 1213 is located opposite from the normal L21 to the main incident surface 1211 with respect to the auxiliary incident surface 1212. The outer peripheral surface 1213 totally reflects, toward the incident surface 1010 of the light guide member 1001, the light that has entered the light control member 1002 through the auxiliary incident surface 1212. That is to say, at least part of the light that has entered the light control member 1002 through the auxiliary incident surface 1212 is totally reflected from the outer peripheral surface 1213 and thereby directed toward the incident surface 1010 of the light guide member 1001.

The light control member 1002 has a plurality of lens surfaces 1201-1205 on a counter surface thereof facing the light source 1004. As used herein, the "counter surface," i.e., a surface, facing the light source 1004, of the light control member 1002 is one of the surfaces, arranged face to face to the light source 1004, of the light control member 1002. In this embodiment, the counter surface, facing the light source 1004, of the light control member 1002 is defined by the incident lens 1021 out of the light control member 1002. As described above, the incident lens 1021 has the main incident surface 1211 and the auxiliary incident surface 1212. In this embodiment, the auxiliary incident surface 1212 may be divided into the plurality of lens surfaces 1201-1205, for example. The auxiliary incident surface 1212 is divided into the plurality (e.g., five in this example) of lens surfaces 1201-1205 along the circumference, defined around a counter axis with respect to the light source 1004, of the light control member 1002. As used herein, the "counter axis" refers to a virtual axis extending in the direction in which the light control member 1002 faces the light source 1004. That is to say, the counter axis of the light control member 1002 with respect to the light source 1004 is a virtual axis extending from the light control member 1002 in a direction in which the light control member 1002 and the light source 1004 face each other. In this embodiment, the counter axis of the light control member 1002 with respect to the light source 1004 may be, for example, the normal L21 (see FIG. 11) to the main incident surface 1211.

The tilt angle defined by the counter surface, facing the light source 1004, of the light control member 1002 with respect to the counter axis to the light source 1004 varies along the circumference defined around the counter axis. Specifically, the counter surface (e.g., the incident lens 1021 in this example), facing the light source 1004, of the light control member 1002 includes the plurality of lens surfaces 1201-1205 as described above. The tilt angles defined by the plurality of lens surfaces 1201-1205 with respect to the counter axis (e.g., the normal L21 in this example) are not constant along the circumference defined around the counter axis. Specifically, the tilt angles defined by the lens surfaces 1202, 1204 with respect to the counter axis are larger than the tilt angles defined by the lens surfaces 1201, 1203, 1205 with respect to the counter axis. In other words, the lens surfaces 1202, 1204 are configured to be tilted more significantly with respect to the normal L21 than the lens surfaces 1201, 1203, 1205 are.

In addition, the counter surface, facing the light source 1004, of the light control member 1002 has an asymmetric shape in one direction perpendicular to the counter axis (e.g., the normal L21 in this example) with respect to the light source 1004. In this embodiment, the incident lens 1021, defining the counter surface, facing the light source 1004, of the light control member 1002, has an asymmetric shape in the Z-axis direction. Specifically, when viewed from the main incident surface 1211, the incident lens 1021 has the auxiliary incident surface 1212 (including the lens surfaces 1202, 1203, 1204) only on one side in the Z-axis direction and is opened on the other side in the Z-axis direction.

According to the configuration described above, the shape transformation function may be provided by the light control member 1002 and the range in which the light that has entered the light guide member 1001 through the incident surface 1010 may reach inside the light guide member 1001 may be controlled without depending on the first shape F1 that is the shape of the light emitted from the light source 1004.

FIGS. 18A-20B illustrate the results of comparison between the light control member 1002 of the optical system 1100 according to this embodiment and a light control member 1002X according to a comparative example. In the light control member 1002X according to the comparative example, the auxiliary incident surface 1212 is not divided into the plurality of lens surfaces 1201-1205 but is a single continuous curved surface.

Figure 19A:
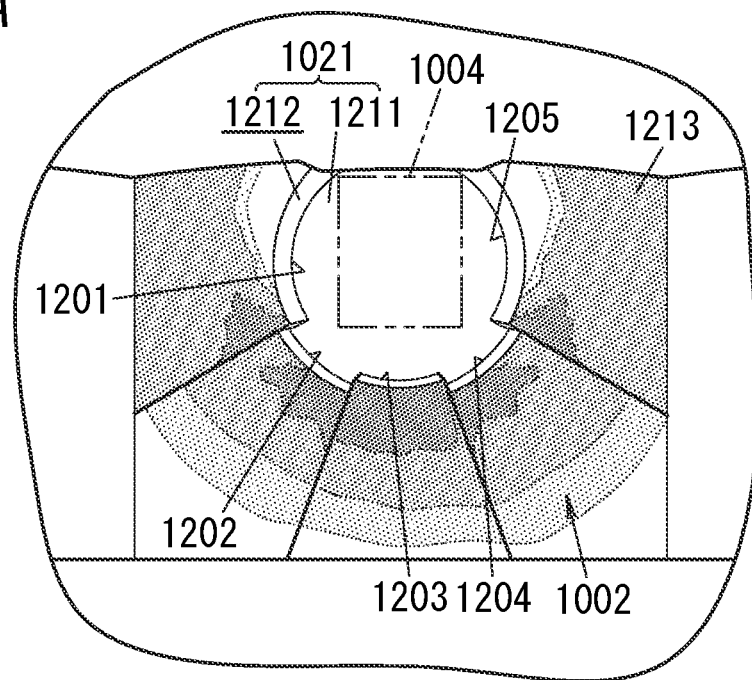
FIG. 19A illustrates a light intensity distribution of the light control member.
Figure 19B:
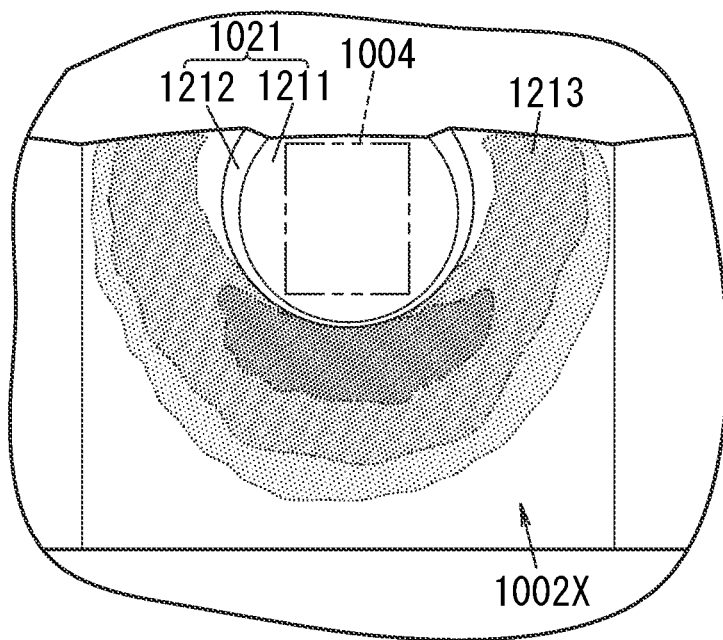
FIG. 19B illustrates a light intensity distribution of a light control member according to a comparative example.
Figure 20A:
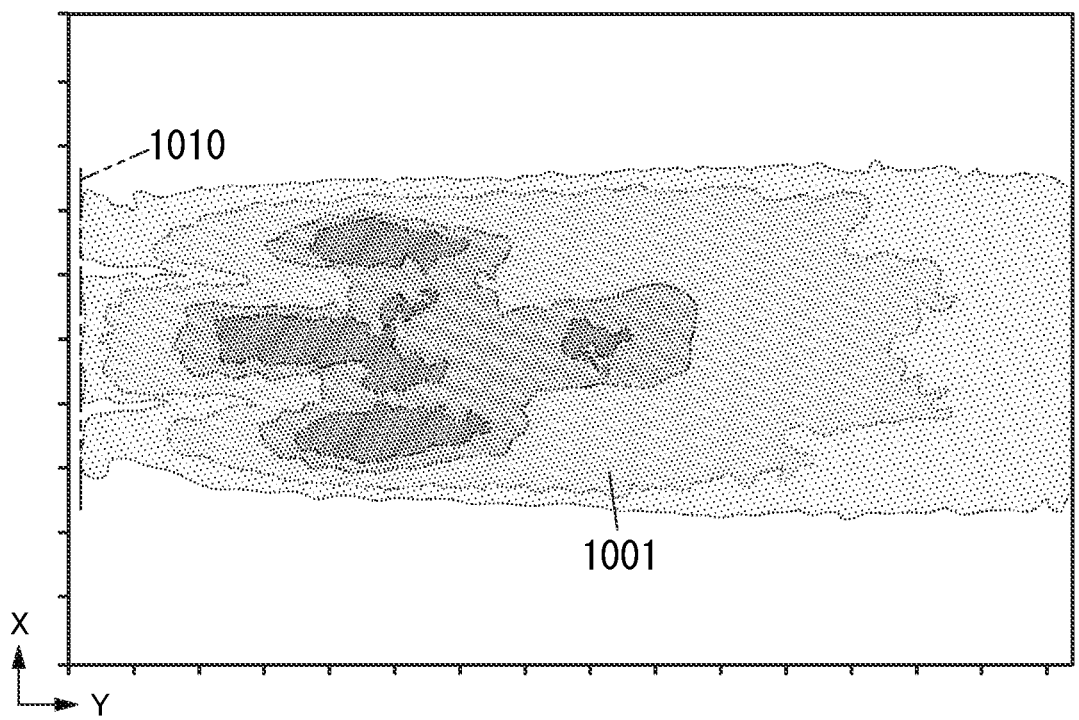
FIG. 20A illustrates a light intensity distribution in a light guide member as viewed from one end along its thickness in a situation where light is directed from the light control member toward a light guide member.
Figure 20B:
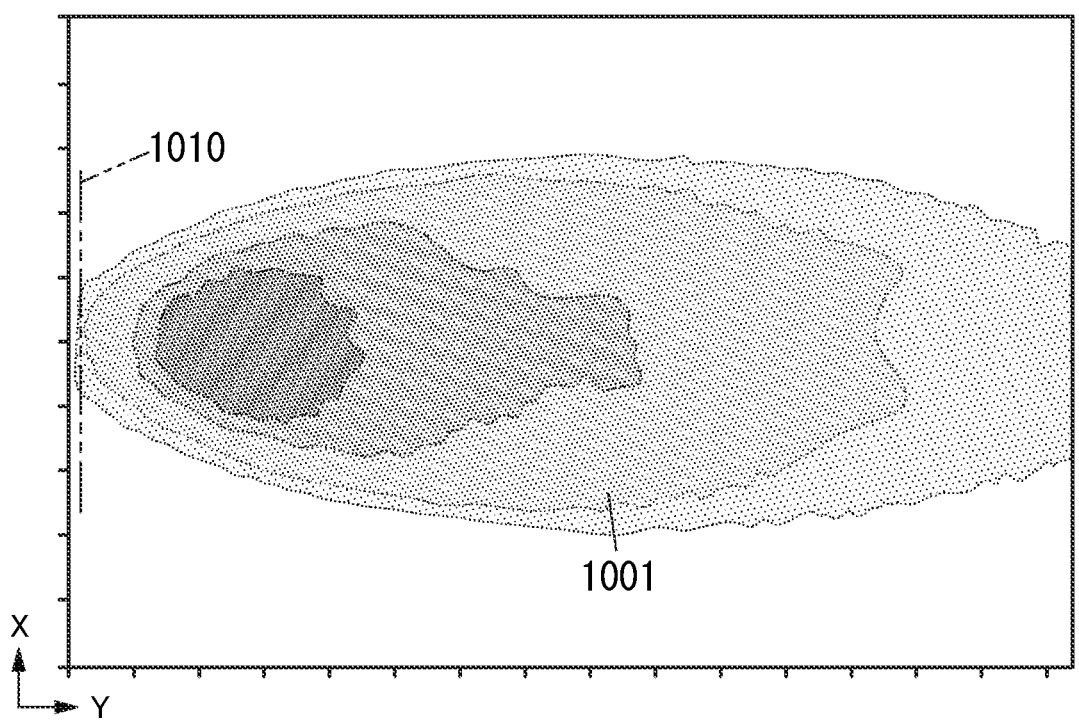
FIG. 20B illustrates a light intensity distribution in a light guide member as viewed from one end along its thickness in a situation where light is directed from a light control member according to a comparative example toward a light guide member.

In FIGS. 18A-20B, the range that the light emitted from the light source 1004 may reach is schematically indicated by shading (dots). In this case, there are three levels of shades, which are set according to the intensity of the light incident from the light source 1004. Specifically, the higher the intensity of the light incident from the light source 1004 is, the darker the shade is. FIG. 20A illustrates a light intensity distribution (more exactly, illuminance distribution) on the first surface 1011 as viewed from over the first surface 1011 along the thickness of the light guide member 1001 (i.e., Z-axis direction) in a situation where light has been directed from the light control member 1002 according to this embodiment toward the light guide member 1001. FIG. 20B illustrates a light intensity distribution (more exactly, illuminance distribution) on the first surface 1011 as viewed from over the first surface 1011 along the thickness of the light guide member 1001 (i.e., Z-axis direction) in a situation where light has been directed from the light control member 1002X according to a comparative example toward the light guide member 1001. FIGS. 20A and 20B each illustrate the light intensity distribution (illuminance distribution) of the light that has been incident on the light guide member 1001 from a single light control member 1002, 1002X.

Figure 18A:
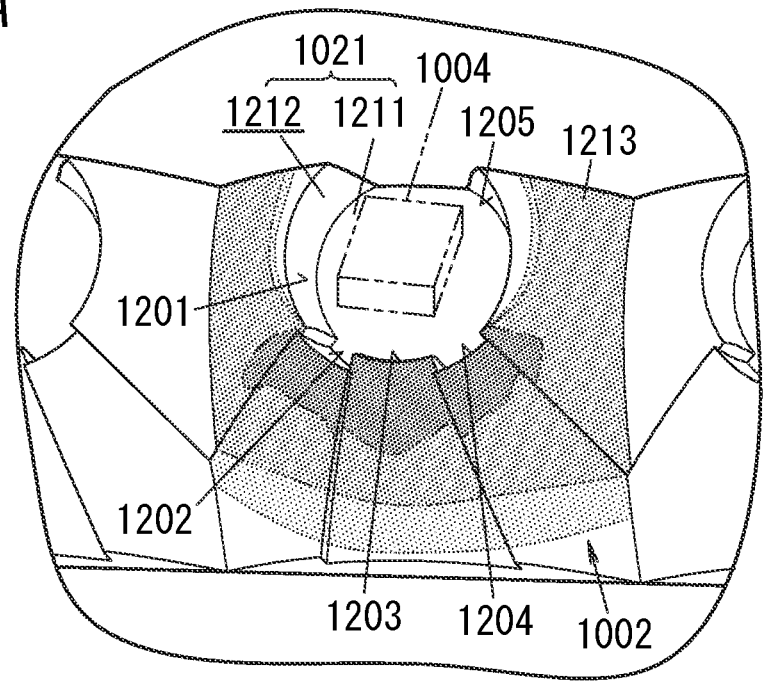
FIG. 18A illustrates a light intensity distribution of the light control member.

That is to say, in the light control member 1002 according to this embodiment, the light emitted from the light source 1004 is incident on the light control member 1002 through the incident lens 1021 and spread in a relatively broad range inside the light control member 1002 as shown in FIGS. 18A and 19A. In particular, according to the shape transformation function of the light control member 1002, the shape of the light projected onto the projection plane S1 (incident surface 1010) is transformed from the circle-based first shape F1 (see FIG. 11) into the square-based second shape F2 (see FIG. 11). Specifically, the light incident on the lens surface 1202, 1204 reaches, when viewed from one end of an extension of the normal L21 to the main incident surface 1211, a region more distant from the normal L21 than the light incident on the lens surface 1201, 1203, 1205 does. That is to say, the lens surface 1202, 1204 defines a larger tilt angle with respect to the counter axis (e.g., the normal L21 in this example) than the lens surface 1201, 1203, 1205 does. Thus, the light ray incident on the lens surface 1202, 1204 is refracted to define a larger tilt angle with respect to the normal L21. As a result, the light incident through the lens surface 1202, 1204 out of the auxiliary incident surface 1212 may reach as far as the corners of the light control member 1002.

Figure 18B:
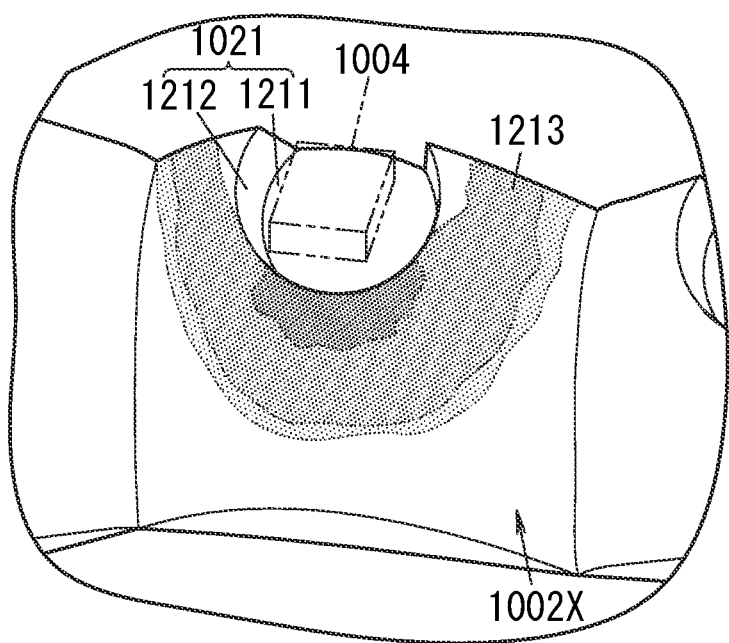
FIG. 18B illustrates a light intensity distribution of a light control member according to a comparative example.

Meanwhile, in the light control member 1002X according to the comparative example, the light emitted from the light source 1004 enters the light control member 1002X through the incident lens 1021 but stays in a relatively narrow range inside the light control member 1002X as shown in FIGS. 18B and 19B. Specifically, the light incident through the auxiliary incident surface 1212 spreads uniformly as viewed from one end of the extension of the normal L21 to the main incident surface 1211 and may reach only a certain range from the normal L21. As a result, the light incident through the auxiliary incident surface 1212 cannot reach as far as the corners of the light control member 1002X, and therefore, the range that the light may reach as viewed from one end of the extension of the normal L21 to the main incident surface 1211 is narrower than the light control member 1002 according to this embodiment.

Thus, the light control member 1002 according to this embodiment allows the light incident through the incident surface 1010 to spread in a relatively broad range inside the light guide member 1001 as shown in FIG. 20A. Meanwhile, the light control member 1002X according to the comparative example allows the light incident through the incident surface 1010 to reach a relatively narrow range inside the light guide member 1001 as shown in FIG. 20B. More specifically, the light control member 1002 according to this embodiment allows the light to reach a generally rectangular area when viewed from one end along the thickness of the light guide member 1001 (in the Z-axis direction) as shown in FIG. 20A. Meanwhile, the light control member 1002X according to the comparative example allows the light to reach a generally elliptical area when viewed from one end along the thickness of the light guide member 1001 (in the Z-axis direction) as shown in FIG. 20B. Consequently, in a situation where light enters the light guide member 1001 through a plurality of light control members 1002, this embodiment allows the light to reach the entire first surface 1011 more easily and allows the light to be extracted from the entire second surface 1012 more uniformly, than the comparative example.

(2.6) Asymmetric Shape

Next, the asymmetric shape of the light control member 1002 will be described in detail with reference to FIG. 11 and FIGS. 21A-21C.

Specifically, an optical member 1020 for use as the light control member 1002 in the optical system 1100 according to this embodiment includes the incident lens 1021 and an outlet portion 1022 as shown in FIG. 11. The optical member 1020 allows the light that has been incident on the incident lens 1021 from the light source 1004 to go out of the optical member 1020 itself from the outlet portion 1022. The incident lens 1021 has the main incident surface 1211 and the auxiliary incident surface 1212. The main incident surface 1211 is arranged to face the light source 1004. The auxiliary incident surface 1212 is directed toward the normal L21 to the main incident surface 1211 and located at least partially along the circumference of the main incident surface 1211. An optical axis Ax2 of the light source 1004 is tilted with respect to a normal L21 to the main incident surface 1211.

In the example shown in FIG. 11, the optical axis Ax2 of the light source 1004 is tilted toward the first surface 1011 by a tilt angle θ2 with respect to the normal L21 to the main incident surface 1211 when viewed from one end in the X-axis direction. In this case, the optical axis Ax2 of the light source 1004 and the normal L21 to the main incident surface 1211 are both parallel to a Y-Z plane. As used herein, the "Y-Z plane" refers to a plane including the Y-axis and the Z-axis and perpendicular to the X-axis. In other words, the optical axis Ax2 of the light source 1004 and the normal L21 to the main incident surface 1211 are both perpendicular to the X-axis.

More specifically, the optical axis Ax2 of the light source 1004 and the normal L21 to the main incident surface 1211 intersect with each other on the surface (light-emitting surface) of the light source 1004. In other words, the light source 1004 is arranged such that the center point of the light-emitting surface thereof is located on the normal L21 to the main incident surface 1211. Besides being arranged in this manner, the light source 1004 is also held to be tilted toward the first surface 1011 by the tilt angle θ2. This allows the light emitted from the light source 1004 to be incident onto the incident lens 1021 of the optical member 1020 asymmetrically with respect to the normal L21 to the main incident surface 1211.

Seeing things from another perspective, the light source 1004 has directivity. The light emitted from the light source 1004 has intensity that changes according to the direction as viewed from the light source 1004. For example, if the intensity of each light ray emitted from the light source 1004 is expressed by percentage with respect to the maximum intensity of a light ray emitted from the light source 1004 that is supposed to be 100%, then the light emitted from the light source 1004 includes light rays with various intensities such as 10%, 20%, and 30%. In the following description, a light ray on the optical axis Ax2 of the light source 1004 is supposed to have the maximum intensity (i.e., an intensity of 100%) and the intensity of a light ray is supposed to decrease as the angle defined with respect to the optical axis Ax2 increases.

Figures 21A, 21B, 21C:
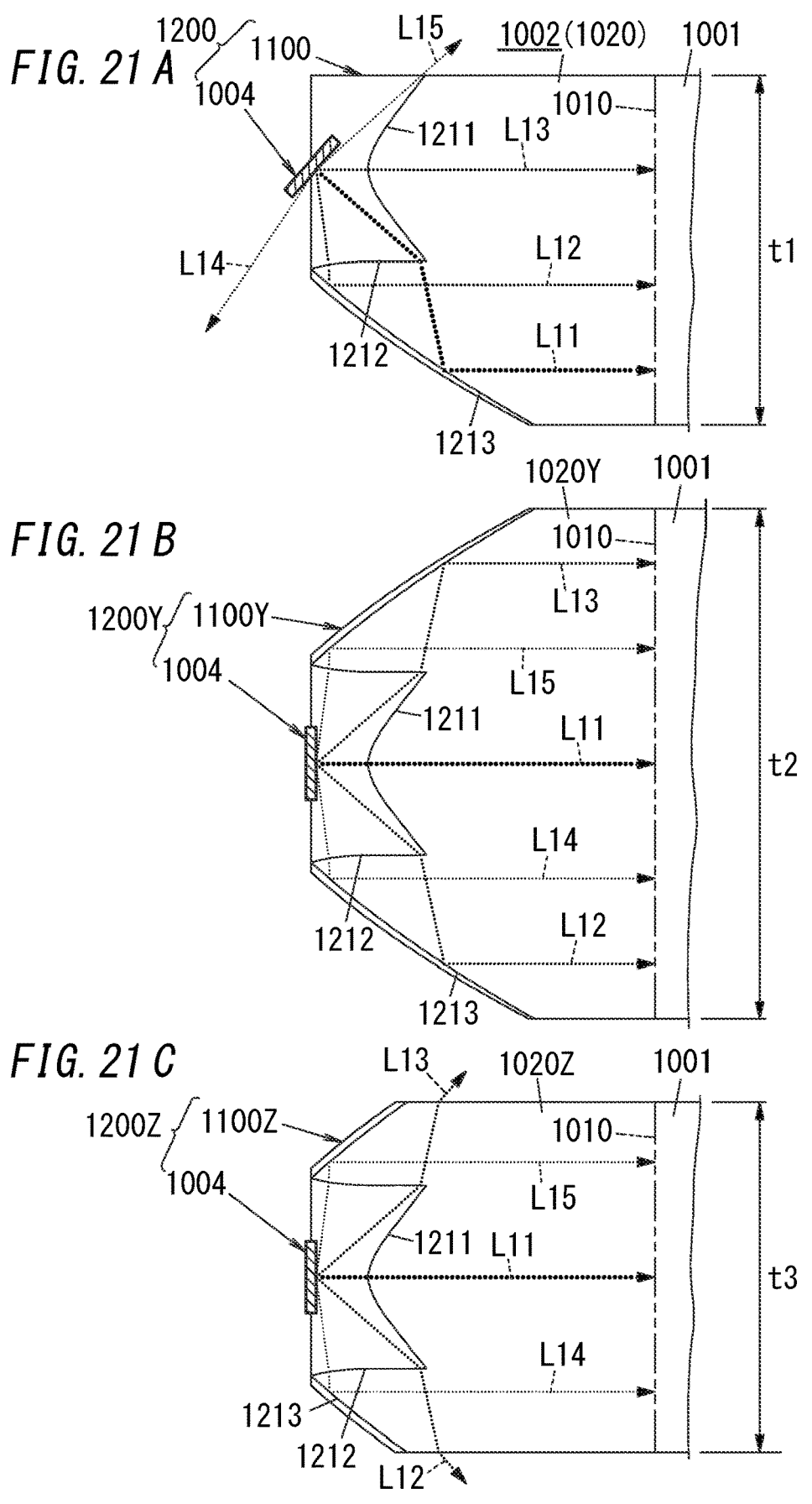

The light rays that have been incident on the incident lens 1021 from the light source 1004 include a principal ray L11, a first auxiliary ray L12, and a second auxiliary ray L13 as shown in FIG. 21A. Both the first auxiliary ray L12 and the second auxiliary ray L13 have a lower intensity than the principal ray L11. The principal ray L11, the first auxiliary ray L12, and the second auxiliary ray L13 are arranged in this order in a direction perpendicular to the normal L21 to the main incident surface 1211. The first auxiliary ray L12 and the second auxiliary ray L13 may have a lower intensity than the principal ray L11. For example, if the principal ray L11 has an intensity of 90%, then the first auxiliary ray L12 and the second auxiliary ray L13 may each have an intensity less than 90%. The first auxiliary ray L12 and the second auxiliary ray L13 may have the same intensity or mutually different intensities, whichever is appropriate.

Specifically, these light rays are arranged in the order of the principal ray L11, the first auxiliary ray L12, and the second auxiliary ray L13 from the first surface 1011 (i.e., from bottom to top in FIG. 21A) in the Z-axis direction perpendicular to the normal L21 to the main incident surface 1211. That is to say, the principal ray L11, the first auxiliary ray L12, and the second auxiliary ray L13 are arranged from the first surface 1011 in the descending order of their intensities.

In this embodiment, the intensity of the principal ray L11 is the maximum intensity among the light rays that have been incident on the incident lens 1021 from the light source 1004. That is to say, the intensity of the principal ray L11 is 100%. On the other hand, the intensities of the first auxiliary ray L12 and the second auxiliary ray L13 are both less than 100%. In this embodiment, the intensities of the first auxiliary ray L12 and the second auxiliary ray L13 are both supposed to be 70% as an example. That is to say, the first auxiliary ray L12 and the second auxiliary ray L13 have the same intensity.

Meanwhile, the light rays emitted from the light source 1004 include not only the principal ray L11, the first auxiliary ray L12, and the second auxiliary ray L13 but also a third auxiliary ray L14 and a fourth auxiliary ray L15 as well as shown in FIG. 21A. The third auxiliary ray L14 and the fourth auxiliary ray L15 each have a lower intensity than the first auxiliary ray L12 and the second auxiliary ray L13. The third auxiliary ray L14 and the fourth auxiliary ray L15 may have the same intensity or mutually different intensities, whichever is appropriate. In this embodiment, the intensities of the third auxiliary ray L14 and the fourth auxiliary ray L15 are both supposed to be 10% as an example. That is to say, the third auxiliary ray L14 and the fourth auxiliary ray L15 have the same intensity.

In the example illustrated in FIG. 21A, neither the third auxiliary ray L14 nor the fourth auxiliary ray L15 is incident on the optical member 1020. That is to say, neither the third auxiliary ray L14 nor the fourth auxiliary ray L15 reaches the incident surface 1010 of the light guide member 1001. Nevertheless, the third auxiliary ray L14 and the fourth auxiliary ray L15 have a much lower intensity than the principal ray L11, the first auxiliary ray L12, and the second auxiliary ray L13, and therefore, the loss caused by their failure to reach the incident surface 1010 is insignificant.

In addition, in this embodiment, the principal ray L11 is also incident on the auxiliary incident surface 1212. That is to say, the principal ray L11 is incident on the auxiliary incident surface 1212, out of the main incident surface 1211 and the auxiliary incident surface 1212 of the incident lens 1021. The principal ray L11 incident on the auxiliary incident surface 1212 is refracted by the auxiliary incident surface 1212 and totally reflected by the outer peripheral surface 1213 toward the incident surface 1010 as shown in FIG. 21A. As a result, the principal ray L11 is directed toward the incident surface 1010 via the outlet portion 1022.

In addition, the auxiliary incident surface 1212 has an asymmetric shape with respect to the normal L21 to the main incident surface 1211. In this embodiment, the incident lens 1021 has an asymmetric shape in the Z-axis direction. Specifically, the incident lens 1021 has the auxiliary incident surface 1212 (including the lens surfaces 1202, 1203, 1204) only on one side in the Z-axis direction and is opened on the other side in the Z-axis direction as viewed from the main incident surface 1211.

That is to say, light rays with relatively high intensities, including the principal ray L11, the first auxiliary ray L12, and the second auxiliary ray L13, are concentrated toward the first surface 1011 (i.e., the lower part in FIG. 21A) of the optical member 1020 (light control member 1002) as viewed from the normal L21 to the main incident surface 1211. Thus, adopting an asymmetric shape in which the incident lens 1021 is aggregated in only such a part where the light rays with relatively high intensities are concentrated and in which the opposite part (i.e., the upper part in FIG. 21A) is simplified for the optical member 1020 (light control member 1002) allows the dimension t1 in the Z-axis direction to be reduced easily.

On the other hand, FIG. 21B illustrates, as a comparative example, an optical system 1100Y including an optical member 1020Y and an illumination system 1200Y including the optical system 1100Y. In the illumination system 1200Y according to this comparative example, the optical member 1020Y has a symmetric shape, in the Z-axis direction, with respect to the normal L21 to the main incident surface 1211. Specifically, the optical member 1020Y is formed by adopting, for the opposite part (i.e., the upper part in FIG. 21A), a configuration symmetric to that of the part closer to the first surface 1011 (i.e., the lower part shown in FIG. 21A) of the optical member 1020 according to this embodiment as viewed from the normal L21 to the main incident surface 1211.

Furthermore, in the illumination system 1200Y according to the comparative example, the optical axis Ax2 of the light source 1004 is located on the normal L21 to the main incident surface 1211. That is to say, in the comparative example, the optical axis Ax2 of the light source 1004 is parallel to the normal L21 to the main incident surface 1211.

In such a comparative example, the principal ray L11 is located on the optical axis Ax2 of the light source 1004 as shown in FIG. 21B. In addition, in the Z-axis direction, the third auxiliary ray L14 and the fourth auxiliary ray L15 are located on both sides of the principal ray L11, and the first auxiliary ray L12 and the second auxiliary ray L13 are located on both sides of the third auxiliary ray L14 and the fourth auxiliary ray L15, respectively. As a result, in the illumination system 1200Y according to this comparative example, light rays with relatively high intensities, including the principal ray L11, the first auxiliary ray L12, and the second auxiliary ray L13, are all incident on the incident surface 1010 of the light guide member 1001. Nevertheless, the optical member 1020Y according to this comparative example adopts such a shape that is symmetric in the Z-axis direction, and therefore, its dimension t2 in the Z-axis direction is larger than the dimension t1 of the optical member 1020 according to this embodiment.

On the other hand, FIG. 21C illustrates, as another comparative example, an optical system 1100Z including a different optical member 1020Z and an illumination system 1200Z including such an optical system 1100Z. In the illumination system 1200Z according to this comparative example, the optical member 1020Z has a smaller dimension in the Z-axis direction than the optical member 1020Y according to the comparative example by removing both end portions thereof in the Z-axis direction. The dimension t3 in the Z-axis direction of this optical member 1020Z is the same as the dimension t1 of the optical member 1020 according to this embodiment.

Furthermore, in the illumination system 1200Z according to this comparative example, the optical axis Ax2 of the light source 1004 is located on the normal L21 to the main incident surface 1211. That is to say, in this comparative example, the optical axis Ax2 of the light source 1004 is parallel to the normal L21 to the main incident surface 1211.

In such a comparative example, the principal ray L11 is located on the optical axis Ax2 of the light source 1004 as shown in FIG. 21C. In addition, the third auxiliary ray L14 and the fourth auxiliary ray L15 are located on both sides of the principal ray L11 in the Z-axis direction. Nevertheless, the first auxiliary ray L12 and the second auxiliary ray L13 will leak out of the optical member 1020Z and fail to be incident on the incident surface 1010 of the light guide member 1001. As a result, in the illumination system 1200Z according to this comparative example, light rays with relatively high intensities, including the first auxiliary ray L12 and the second auxiliary ray L13, are not incident on the incident surface 1010 of the light guide member 1001, thus resulting a much lower light extraction efficiency than this embodiment.

As can be seen from the foregoing description, the optical member 1020 according to this embodiment contributes to increasing the light harvesting efficiency thereof while reducing its overall size, compared to the comparative examples shown in FIGS. 21B and 21C.

(2.7) Luminous Intensity Distribution Control Member

Next, the luminous intensity distribution control member 1014 will be described in detail with reference to FIG. 12.

Specifically, in this embodiment, at least one of the first surface 1011 or the second surface 1012, 1012A includes the luminous intensity distribution control member 1014. The luminous intensity distribution control member 1014 controls a luminous intensity distribution of the light extracted from the second surface 1012, which is a light emergent surface. In this embodiment, the luminous intensity distribution control member 1014 may be provided for the second surface 1012, for example. In addition, in this embodiment, the luminous intensity distribution control member 1014 is formed integrally with the light guide member 1001 and provided as an integrally molded product. That is to say, in this embodiment, the light guide member 1001 and the luminous intensity distribution control member 1014 form an integrally molded product and are inseparable from each other.

In short, in this embodiment, the light guide member 1001 includes the direct optical path L10 that allows the light that has entered the light guide member 1001 through the incident surface 1010 to be reflected only once from the prism 1003 inside the light guide member 1001 before emerging from the second surface 1012 out of the light guide member 1001. Thus, the shapes of the first surface 1011 and the second surface 1012 do not contribute to guiding the light inside the light guide member 1001. Therefore, even if the luminous intensity distribution control member 1014 is provided on the first surface 1011 or the second surface 1012, the light guiding performance of the light guide member 1001 hardly deteriorates.

Specifically, the luminous intensity distribution control member 1014 according to this embodiment includes a lens. That is to say, the luminous intensity distribution control member 1014 has the function of a lens serving as an optical element that causes incoming light to either diverge or converge by refracting the light. This allows the luminous intensity distribution control member 1014 to control the luminous intensity distribution of the light extracted from the second surface 1012 as an emergent surface by causing the light to either diverge or converge by refracting the light.

More specifically, the luminous intensity distribution control member 1014 includes a multi-lens as a group of a plurality of small lenses 1141. In this embodiment, each of the plurality of small lenses 1141 is configured in a semicircular columnar shape. The plurality of such small lenses 1141 are arranged side by side in the X-axis direction. In this embodiment, the plurality of small lenses 1141 are formed to cover the entire second surface 1012 with no gaps left between themselves. The multi-lens having such a shape as a group of a plurality of small lenses 1141 constitutes a so-called "cylindrical lens."

(3) Variations

Note that the second embodiment described above is only an exemplary one of various embodiments of the present disclosure and should not be construed as limiting. Rather, the second embodiment may be readily modified in various manners depending on a design choice or any other factor without departing from the scope of the present disclosure. The drawings referred to in the foregoing description of the second embodiment are all schematic representations. That is to say, the ratio of the dimensions (including thicknesses) of respective constituent elements illustrated on the drawings does not always reflect their actual dimensional ratio.

Next, variations of the second embodiment will be enumerated one after another. Note that any the variations to be described below may be adopted as appropriate in combination with the second embodiment described above.

(3.1) First Variation

Figure 22A:
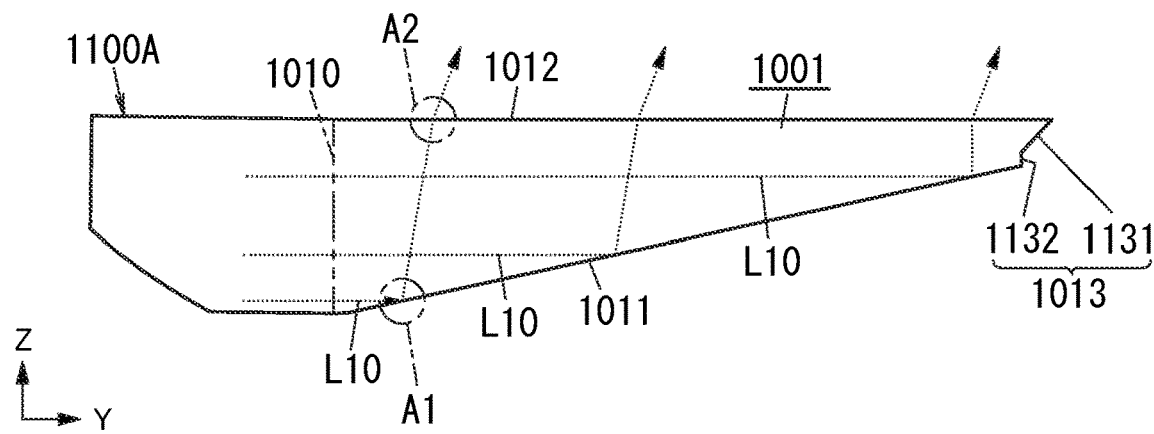
FIG. 22A is a side view indicating an outline of an optical system according to a first variation of a second embodiment.
Figure 22B:
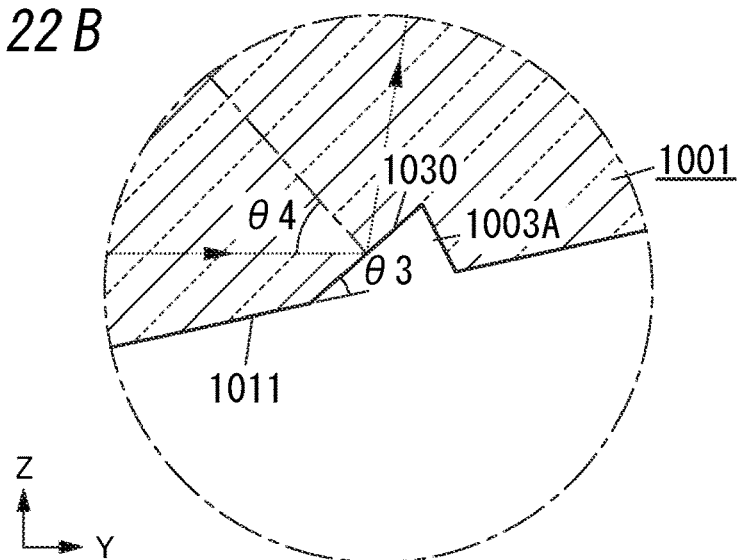
FIG. 22B is a schematic representation illustrating, on a larger scale, the region A1 shown in FIG. 22A.
Figure 22C:
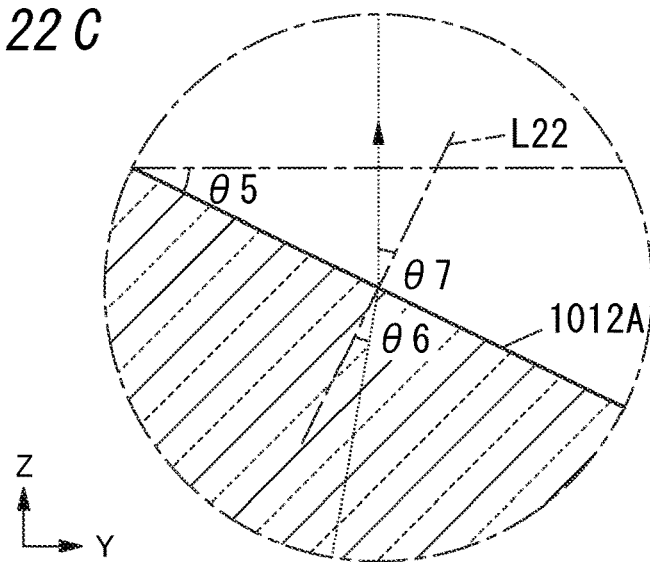
FIG. 22C is a schematic representation illustrating, on a larger scale, the region A2 shown in FIG. 22A.

In an optical system 1100A according to a first variation, the tilt angle θ3 defined by a reflective surface 1030 of a prism 1003A with respect to the first surface 1011 is different from the optical system 1100 according to the second embodiment as shown in FIGS. 22A-22C.

Specifically, the tilt angle θ3 defined by the reflective surface 1030 of the prism 1003A with respect to the first surface 1011 is smaller than the maximum angle of reflection when the light incident through the incident surface 1010 is totally reflected toward the second surface 1012 by the direct optical path L10 as shown in FIG. 22B. In other words, the tilt angle θ3 of the reflective surface 1030 of the prism 1003A according to this variation is smaller than the tilt angle θ1 of the reflective surface 1030 of the prism 1003 according to the second embodiment (see FIG. 10B). This reduces, even if the angle of incidence θ4 of the light incident on the reflective surface 1030 varies to a certain degree, the chances of the angle of incidence θ4 being smaller than a critical angle. That is to say, this increases, even if the angle of incidence θ4 of the light incident on the reflective surface 1030 varies to a certain degree, the chances of the light incident on the reflective surface 1030 being totally reflected from the reflective surface 1030. As a result, this reduces the light transmitted through the reflective surface 1030 and leaking out of the light guide member 1001, thus contributing to increasing the light extraction efficiency.

Nevertheless, according to this variation, the light ray incident on the second surface 1012 after having traveled along the direct optical path L10 follows an optical path tilted with respect to the Z-axis. As a result, the light emerging from the second surface 1012 is not perpendicular to the second surface 1012 (i.e., does not travel in the Z-axis direction) but tilted with respect to a normal to the second surface 1012 as shown in FIG. 22A.

Thus, the normal L22 to the second surface 1012A may be tilted as shown in FIG. 22C with respect to the optical axis of the light incident on the second surface 1012A after having traveled along the direct optical path L10. In the example illustrated in FIG. 22C, the second surface 1012A is a plane not parallel to, but tilted by the angle θ5 with respect to, the X-Y plane. In this case, the second surface 1012A is tilted with respect to the X-Y plane to come closer toward the first surface 1011 as the distance from the incident surface 1010 increases. This makes the normal L22 to the second surface 1012A tilted with respect to the optical axis of the light incident on the second surface 1012A after having traveled along the direct optical path L10. This causes the light ray incident on the second surface 1012A after having traveled along the direct optical path L10 to be refracted by the second surface 1012A and emerge in a direction perpendicular to the X-Y plane. That is to say, the light incident on the second surface 1012A at the angle of incidence θ6 emerges from the second surface 1012A at an angle of emergence θ7 (>θ6).

(3.2) Second Variation

Figure 23A:
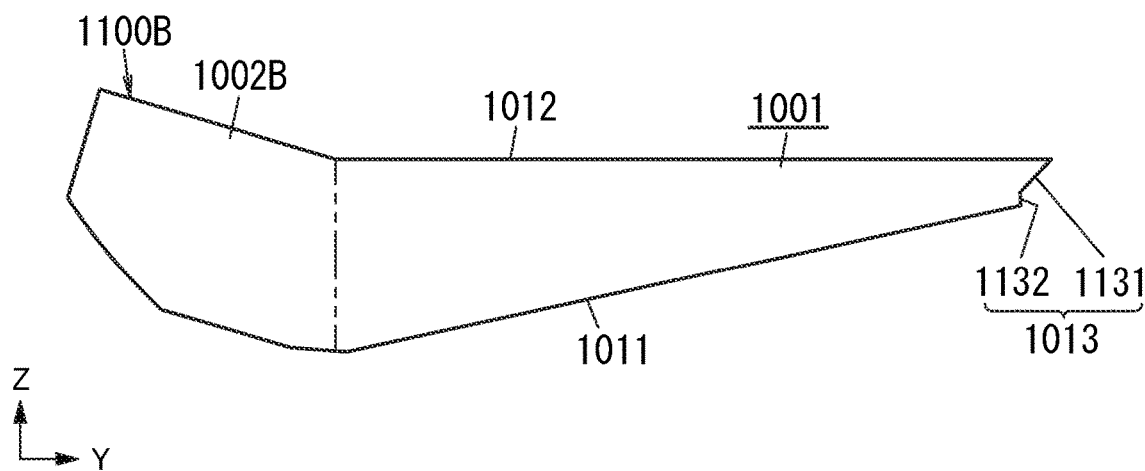
FIG. 23A is a side view indicating an outline of an optical system according to a second variation of the second embodiment.
Figure 23B:
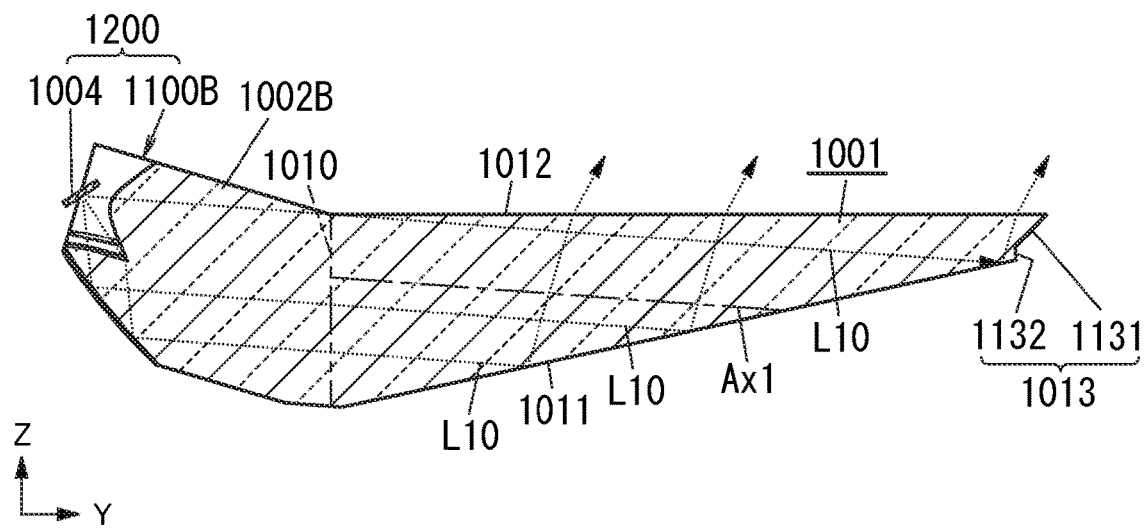
FIG. 23B is a cross-sectional view indicating the outline of the optical system.

In an optical system 1100B according to a second variation, the light control member 1002B thereof is tilted in its entirety with respect to the light guide member 1001 as shown in FIGS. 23A and 23B, which is a major difference from the optical system 1100 according to the second embodiment.

Specifically, to provide the configuration that has been described in the "(2.4) Obliquely incident light" section, the optical axis Ax1 of the light entering the light guide member 1001 through the incident surface 1010 may be tilted with respect to the first surface 1011 such that the gap distance between the optical axis Ax1 and the first surface 1011 narrows as the distance from the incident surface 1010 increases. According to this variation, both surfaces along the thickness (i.e., in the Z-axis direction) of the light control member 1002B are tilted with respect to the light guide member 1001, thus making the light control member 1002B tilted in its entirety with respect to light guide member 1001. Even such a configuration may also contribute to increasing the proportion of the light emerging from the second surface 1012 out of the light guide member 1001 after having traveled along the direct optical path L10 with respect to the light incident through the incident surface 1010, thus contributing to increasing the light extraction efficiency.

In particular, according to this variation, the optical axis Ax1 of the light entering the light guide member 1001 through the incident surface 1010 is tilted with respect to not only the first surface 1011 but also the second surface 1012 as shown in FIG. 23B. In this case, the optical axis Ax1 is tilted with respect to the second surface 1012 such that the gap distance between the optical axis Ax1 and the second surface 1012 widens as the distance from the incident surface 1010 increases. Making the optical axis Ax1 tilted with respect to the second surface 1012 in this manner reduces the chances of the light incident on the incident surface 1010 reaching an end surface 1013 as shown in FIG. 23B. As a result, this allows the light to efficiently emerge from the second surface 1012 while reducing the leakage of light from the end surface 1013.

In addition, in this variation, the light does not emerge from the second surface 1012 perpendicularly to the second surface 1012 (i.e., does not travel in the Z-axis direction) but emerges obliquely to a normal to the second surface 1012 as shown in FIG. 23B. That is to say, in this variation, the light ray incident on the second surface 1012 after having traveled along the direct optical path L10 follows the optical path tilted with respect to the Z-axis as in the first variation shown in FIG. 22A, and therefore, is incident obliquely onto the second surface 1012.

As can be seen, the light emerging from the second surface 1012 after having traveled along the direct optical path L10 does not have to be perpendicular to the second surface 1012 but may be tilted to an appropriate degree with respect to a normal to the second surface 1012. Furthermore, the direction of the light emerging from the second surface 1012 after having traveled along the direct optical path L10 may or may not be uniform over the entire second surface 1012. If the direction of the light emerging from the second surface 1012 is not uniform over the entire second surface 1012, then the light will emerge in a different direction from one area of the second surface 1012 to another.

Particularly when the optical system 1100B including the light guide member 1001 is applied to a head-up display to be installed in a moving vehicle B1, the luminous intensity distribution of the light emerging from the light guide member 1001 is suitably controlled according to the optical system 1320 as described above. In other words, the light emerging from the optical system 1100B is suitably spread within the range of the light incident on the optical system 1320 according to the type of the optical system 1320. That is to say, the emergent light suitably has a narrow viewing angle (i.e., has a high degree of directivity) in each part of the second surface 1012 that is the emergent surface of the light guide member 1001 according to the type of the optical system 1320. Meanwhile, the direction of the emergent light suitably varies according to the type of the optical system 1320 from one area of the second surface 1012 that is an emergent surface of the light guide member 1001 to another.

Nevertheless, this does not mean that the light emerging from the second surface 1012 after having traveled along the direct optical path L10 is tilted with respect to a normal to the second surface 1012 on the premise that the optical axis Ax1 is tilted with respect to the second surface 1012. That is to say, even when the optical axis Ax1 is parallel to the second surface 1012 as in the second embodiment, the light emerging from the second surface 1012 after having traveled along the direct optical path L10 may also be tilted to an appropriate degree with respect to the normal to the second surface 1012. Conversely, even when the optical axis Ax1 is tilted with respect to the second surface 1012, the light emerging from the second surface 1012 after having traveled along the direct optical path L10 may also be perpendicular to the second surface 1012.

(3.3) Third Variation

Figure 24:
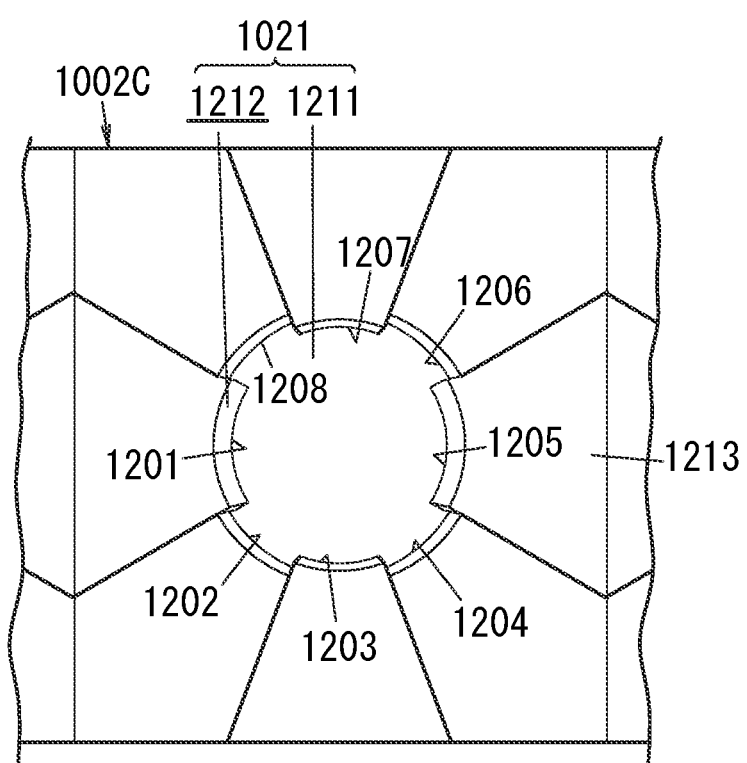
FIG. 24 is a front view indicating an outline of a light control member according to a third variation of the second embodiment.

A light control member 1002C according to a third variation has a symmetric shape in the thickness direction (Z-axis direction) as shown in FIG. 24, which is a major difference from the optical system 1100 according to the second embodiment.

Specifically, in this variation, a counter surface, facing the light source 1004, of the light control member 1002C has a shape symmetric in one direction (Z-axis direction) perpendicular to the counter axis (e.g., the normal L21 to the main incident surface 1211 in this variation) with respect to the light source 1004. That is to say, the incident lens 1021, defining the counter surface, facing the light source 1004, of the light control member 1002C has a symmetric shape. Specifically, the incident lens 1021 has an auxiliary incident surface 1212 along the entire circumference of the main incident surface 1211. The auxiliary incident surface 1212 is divided into a plurality of (e.g., eight in this variation) lens surfaces 1201-1208.

(3.4) Fourth Variation

In an illumination system 1200 including the optical system 1100 according to a fourth variation, the illumination system 1200 is arranged parallel to the display 1005 as shown in FIGS. and 25B, which is a major difference from the illumination system 1200 according to the second embodiment.

Figure 25A:
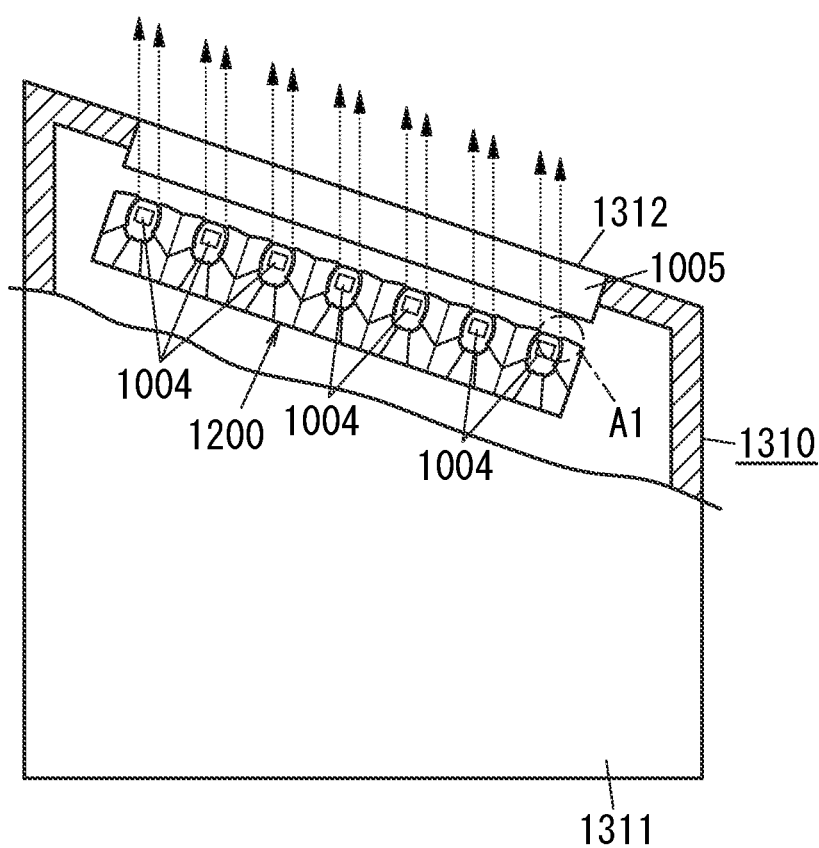
FIG. 25A illustrates an illumination system that uses an optical system according to a fourth variation of the second embodiment.
Figure 25B:
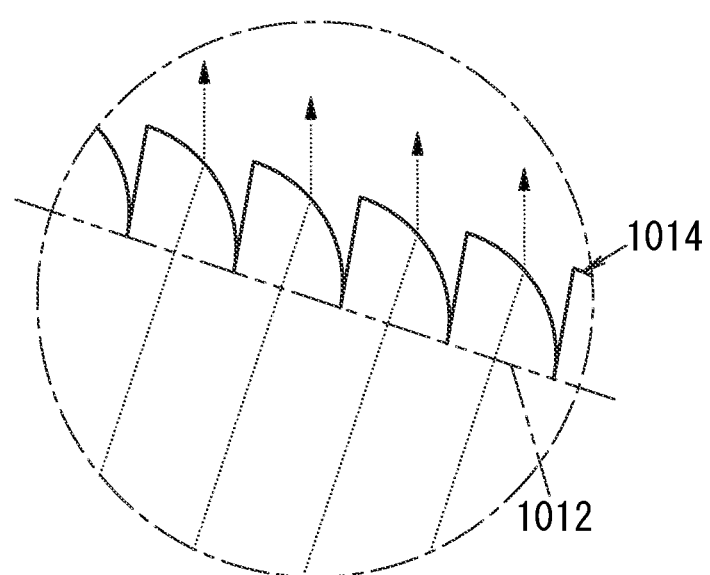
FIG. 25B is a schematic representation illustrating, on a larger scale, the region A1 shown in FIG. 25A.

Specifically, in this variation, the second surface 1012, serving as the emergent surface of the illumination system 1200, of the light guide member 1001 is arranged parallel to the back surface of the display 1005. Nevertheless, in such an arrangement, the second surface 1012 is tilted with respect to a horizontal plane. Thus, the light emerging straight from the second surface 1012 will emerge obliquely upward from the image display unit 1310 as shown in FIG. Thus, the shape of the luminous intensity distribution control member 1014 provided for the second surface 1012 is suitably changed as shown in FIG. 25B to allow the luminous intensity distribution control member 1014 to control the luminous intensity distribution of the light emerging from the second surface 1012. That is to say, the luminous intensity distribution control member 1014 shown in FIG. 25B allows the light emerging from the second surface 1012 to go straight upward from the image display unit 1310.

(3.5) Fifth Variation

Figure 26A:
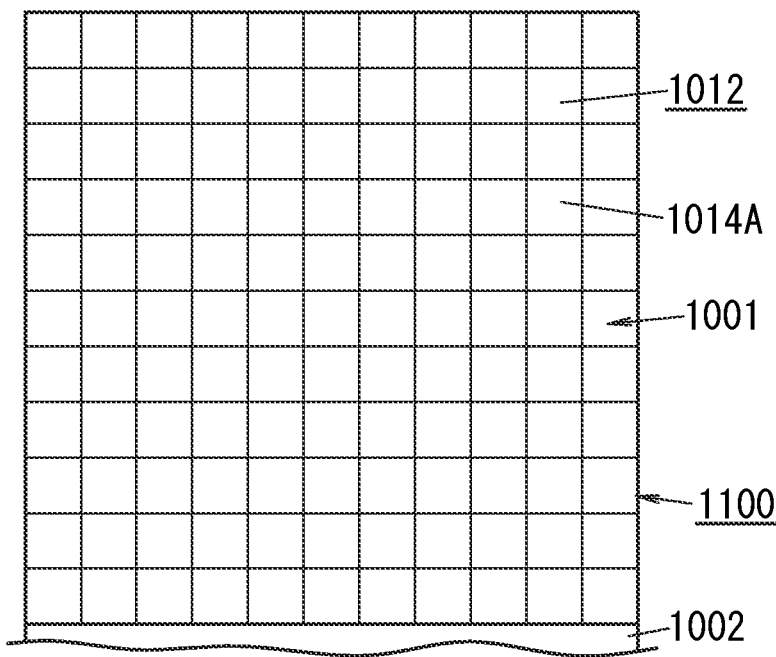
FIG. 26A is a plan view of a main part illustrating an exemplary optical system according to a fifth variation of the second embodiment.
Figure 26B:
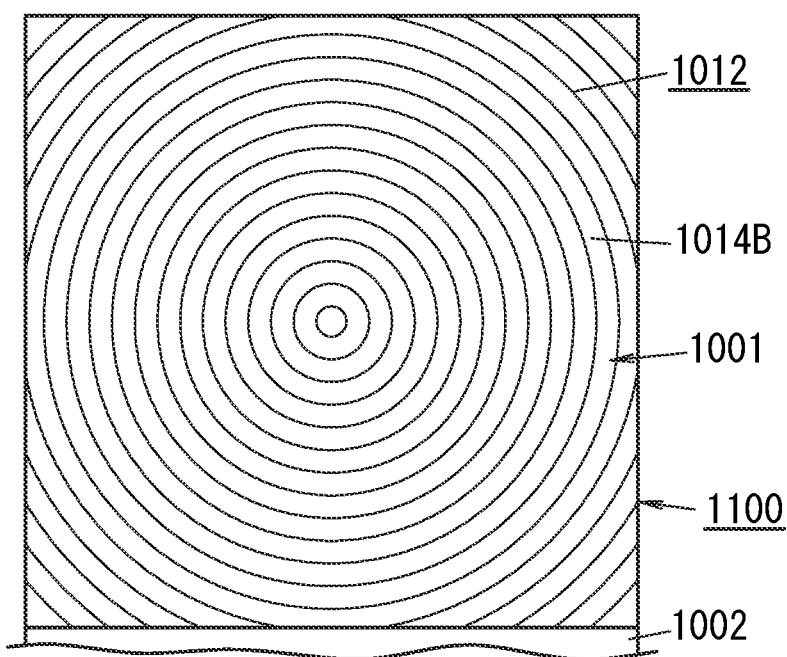
FIG. 26B is a plan view of a main part illustrating another exemplary optical system according to the fifth variation.

In an optical system 1100 according to a fifth variation, a luminous intensity distribution control member 1014A (or 1014B) has a different configuration as shown in FIGS. 26A and 26B from the counterpart of the optical system 1100 according to the second embodiment.

In the example shown in FIG. 26A, the luminous intensity distribution control member 1014A includes a lens array. As used herein, the lens array refers to a type of multi-lens as a group of multiple small lenses. In the luminous intensity distribution control member 1014 A, a plurality of small lenses are arranged in matrix such that a plurality of small lenses are arranged both vertically (i.e., in the Y-axis direction) and horizontally (in the X-axis direction) on the second surface 1012. Each of the plurality of small lenses may be either a convex lens or a concave lens, whichever is appropriate.

In the example shown in FIG. 26B, the luminous intensity distribution control member 1014B includes a Fresnel lens. As used herein, the Fresnel lens refers to a lens, of which the height of the protrusion (or the depth of the recess) is reduced to a low level by dividing a single lens into a plurality of concentric regions. In this variation, the luminous intensity distribution control member 1014B is configured as a Fresnel lens formed by dividing a convex lens into a plurality of concentric regions around the center of the second surface 1012.

(3.6) Sixth Variation

In an optical system 1100 according to a sixth variation, the prism 1003B, 1003C, 1003D, 1003E, 1003F, 1003G has a different shape as shown in FIGS. 27A-29B from its counterpart of the optical system 1100 according to the second embodiment.

Figure 27A:
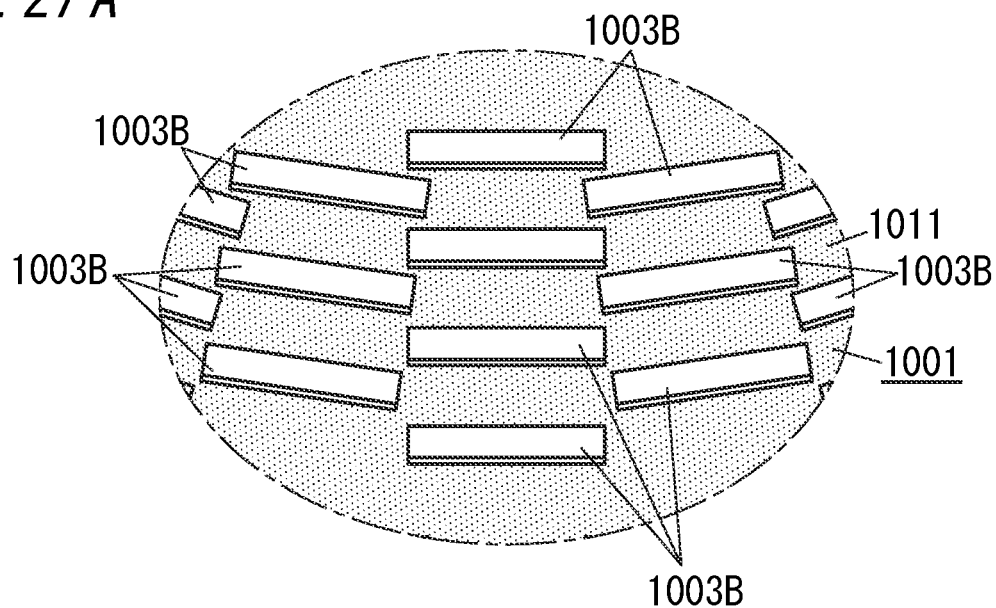
FIG. 27A is a schematic representation illustrating an exemplary prism according to a sixth variation of the second embodiment.

In the example shown in FIG. 27A, the plurality of prisms 1003B are arranged side by side to draw an arc-shaped curve when viewed from one end in the Z direction. In this variation, the plurality of prisms 1003B are arranged to draw an arc-shaped curve, which is convex in the direction pointing away from the incident surface 1010. That is to say, in this variation, at least some of the prisms 1003B are tilted with respect to the incident surface 1010 when viewed in the direction in which the first surface 1011 and the second surface 1012 are arranged one on top of the other (i.e., in the Z-axis direction).

Figure 27B:
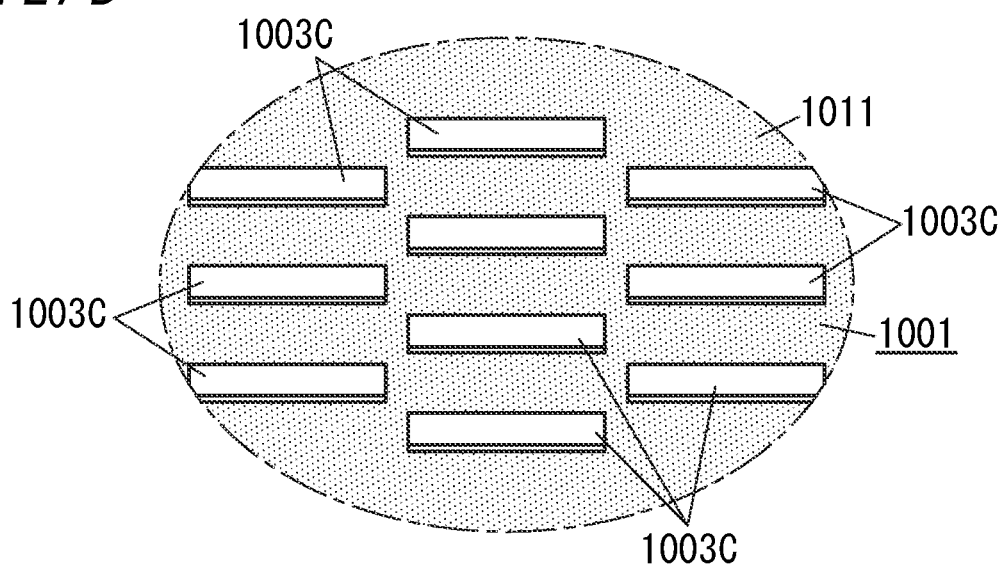
FIG. 27B is a schematic representation illustrating another exemplary prism according to the sixth variation.

In the example shown in FIG. 27B, a plurality of prisms 1003C included in even-numbered banks and a plurality of prisms 1003C included in odd-numbered banks are arranged such that their longitudinal ends (i.e., their ends in the X-axis direction) do not overlap with each other in the Y-axis direction. According to such an arrangement, when viewed from the incident surface 1010, the plurality of prisms 1003C are arranged with a narrow gap left between themselves in the X-axis direction. Optionally, the plurality of prisms 1003C arranged in this pattern may also be arranged to draw an arc-shaped curve when viewed from one end in the Z-axis direction as in the example shown in FIG. 27A.

Figure 28A:
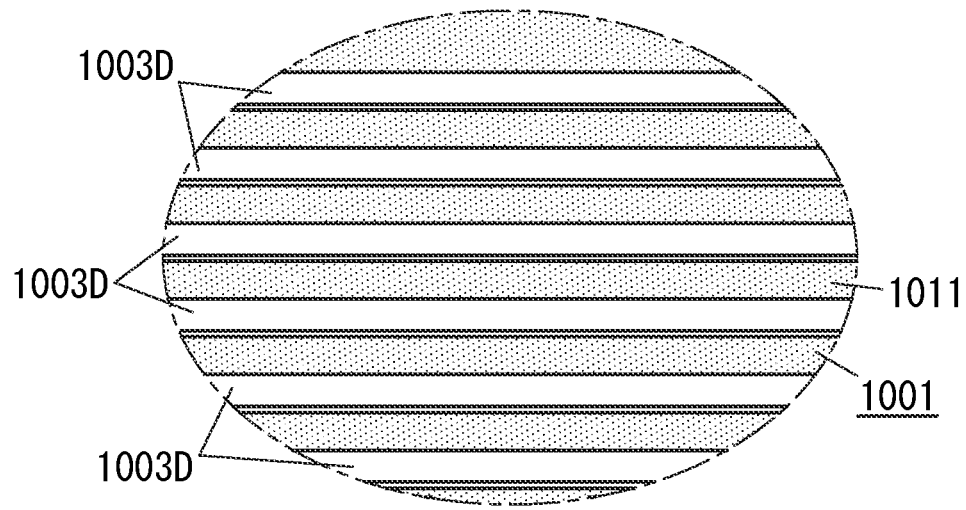
FIG. 28A is a schematic representation illustrating still another exemplary prism according to the sixth variation.

In the example shown in FIG. 28A, the plurality of prisms 1003D are arranged to form straight lines parallel to the X-axis when viewed from one end in the Z-axis direction. In the example shown in FIG. 28A, the plurality of prisms 1003D are arranged on the first surface 1011 of the light guide member 1001 to be spaced apart from each other in the Y-axis direction. That is to say, in the example shown in FIG. 28A, the plurality of prisms 1003D are arranged side by side in the direction in which light is incident on the incident surface 1010 (i.e., in the Y-axis direction).

Figure 28B:
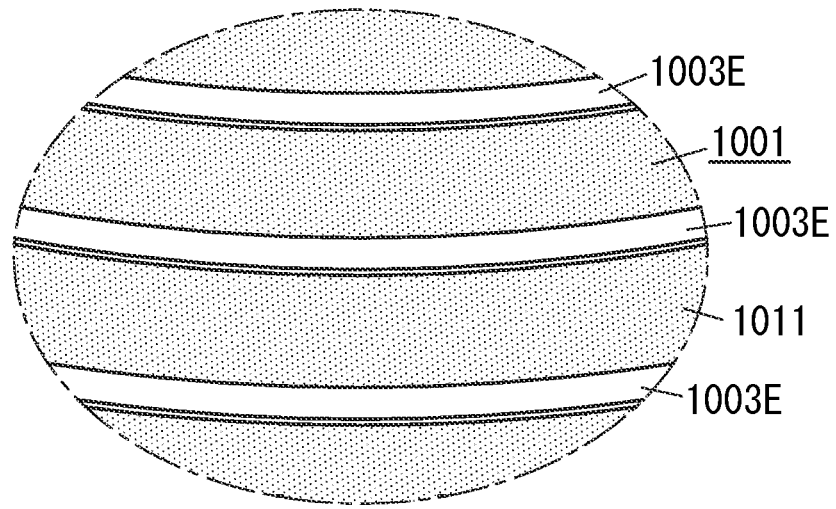
FIG. 28B is a schematic representation illustrating yet another exemplary prism according to the sixth variation.

In the example shown in FIG. 28B, the plurality of prisms 1003E are arranged to form arc-shaped curves when viewed from one end in the Z-axis direction. In this example, the plurality of prisms 1003E are arranged in an arc-shaped pattern which is convex in the direction pointing away from the incident surface 1010. In the example shown in FIG. 28B, the plurality of prisms 1003E are arranged on the first surface 1011 of the light guide member 1001 to be spaced apart from each other in the Y-axis direction. That is to say, in the example shown in FIG. 28B, the plurality of prisms 1003E are arranged side by side in the direction in which light is incident on the incident surface 1010 (i.e., in the Y-axis direction).

Figure 29A:
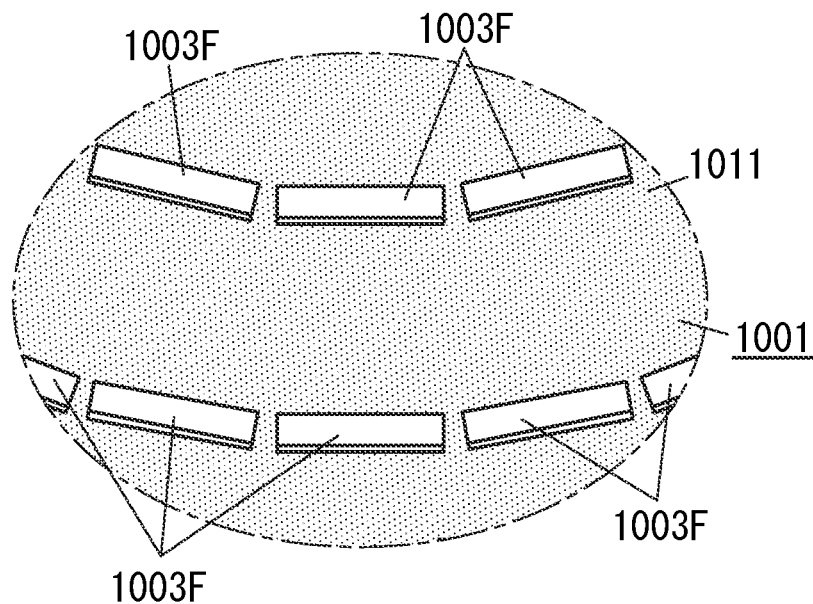
FIG. 29A is a schematic representation illustrating yet another exemplary prism according to the sixth variation.

In the example shown in FIG. 29A, a plurality of prisms 1003F included in even-numbered banks and a plurality of prisms 1003F included in odd-numbered banks are arranged such that their longitudinal ends (i.e., their ends in the X-axis direction) do not overlap with each other in the Y-axis direction. In addition, the plurality of prisms 1003F are arranged to form free-form curves when viewed from one end in the Z-axis direction. As used herein, examples of the "free-form curves" include various free-form curves such as C-, U-, J-, and S-curves. In this variation, the plurality of prisms 1003F are arranged to draw free-form curves, which are convex in the direction pointing away from the incident surface 1010. That is to say, in this variation, at least some of the prisms 1003F are tilted with respect to the incident surface 1010 when viewed in the direction in which the first surface 1011 and the second surface 1012 are arranged one on top of the other (i.e., in the Z-axis direction).

Figure 29B:
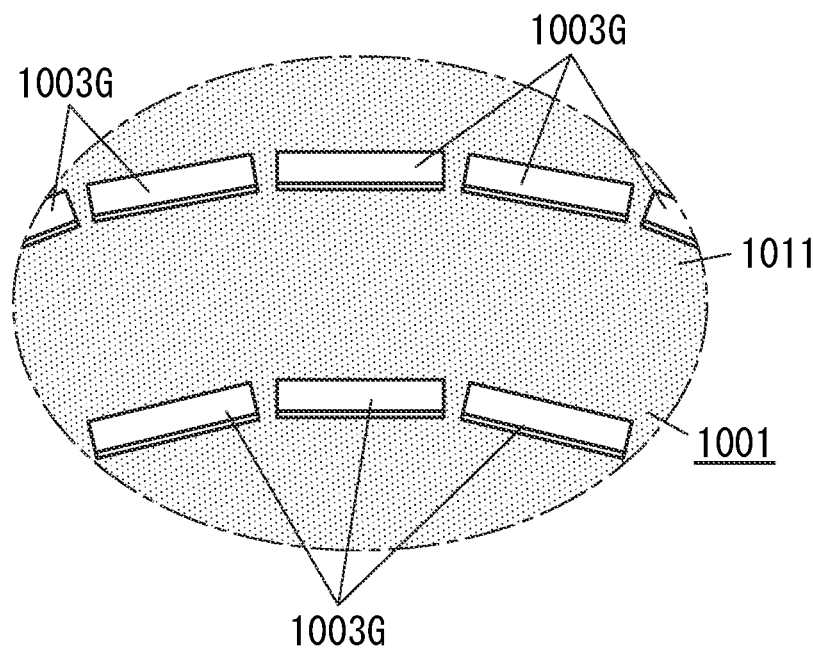
FIG. 29B is a schematic representation illustrating yet another exemplary prism according to the sixth variation.

In the example shown in FIG. 29B, a plurality of prisms 1003G are also arranged as in the example shown in FIG. 29A to form free-form curves when viewed from one end in the Z-axis direction. In this variation, the plurality of prisms 1003G are arranged to draw free-form curves, which are convex in the direction pointing toward the incident surface 1010. That is to say, in this variation, at least some of the prisms 1003G are tilted with respect to the incident surface 1010 when viewed in the direction in which the first surface 1011 and the second surface 1012 are arranged one on top of the other (i.e., in the Z-axis direction).

In order for an optical system to achieve a narrow viewing angle, the optical path of the light emerging from the second surface 1012 is preferably as nearly perpendicular to the second surface 1012 as possible. In this case, the light emitted from the light source 1004 has its divergence angle narrowed by the light control member 1002. Nevertheless, in an X-Y plane, not all the light incident on the incident surface 1010 travels along such an optical path perpendicular to the incident surface 1010 but some of the light travels along an optical path that spreads in the X-axis direction. Therefore, if the prism 1003 is arranged in a straight line parallel to the X-axis, then part of the light incident on the incident surface 1010 will be incident obliquely onto the reflective surface 1030 of the prism 1003 in the X-Y plane. In that case, the light totally reflected from the reflective surface 1030 of the prism 1003 travels along an optical path angled with respect to the second surface 1012, not the optical path perpendicular to the second surface 1012. This may reduce the chances of achieving a narrow viewing angle.

On the other hand, in the variations shown in FIGS. 27A, 28B, 29A, and 29B, at least some of the prisms 1003B, 1003E, 1003F, 1003G are tilted with respect to the incident surface 1010 when viewed in the Z-axis direction. That is to say, these variations increase the chances of the light incident on the incident surface 1010 being incident perpendicularly to the reflective surface 1030 of the prisms 1003B, 1003E, 1003F, 1003G within the X-Y plane. Thus, these variations increase the chances of the light totally reflected from the reflective surface 1030 of the prisms 1003B, 1003E, 1003F, 1003G traveling along an optical path perpendicular to the second surface 1012. Consequently, these variations have the advantage of achieving a narrow viewing angle more easily.

Alternatively, in the variation shown in FIG. 27A, the plurality of prisms 1003B may also be arranged to form arc-shaped curves which are convex in the direction pointing toward the incident surface 1010. Likewise, in the variation shown in FIG. 28B, the plurality of prisms 1003E may also be arranged to form arc-shaped curves which are convex in the direction pointing toward the incident surface 1010. Furthermore, the plurality of prisms 1003F, 1003G arranged to form free-form curves as shown in FIGS. 29A and 29B as viewed from one end in the Z-axis direction may also have a shape continuous along their longitudinal axis as shown in FIG. 28B.

(3.7) Seventh Variation

Figure 30A:
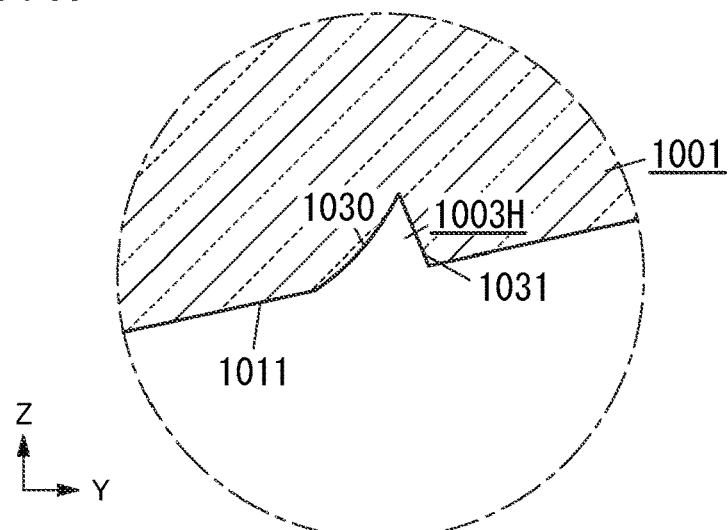
FIG. 30A is a schematic representation illustrating an exemplary prism according to a seventh variation of the second embodiment.
Figure 30B:
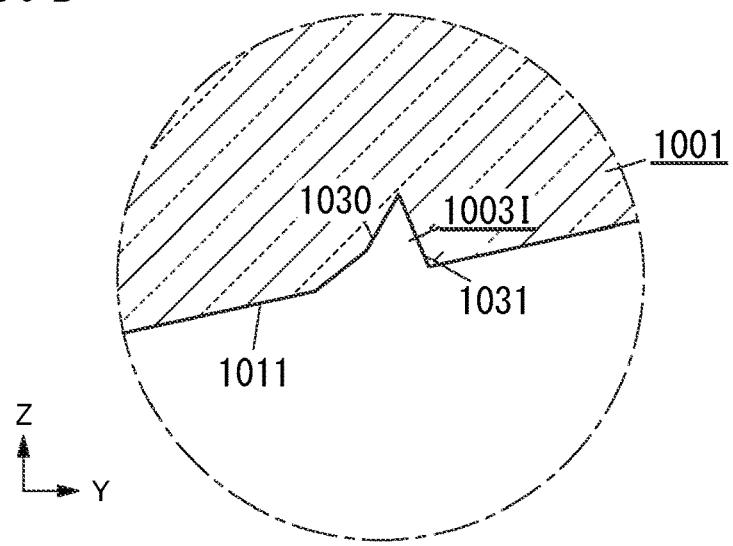
FIG. 30B is a schematic representation illustrating another exemplary prism according to the seventh variation.
Figure 30C:
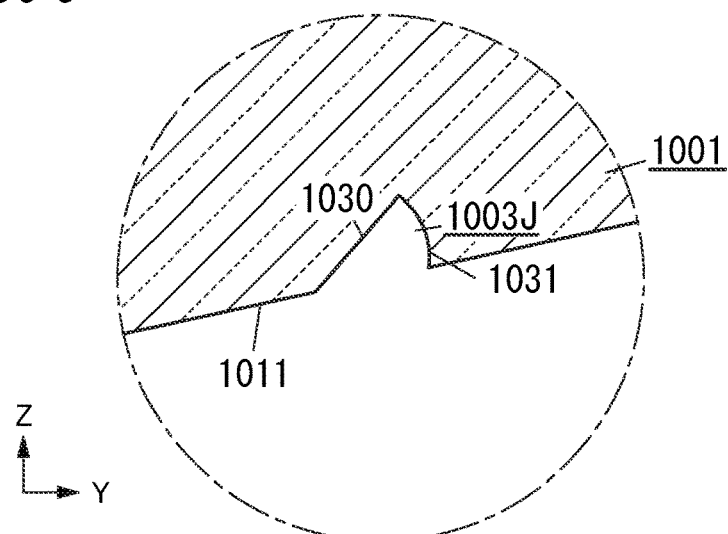
FIG. 30C is a schematic representation illustrating still another exemplary prism according to the seventh variation.

In an optical system 1100 according to a seventh variation, the prism 1003H, 1003I, 1003J has a different cross-sectional shape as shown in FIGS. 30A-30C from the counterpart of the optical system 1100 according to the second embodiment. FIGS. 30A-30C are schematic representations corresponding to FIG. 10B illustrating, on a larger scale, a principal part (the region A1 shown in FIG. 10A) of the optical system 1100.

In the example illustrated in FIG. 30A, the reflective surface 1030 of the prism 1003H is formed as a curved surface, not a flat surface. In the example illustrated in FIG. 30A, the reflective surface 1030 of the prism 1003H is a convex curved surface which is convex in a direction pointing away from the second surface 1012 (i.e., away from the incident surface 1010) when viewed from one end in the X-axis direction. In this case, the reflective surface 1030 of the prism 1003H is curved only on a cross section parallel to a Y-Z plane (i.e., only on a cross section perpendicular to the X-axis) but is linear on a cross section parallel to a X-Y plane (i.e., on a cross section perpendicular to the Z-axis). However, the example shown in FIG. 30A is only an example and should not be construed as limiting. Alternatively, the reflective surface 1030 of the prism 1003H may also be a concave curved surface which is curved to be convex toward the second surface 1012 (i.e., toward the incident surface 1010) when viewed from one end in the X-axis direction. Furthermore, the reflective surface 1030 of the prism 1003H may be curved only on a cross section parallel to the X-Y plane (i.e., only on a cross section perpendicular to the Z-axis) or may be curved both on a cross section parallel to the Y-Z plane and on a cross section parallel to the X-Y plane.

Meanwhile, in the example illustrated in FIG. 30B, the reflective surface 1030 of the prism 1003I is formed as a polygonal surface, not a flat surface. As used herein, the "polygonal surface" refers to a surface formed as a combination of a plurality of planes with different orientations to define some surfaces of a polyhedron and is a so-called "flexed surface." In the example illustrated in FIG. 30B, the reflective surface 1030 of the prism 1003I is a polygonal surface (convex surface) which is flexed to be convex in a direction pointing away from the second surface 1012 (i.e., away from the incident surface 1010) when viewed from one end in the X-axis direction. In this case, the reflective surface 1030 of the prism 1003I is flexed only on a cross section parallel to a Y-Z plane (i.e., only on a cross section perpendicular to the X-axis) but is linear on a cross section parallel to a X-Y plane (i.e., on a cross section perpendicular to the Z-axis). However, the example shown in FIG. 30B is only an example and should not be construed as limiting. Alternatively, the reflective surface 1030 of the prism 1003I may also be a polygonal surface (concave surface) which is flexed to be convex toward the second surface 1012 (i.e., toward the incident surface 1010) when viewed from one end in the X-axis direction. Furthermore, the reflective surface 1030 of the prism 1003I may be flexed only on a cross section parallel to the X-Y plane (i.e., only on a cross section perpendicular to the Z-axis) or may be flexed both on a cross section parallel to the Y-Z plane and on a cross section parallel to the X-Y plane.

Furthermore, in the example illustrated in FIG. 30C, a side surface 1031 of the prism 1003J is formed as a curved surface, not as a flat surface. The side surface 1031 is a surface, intersecting with the reflective surface 1030 (i.e., a surface located opposite from the incident surface 1010 with respect to the reflective surface 1030), out of inner surfaces of the prism 1003J. In the example illustrated in FIG. 30C, the side surface 1031 of the prism 1003J is a concave curved surface which is convex in a direction pointing away from the reflective surface 1030 (i.e., away from the incident surface 1010) when viewed from one end in the X-axis direction. In this case, the side surface 1031 of the prism 1003J is curved only on a cross section parallel to a Y-Z plane (i.e., only on a cross section perpendicular to the X-axis) but is linear on a cross section parallel to a X-Y plane (i.e., on a cross section perpendicular to the Z-axis). However, the example shown in FIG. 30C is only an example and should not be construed as limiting. Alternatively, the side surface 1031 of the prism 1003J may also be a convex curved surface which is curved to be convex toward the reflective surface 1030 (i.e., toward the incident surface 1010) when viewed from one end in the X-axis direction. Furthermore, the side surface 1031 of the prism 1003J may be curved only on a cross section parallel to the X-Y plane (i.e., only on a cross section perpendicular to the Z-axis) or may be curved both on a cross section parallel to the Y-Z plane and on a cross section parallel to the X-Y plane.

Furthermore, the side surface 1031 of the prism 1003J does not have to be a curved surface but may also be formed as a polygonal surface as well as the reflective surface 1030 of the prism 1003I shown in FIG. 30B. In that case, as in the case of the curved surface, the side surface 1031 of the prism 1003J may be either a polygonal surface (concave surface) which is flexed to be convex in a direction pointing away from the reflective surface 1030, or a polygonal surface (convex surface) which is flexed to be convex in a direction pointing toward the reflective surface 1030, when viewed from one end in the X-axis direction.

As can be seen from the foregoing description of this variation, a cross section of the prism 1003 as viewed from one end in the X-axis direction does not have to be a triangular one but may also have any other appropriate shape. Furthermore, the cross-sectional shapes of the prisms 1003H, 1003I, 1003J described above may be adopted in combination with each other. Alternatively, any of the cross-sectional shapes of the prisms 1003H, 1003I, 1003J may be combined with any of the shapes of the prisms 1003B, 1003C, 1003D, 1003E, 1003F, 1003G described above for the sixth variation.

Furthermore, if the reflective surface 1030 has a curved shape or a polygonal shape, then the luminous intensity distribution of the light reflected from (the reflective surface 1030 of) the prism 1003 and emerging from the second surface 1012 (specifically, the divergence angle or the direction of the light) may be controlled by the reflective surface 1030. Thus, adjusting the shape of (the reflective surface 1030 of) the prism 1003 allows the luminous intensity distribution of the light emerging from the second surface 1012 to be adapted to the optical properties of the display 1005 or the optical system 1320, for example. In addition, adopting an appropriate shape such as a curved or polygonal shape for at least one of the reflective surface 1030 or the side surface 1031 may improve the mold release ability of the light guide member 1001 during its molding process (of its manufacturing process), thus contributing to improving the production efficiency as well.

Other Variations

The first surface 1011 may be a surface perpendicular to the incident surface 1010 while the second surface 1012 may be a surface that is not perpendicular to the incident surface 1010 but tilted with respect to the X-Y plane. Alternatively, each of the first surface 1011 and the second surface 1012 may be a surface that is not perpendicular to the incident surface 1010 but is tilted to the X-Y plane.

Also, not all of the plurality of prisms 1003 have to have the same shape. For example, the plurality of prisms 1003 may include multiple different types of prisms 1003, of which the reflective surfaces 1030 have different tilt angles θ1, which have different longitudinal dimensions, or of which the recesses serving as the prisms 1003 have mutually different depths (i.e., which have mutually different prism 1003 heights). In particular, in a display system 1300 for use as a head-up display, to make the luminance of the virtual image displayed uniform, the intensity of the light emerging from the second surface 1012 serving as an emergent surface of the light guide member 1001 is suitably uniformized. In that case, if the intensity distribution (more exactly, the illuminance distribution) of the light on the first surface 1011 is not uniform, the intensity of the light emerging from the second surface 1012 is suitably uniformized by changing the shape of the prisms 1003 from one area of the first surface 1011 to another. In this manner, the plurality of prisms 1003 may have mutually different shapes from one area of the first surface 1011 to another.

Also, the light guide member 1001 has only to include the direct optical path L10. Not all the light that has entered the light guide member 1001 through the incident surface 1010 has to travel along the direct optical path L10. That is to say, the light guide member 1001 may include, for example, an indirect optical path that causes the incident light to be reflected from the first surface 1011 or the second surface 1012 at least once, be reflected from the prism 1003, and then emerge through the second surface 1012.

Furthermore, the first surface 1011 may be provided with only one prism 1003, instead of the plurality of prisms 1003. In that case, the prism 1003 may include a plurality of reflective surfaces 1030 which are formed over the entire first surface 1011 and have mutually different tilt angles.

Also, in the second embodiment, the prism 1003 is formed by patterning the first surface 1011 of the light guide member 1001. However, this is only an example and should not be construed as limiting. Alternatively, the prism 1003 may be provided for the first surface 1011 by, for example, affixing a prism sheet with the prism 1003 onto the first surface 1011. In that case, the prism sheet may include only a single prism 1003 or a plurality of prisms 1003, whichever is appropriate.

Furthermore, the prism 1003 does not have to be concave with respect to the first surface 1011 (i.e., recessed with respect to the first surface 1011) but may also be convex with respect to the first surface 1011 (i.e., protrude from the first surface 1011). Even such a prism 1003 that is convex with respect to the first surface 1011 may have any of various shapes as exemplified above for the sixth and seventh variations.

Furthermore, the luminous intensity distribution control member 1014 has only to control the luminous intensity distribution of the light extracted from the second surface 1012 and may be provided for at least one of the first surface 1011 or the second surface 1012. Specifically, in the second embodiment, the luminous intensity distribution control member 1014 is provided for the second surface 1012 serving as an emergent surface. However, this configuration is only an example and should not be construed as limiting. Alternatively, the luminous intensity distribution control member 1014 may be provided for the first surface 1011 or provided for both the first surface 1011 and the second surface 1012. Furthermore, in the second embodiment described above, the luminous intensity distribution control member 1014 is integrated with the light guide member 1001 to form an integrally molded product. However, this is only an example and should not be construed as limiting. Alternatively, the luminous intensity distribution control member 1014 may be provided for the second surface 1012 by affixing a luminous intensity distribution control sheet with the luminous intensity distribution control member 1014 to the second surface 1012, for example.

Furthermore, the luminous intensity distribution control member 1014 does not have to be configured as a lens but may also be configured as a diffusive sheet, a prism, or a diffraction grating, for example.

Furthermore, the moving vehicle B1 to be equipped with the display system 1300 does not have to be an automobile (passenger car) but may also be a large car such as a truck or a bus, a two-wheeled vehicle, a railway train, a motorized cart, a construction machine, an aircraft, or a watercraft, for example.

Furthermore, the display system 1300 does not have to be configured to display a virtual image as is done by a head-up display. Alternatively, the display system 1300 may also be a liquid crystal display or a projector, for example. Still alternatively, the display system 1300 may also be the display of a car navigation system, an electronic mirror system, or a multi-information display device, all of which may be installed in the moving vehicle body B11.

Furthermore, the illumination system 1200 does not have to be used in the display system 1300 but may also be used for industrial purposes, e.g., to cure a resin or to grow plants, or for other lighting purposes including a guidance light.

Furthermore, the light control member 1002 is not an essential constituent element for the optical system 1100 but may be omitted as well. That is to say, the optical system 1100 has only to include at least the light guide member 1001 and the prism 1003, and the light control member 1002 may be omitted as appropriate.

Third Embodiment

An optical system 1100C according to a third embodiment includes multiple types of prisms 1301, 1302 having mutually different shapes as shown in FIGS. 31A-31D, which is a major difference from the optical system 1100 according to the second embodiment. In the following description, any constituent element of this third embodiment, having the same function as a counterpart of the second embodiment described above, will be designated by the same reference numeral as that counterpart's, and description thereof will be omitted as appropriate herein.

Specifically, according to this embodiment, a plurality of prisms 1301, 1302 are arranged side by side in the direction in which the light is incident on the incident surface 1010 (i.e., in the Y-axis direction). The plurality of prisms 1301, 1302 includes a first prism 1301 and a second prism 1302. Between the first prism 1301 and the second prism 1302, the tilt angles θ11, θ12 defined by their respective reflective surfaces 1030 with respect to the first surface 1011 are different from each other. Specifically, the reflective surface 1030 of the first prism 1301 defines the tilt angle θ11 with respect to the first surface 1011, while the reflective surface 1030 of the second prism 1302 defines the tilt angle θ12 with respect to the first surface 1011. The tilt angle θ11 is larger than the tilt angle θ12. In other words, the reflective surface 1030 of the first prism 1301 defines a larger tilt angle with respect to the first surface 1011 than the reflective surface 1030 of the second prism 1302 does.

In this embodiment, the first surface 1011 includes a first zone Z1 and a second zone Z3. The first zone Z1 is a zone in which a plurality of first prisms 1301 are arranged. The second zone Z3 is a zone in which a plurality of second prisms 1302 are arranged. That is to say, the first prisms 1301 and the second prisms 1302 having mutually different shapes are arranged basically separately in the first zone Z1 and the second zone Z3, respectively. In the first zone Z1, a plurality of first prisms 1301 are arranged side by side as shown in FIG. 31B. In the second zone Z3, on the other hand, a plurality of second prisms 1302 are arranged side by side as shown in FIG. 31D.

In addition, the first surface 1011 further includes a hybrid zone Z2 between the first zone Z1 and the second zone Z3. The hybrid zone Z2 is a zone in which both the first prisms 1301 and the second prisms 1302 are present. That is to say, in the hybrid zone Z2, the first prisms 1301 and the second prisms 1302 are present in mixture as shown in FIG. 31C.

As used herein, the phrase "present in mixture" means that the two types of structures are present alternately. In other words, in the hybrid zone Z2, a second prism 1302 may be present between a pair of first prisms 1301 or a first prism 1301 may be present between a pair of second prisms 1302. As can be seen, in the hybrid zone Z2, the first prism 1301 and the second prism 1302 are present alternately. Providing such a hybrid zone Z2 prevents a zone in the vicinity of the boundary between the first prisms 1301 and the second prisms 1302 from being perfectly divided into the two zones, namely, the zone in which the first prisms 1301 are present (i.e., the first zone Z1) and the zone in which the second prisms 1302 are present (i.e., the second zone Z3).

In addition, the hybrid zone Z2 is further divided into a first hybrid zone Z21 and a second hybrid zone Z22. The first hybrid zone Z21 is located closer to the first zone Z1 with respect to a halfway line C10 between the first zone Z1 and the second zone Z3. The second hybrid zone Z22 is located closer to the second zone Z3 with respect to the halfway line C10. The first hybrid zone Z21 includes the first prisms 1301 more densely than the second hybrid zone Z22.

Figure 31A:
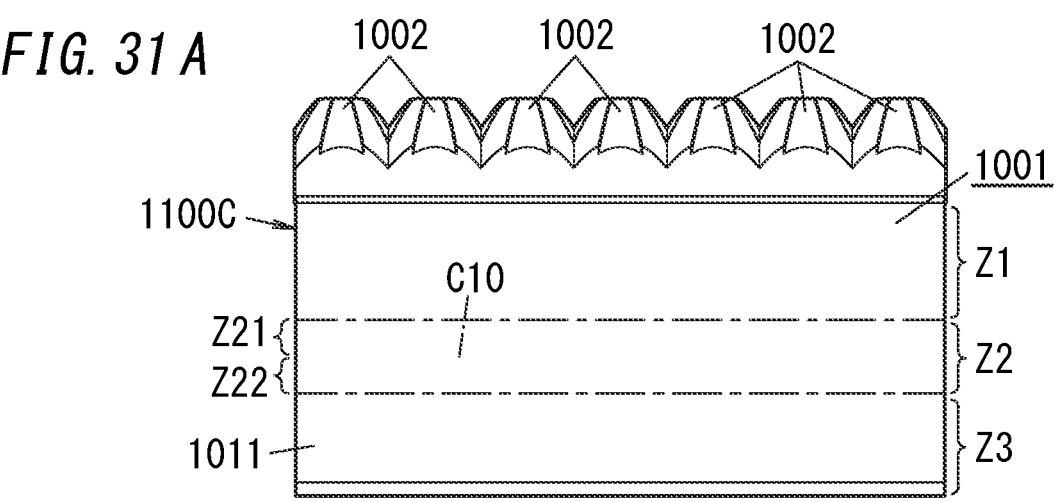
FIG. 31A is a bottom view indicating an outline of an optical system according to a third embodiment.
Figure 31B:
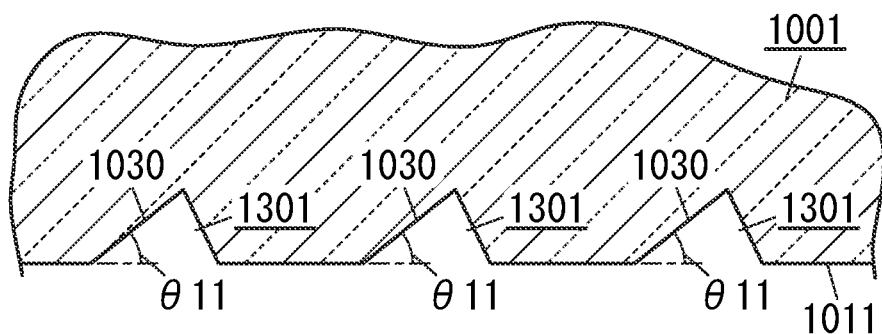
FIG. 31B is a schematic representation illustrating, on a larger scale, a first zone of the optical system.
Figure 31C:
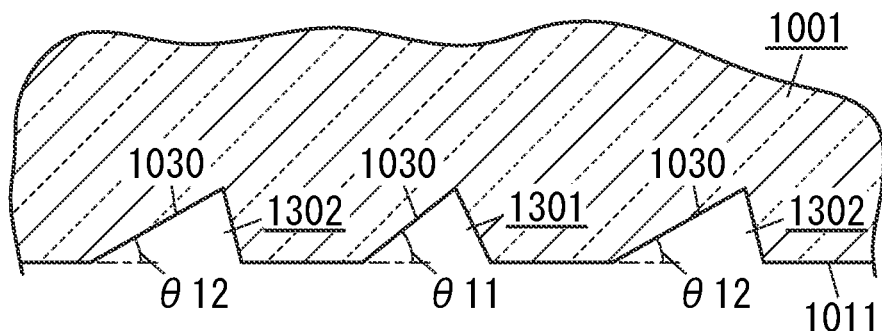
FIG. 31C is a schematic representation illustrating, on a larger scale, a hybrid zone of the optical system.
Figure 31D:
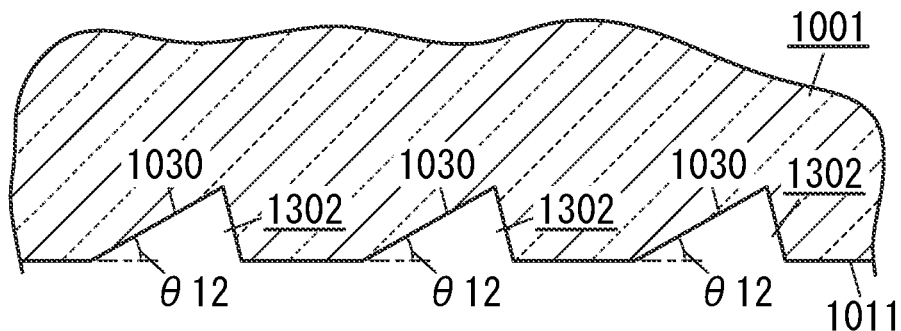
FIG. 31D is a schematic representation illustrating, on a larger scale, a second zone of the optical system.

Specifically, the first surface 1011 is divided in the Y-axis direction into the first zone Z1, the hybrid zone Z2, and the second zone Z3 as shown in FIG. 31A. The first zone Z1, the hybrid zone Z2, and the second zone Z3 are arranged in this order such that the first zone Z1 is located closer to the light control member 1002 (i.e., to the incident surface 1010) than the hybrid zone Z2 or the second zone Z3 is. In addition, the hybrid zone Z2 is divided, at the halfway line C10 in the Y-axis direction, into the first hybrid zone Z21 and the second hybrid zone Z22. The first hybrid zone Z21 and the second hybrid zone Z22 are arranged in this order such that the first hybrid zone Z21 is located closer to the light control member 1002 (i.e., to the incident surface 1010) than the second hybrid zone Z22 is.

In addition, in the first hybrid zone Z21, the first prisms 1301 are arranged more densely than in the second hybrid zone Z22. Suppose a situation where the plurality of prisms 1301, 1302 are arranged at regular pitches, for example. In that case, in the second hybrid zone Z22, the ratio of the second prisms 1302 to the first prisms 1301 may be 2:1. In the first hybrid zone Z21, on the other hand, the ratio of the second prisms 1302 to the first prisms 1301 may be 1:2.

According to a variation of the third embodiment, the plurality of prisms 1301, 1302 may further include third prisms in addition to the first prisms 1301 and the second prisms 1302. That is to say, the plurality of prisms 1301, 1302 may include three or more different types of prisms 1301, 1302, of which the respective reflective surfaces 1030 define mutually different tilt angles θ11, θ12 with respect to the first surface 1011.

Optionally, any of the various configurations that have been described with respect to the third embodiment (including their variations) may be adopted as appropriate in combination with any of various configurations that have been described with respect to the second embodiment (including their variations).

Recapitulation

As can be seen from the foregoing description, an optical system (100, 100A-100C) according to a first aspect includes a light guide member (1) and a prism (3). The light guide member (1) has: an incident surface (10) on which light is incident; and a first surface (11) and a second surface (12) facing each other. The second surface (12) is a light emergent surface. The prism (3) is provided for the first surface (11) and reflects, toward the second surface (12), the light passing inside the light guide member (1). The light guide member (1) includes a direct optical path (L1), along which the light that has entered the light guide member (1) through the incident surface (10) is directly reflected from the prism (3) and allowed to emerge from the second surface (12).

This aspect achieves the advantage of contributing to increasing the light extraction efficiency.

In an optical system (100, 100A-100C) according to a second aspect, which may be implemented in conjunction with the first aspect, the direct optical path (L1) includes an optical path of light to be totally reflected from the prism (3).

This aspect achieves the advantage of facilitating increasing the light extraction efficiency compared to a situation where the light is not totally reflected from the prism (3). An optical system (100, 100A-100C) according to a third aspect, which may be implemented in conjunction with the first or second aspect, further includes a light control member (2) to condense light traveling toward the incident surface (10) and direct condensed light toward the incident surface (10). The light control member (2) is integrated with the light guide member (1).

This aspect achieves the advantage of facilitating control of the light incident on the incident surface (10), compared to a situation where the light control member (2) is provided separately from the light guide member (1).

In an optical system (100, 100A) according to a fourth aspect, which may be implemented in conjunction with any one of the first to third aspects, the first surface (11) and the second surface (12) are tilted with respect to each other.

This aspect achieves the advantage of facilitating increasing the light extraction efficiency compared to a situation where the first surface (11) and the second surface (12) are parallel to each other.

In an optical system (100, 100A-100C) according to a fifth aspect, which may be implemented in conjunction with any one of the first to fourth aspects, the light guide member (1) further includes an indirect optical path (L2), along which the light that has entered the light guide member (1) through the incident surface (10) is once reflected from the second surface (12), reflected again from the prism (3), and then allowed to emerge from the second surface (12).

This aspect achieves the advantage of facilitating control of the direction of the light emerging from the second surface (12).

In an optical system (100, 100A-100C) according to a sixth aspect, which may be implemented in conjunction with any one of the first to fifth aspects, the prism (3) includes a plurality of prisms (3) arranged side by side in a direction in which the light is incident on the incident surface (10).

This aspect achieves the advantage of contributing to increasing the light extraction efficiency.

In an optical system (100A) according to a seventh aspect, which may be implemented in conjunction with any one of the first to sixth aspects, the prism (3) is tilted at least partially with respect to the incident surface (10) when viewed in a direction in which the first surface (11) and the second surface (12) are arranged.

This aspect achieves the advantage of facilitating control of the direction of the light emerging from the second surface (12). In an optical system (100, 100A-100C) according to an eighth aspect, which may be implemented in conjunction with any one of the first to seventh aspects, the prism (3) includes a plurality of small prisms (31) divided to be spaced apart from each other.

This aspect achieves the advantage of allowing the prism (3) to be formed more easily on the first surface (11), compared to a situation where the prism (3) is not divided.

In an optical system (100A) according to a ninth aspect, which may be implemented in conjunction with the eighth aspect, two or more of the plurality of small prisms (31) are arranged side by side to draw a curve when viewed in a direction in which the first surface (11) and the second surface (12) are arranged.

This aspect achieves the advantage of facilitating control of the direction of the light emerging from the second surface (12).

In an optical system (1100, 1100A-1100C) according to a tenth aspect, which may be implemented in conjunction with any one of the first to ninth aspects, an optical axis (Ax1) of the light incident through the incident surface (1010) is tilted with respect to the first surface (1011) such that a gap distance between the optical axis (Ax1) and the first surface (1011) narrows as a distance from the incident surface (1010) increases.

According to this aspect, the light incident through the incident surface (1010) comes closer toward the first surface (1011) as the distance from the incident surface (1010) increases (i.e., as the light travels deeper inside the light guide member (1001)). This increases the chances of the incoming light being incident on the prism (1003, 1003A-1003J). In other words, this reduces the chances of most of the incoming light incident through the incident surface (1010) reaching the other end face, located opposite from the incident surface (1010), of the light guide member (1001), thus reducing leakage of the light from the end face. Consequently, this facilitates increasing the proportion of the light, traveling along the direct optical path (L10) to emerge from the second surface (1012, 1012A) out of the light guide member (1001), to the light that has been incident through the incident surface (1010), thus contributing to increasing the light extraction efficiency.

An optical system (1100, 1100A-1100C) according to an eleventh aspect, which may be implemented in conjunction with the tenth aspect, further includes a light control member (1002, 1002B, 1002C). The light control member (1002, 1002B, 1002C) is located between a light source (1004) and the incident surface (1010) and controls light that has been emitted from the light source (1004) and is going to be incident on the incident surface (1010).

This aspect may contribute to further increasing the light extraction efficiency by making the light control member (1002, 1002B, 1002C) control the light incident on the incident surface (1010).

In an optical system (1100, 1100A-100C) according to a twelfth aspect, which may be implemented in conjunction with the eleventh aspect, the light control member (1002, 1002B, 1002C) has the function of substantially collimating the light emitted from the light source (1004) into parallel rays.

This aspect may substantially collimate the light incident on the incident surface (1010) into parallel rays, thus contributing to further increasing the light extraction efficiency.

In an optical system (1100, 1100A-1100C) according to a thirteenth aspect, which may be implemented in conjunction with the eleventh or twelfth aspect, the light control member (1002, 1002B, 1002C) is integrated with the light guide member (1001). The light control member (1002, 1002B, 1002C) includes a path generating portion (1023). The path generating portion (1023) extends along a line tilted with respect to the first surface (1011) when viewed from the incident surface (1010) and forms a path for the light between the light source (1004) and the incident surface (1010).

According to this aspect, the light emitted from the light source (1004) is incident on the incident surface (1010) after having passed inside the path generating portion (1023), thus allowing cutting down the loss of the light emitted from the light source (1004) before the light reaches the incident surface (1010).

In an optical system (1100, 1100A-1100C) according to a fourteenth aspect, which may be implemented in conjunction with any one of the first to thirteenth aspects, at least one of the first surface (1011) or the second surface (1012, 1012A) includes a luminous intensity distribution control member (1014, 1014A, 1014B) to control a luminous intensity distribution of light to be extracted from the second surface (1012, 1012A).

According to this aspect, the luminous intensity distribution of the light to be extracted from the second surface (1012, 1012A) of the light guide member (1001) may be controlled by the luminous intensity distribution control member (1014, 1014A, 1014B) provided for the light guide member (1001). In particular, the light, passing through the direct optical path (L10) after having entered the light guide member (1001) through the incident surface (1010), is reflected only once from the prism (1003, 1003A-1003J), without being reflected by any members other than the prism (1003, 1003A-1003J), before emerging from the second surface (1012, 1012A) out of the light guide member (1001).

Thus, the shapes of the first surface (1011) and the second surface (1012, 1012A) do not contribute to guiding the light inside the light guide member (1001). Therefore, even if the luminous intensity distribution control member (1014, 1014A, 1014B) is provided for the light guide member (1001), the light guiding performance of the light guide member (1001) hardly deteriorates. Consequently, this allows the light traveling along the direct optical path (L10) to be extracted efficiently from the second surface (1012, 1012A) out of the light guide member (1001) while enabling the luminous intensity distribution to be controlled, thus contributing to increasing the light extraction efficiency.

In an optical system (1100, 1100A-1100C) according to a fifteenth aspect, which may be implemented in conjunction with the fourteenth aspect, the luminous intensity distribution control member (1014, 1014A, 1014B) is provided for the second surface (1012, 1012A).

According to this aspect, the light transmitted through the second surface (1012, 1012A) may have its luminous intensity distribution efficiently controlled by the luminous intensity distribution control member (1014, 1014A, 1014B).

In an optical system (1100, 1100A-1100C) according to a sixteenth aspect, which may be implemented in conjunction with the fourteenth or fifteenth aspect, the luminous intensity distribution control member (1014, 1014A, 1014B) includes a lens.

This aspect may eliminate the need to separately provide a lens sheet or other suitable optical members by imparting a lens function to the luminous intensity distribution control member (1014, 1014A, 1014B), thus cutting down the number of parts required.

In an optical system (1100, 1100A-1100C) according to a seventeenth aspect, which may be implemented in conjunction with the sixteenth aspect, the luminous intensity distribution control member (1014, 1014A, 1014B) includes a multi-lens configured as a group of multiple small lenses (1141).

This aspect may eliminate the need to separately provide a multi-lens sheet or other suitable optical members by imparting a multi-lens function to the luminous intensity distribution control member (1014, 1014A, 1014B), thus cutting down the number of parts required.

In an optical system (1100, 1100A-1100C) according to an eighteenth aspect, which may be implemented in conjunction with the sixteenth aspect, the luminous intensity distribution control member (1014, 1014A, 1014B) includes a Fresnel lens.

This aspect may contribute to reducing the thickness of the luminous intensity distribution control member (1014, 1014A, 1014B).

An optical system (1100, 1100A-1100C) according to a nineteenth aspect, which may be implemented in conjunction with any one of the first to eighteenth aspects, further includes a light control member (1002, 1002B, 1002C). The light control member (1002, 1002B, 1002C) is located between a light source (1004) and the incident surface (1010). The light control member (1002, 1002B, 1002C) controls light that has been emitted from the light source (1004) and is going to be incident on the incident surface (1010). The light control member (1002, 1002B, 1002C) has a shape transformation function of transforming a shape projected onto a projection plane (S1), provided parallel to the incident surface (1010), from a first shape (F1) of the light emitted from the light source (1004) into a second shape (F2) of the light that is going to be incident on the incident surface (1010).

This aspect allows the range that the light incident through the incident surface (1010) may reach inside the light guide member (1001) to be controlled irrespective of the first shape (F1) that is the shape of the light emitted from the light source (1004). That is to say, the range that the light incident through the incident surface (1010) may reach inside the light guide member (1001) derives from the second shape (F2) that is the shape of the light that is going to be incident on the incident surface (1010). In addition, this optical system (1100, 1100A-1100C) may transform the shape from the first shape (F1) into the second shape (F2). Thus, this optical system (1100, 1100A-1100C) may control the light incident through the incident surface (1010) so that the light may reach a relatively broad range inside the light guide member (1001). Consequently, this optical system (1100, 1100A-1100C) increases the chances of the light reaching the entire first surface (1011), thus facilitating uniformly extracting the light from the entire second surface (1012, 1012A) serving as the emergent surface.

In an optical system (1100, 1100A-1100C) according to a twentieth aspect, which may be implemented in conjunction with the nineteenth aspect, a circumcircle of the second shape (F2) is larger than a circumcircle of the first shape (F1).

According to this aspect, the second shape (F2) comes to have an expanded shape, compared to the first shape (F1), thus facilitating increasing the light extraction efficiency.

In an optical system (1100, 1100A-1100C) according to a twenty-first aspect, which may be implemented in conjunction with the nineteenth or twentieth aspect, the second shape (F2) is formed by adding at least one corner portion (F21) to the first shape (F1) such that the first shape (F1) is made closer to a polygonal shape.

According to this aspect, the second shape (F2) comes to have an expanded shape, compared to the first shape (F1), thus facilitating increasing the light extraction efficiency.

In an optical system (1100, 1100A-1100C) according to a twenty-second aspect, which may be implemented in conjunction with any one of the nineteenth to twenty-first aspects, the light control member (1002, 1002B, 1002C) has a plurality of lens surfaces (1201-1205) on a counter surface thereof facing the light source (1004).

This aspect allows the light emitted from the light source (1004) to enter the light control member (1002, 1002B, 1002C) more easily.

An optical system (1100, 1100A-1100C) according to a twenty-third aspect, which may be implemented in conjunction with any one of the first to twenty-second aspects, further includes a light control member (1002) located between a light source (1004) and the incident surface (1010) and configured to control light that has been emitted from the light source (1004) and is going to be incident on the incident surface (1010). The light control member (1002) includes an incident lens (1021) and an outlet portion (1022). The light control member (1002) allows the light that has been incident on the incident lens (1021) from the light source (1004) to go out of the light control member from the outlet portion (1022). The incident lens (1021) has a main incident surface (1211) and an auxiliary incident surface (1212). The main incident surface (1211) is arranged to face the light source (1004). The auxiliary incident surface (1212) is arranged to face toward a normal (L21) to the main incident surface (1211) and located at least partially along a circumference of the main incident surface (1211). An optical axis (Ax2) of the light source (1004) is tilted with respect to the normal (L21) to the main incident surface (1211).

According to this aspect, the light emitted from the light source (1004) is incident on the incident lens (1021) of the optical member (1020) asymmetrically to the normal (L21) to the main incident surface (1211). This allows making the intensity of the light incident from the light source (1004) imbalanced between the main incident surface (1211) of the incident lens (1021) and the auxiliary incident surface (1212) located around the main incident surface (1211). Consequently, this allows the optical member (1020) to have increased light harvesting efficiency.

In an optical system (1100, 1100A-1100C) according to a twenty-fourth aspect, which may be implemented in conjunction with the twenty-third aspect, light rays that have been incident on the incident lens (1021) from the light source (1004) include a principal ray (L11) and a first auxiliary ray (L12) and a second auxiliary ray (L13), both of which have a lower intensity than the principal ray (L11). The principal ray (L11), the first auxiliary ray (L12), and the second auxiliary ray (L13) are arranged in this order in a direction perpendicular to a normal (L21) to the main incident surface (1211).

According to this aspect, the principal ray (L11), the first auxiliary ray (L12), and the second auxiliary ray (L13) are arranged in the descending order of their intensity, thus enabling the principal ray (L11) with a relatively high intensity to be extracted more easily.

In an optical system (1100, 1100A-1100C) according to a twenty-fifth aspect, which may be implemented in conjunction with the twenty-fourth aspect, the intensity of the principal ray (L11) is a maximum intensity among the light rays that have been incident on the incident lens (1021) from the light source (1004).

This aspect enables the principal ray (L11) with the maximum intensity to be extracted more easily.

An illumination system (200, 1200) according to a twenty-sixth aspect includes the optical system (100, 100A-100C, 1100, 1100A-1100C) according to any one of the first to twenty-fifth aspects and a light source (4, 1004). The light source (1004) emits light toward the incident surface (10, 1010) through the light control member (2, 1002).

This aspect achieves the advantage of contributing to increasing the light extraction efficiency.

A display system (300, 1300) according to a twenty-seventh aspect includes the illumination system (200, 1200) according to the twenty-sixth aspect and a display (5, 1005). The display (5, 1005) receives the light emerging from the illumination system (200, 1200) and displays an image thereon.

This aspect achieves the advantage of contributing to increasing the light extraction efficiency.

A moving vehicle (B1) according to a twenty-eighth aspect includes the display system (300, 1300) according to the twenty-seventh aspect and a moving vehicle body (B11) to be equipped with the display system (300, 1300).

This aspect achieves the advantage of contributing to increasing the light extraction efficiency.

Note that the constituent elements according to the second to twenty-fifth aspects are not essential constituent elements for the optical system (100, 100A-100C, 1100, 1100A-1100C) but may be omitted as appropriate.

The present disclosure has the following twenty-ninth to fortieth aspects. The twenty-ninth to fortieth aspects of the present disclosure generally relate to an optical system, an illumination system, a display system, and a moving vehicle. More specifically, the twenty-ninth to fortieth aspects of the present disclosure relate to an optical system configured to control light which has been incident through an incident surface to make the light emerge from an emergent surface, an illumination system, a display system, and a moving vehicle. An object of the twenty-ninth to fortieth aspects of the present disclosure is to provide an optical system, an illumination system, a display system, and a moving vehicle, all of which are configured to contribute to increasing the light extraction efficiency.

An optical system (100, 100A-100C) according to a twenty-ninth aspect includes a light guide plate (light guide member 1), a light control member (2), and a prism (3). The light guide plate (light guide member 1) has an incident surface (10) on which light is incident; and a first surface (11) and a second surface (12) facing each other. The second surface (12) is a light emergent surface. The light control member (2) condenses light traveling toward the incident surface (10) and directs condensed light toward the incident surface (10). The prism (3) is provided for the first surface (11) and reflects, toward the second surface (12), the light passing inside the light guide plate (light guide member 1). The light guide plate (light guide member 1) includes a direct optical path (L1), along which the light that has entered the light guide member (1) through the incident surface (10) is directly reflected from the prism (3) and allowed to emerge from the second surface (12).

This aspect achieves the advantage of contributing to increasing the light extraction efficiency.

In an optical system (100, 100A-100C) according to a thirtieth aspect, which may be implemented in conjunction with the twenty-ninth aspect, the direct optical path (L1) includes an optical path of light to be totally reflected from the prism (3).

This aspect achieves the advantage of facilitating increasing the light extraction efficiency compared to a situation where the light is not totally reflected from the prism (3).

In an optical system (100, 100A-100C) according to a thirty-first aspect, which may be implemented in conjunction with the twenty-ninth or the thirtieth aspect, the light control member (2) is integrated with the light guide plate (light guide member 1).

This aspect achieves the advantage of facilitating control of the light incident on the incident surface (10), compared to a situation where the light control member (2) is provided separately from the light guide plate (light guide member 1).

In an optical system (100, 100A) according to a thirty-second aspect, which may be implemented in conjunction with any one of the twenty-ninth to thirty-first aspects, the first surface (11) and the second surface (12) are tilted with respect to each other.

This aspect achieves the advantage of facilitating increasing the light extraction efficiency compared to a situation where the first surface (11) and the second surface (12) are parallel to each other.

In an optical system (100, 100A-100C) according to a thirty-third aspect, which may be implemented in conjunction with any one of the twenty-ninth to thirty-second aspects, the light guide plate (light guide member 1) further includes an indirect optical path (L2), along which the light that has entered the light guide member (1) through the incident surface (10) is once reflected from the second surface (12), reflected again from the prism (3), and then allowed to emerge from the second surface (12).

This aspect achieves the advantage of facilitating control of the direction of the light emerging from the second surface (12).

In an optical system (100, 100A-100C) according to a thirty-fourth aspect, which may be implemented in conjunction with any one of the twenty-ninth to thirty-third aspects, the prism (3) includes a plurality of prisms (3) arranged side by side in a direction in which the light is incident on the incident surface (10).

This aspect achieves the advantage of contributing to increasing the light extraction efficiency.

In an optical system (100A) according to a thirty-fifth aspect, which may be implemented in conjunction with any one of the twenty-ninth to thirty-fourth aspects, the prism (3) is tilted at least partially with respect to the incident surface (10) when viewed in a direction in which the first surface (11) and the second surface (12) are arranged.

This aspect achieves the advantage of facilitating control of the direction of the light emerging from the second surface (12).

In an optical system (100, 100A-100C) according to a thirty-sixth aspect, which may be implemented in conjunction with any one of the twenty-ninth to thirty-fifth aspects, the prism (3) includes a plurality of small prisms (31) divided to be spaced apart from each other.

This aspect achieves the advantage of allowing the prism (3) to be formed more easily on the first surface (11), compared to a situation where the prism (3) is not divided.

In an optical system (100A) according to a thirty-seventh aspect, which may be implemented in conjunction with the thirty-sixth aspect, two or more of the plurality of small prisms (31) are arranged side by side to draw a curve when viewed in a direction in which the first surface (11) and the second surface (12) are arranged.

This aspect achieves the advantage of facilitating control of the direction of the light emerging from the second surface (12).

An illumination system (200) according to a thirty-eighth aspect includes the optical system (100, 100A-100C) according to any one of the twenty-ninth to thirty-seventh aspects and a light source (4). The light source (4) emits light toward the incident surface (10) through the light control member (2).

This aspect achieves the advantage of contributing to increasing the light extraction efficiency.

A display system (300) according to a thirty-ninth aspect includes the illumination system (200) according to the thirty-eighth aspect and a display (5). The display (5) receives the light emerging from the illumination system (200) and displays an image thereon.

This aspect achieves the advantage of contributing to increasing the light extraction efficiency.

A moving vehicle (B1) according to a fortieth aspect includes the display system (300) according to the thirty-ninth aspect and a moving vehicle body (B11) to be equipped with the display system (300).

This aspect achieves the advantage of contributing to increasing the light extraction efficiency.

Note that the constituent elements according to the thirtieth to thirty-seventh aspects are not essential constituent elements for the optical system (100) but may be omitted as appropriate.

The present disclosure has the following forty-first to forty-ninth aspects. The forty-first to forty-ninth aspects of the present disclosure generally relate to an optical system, an illumination system, a display system, and a moving vehicle. More specifically, the forty-first to forty-ninth aspects of the present disclosure relate to an optical system configured to control light which has been incident through an incident surface to make the light emerge from an emergent surface, an illumination system, a display system, and a moving vehicle. An object of the forty-first to forty-ninth aspects of the present disclosure is to provide an optical system, an illumination system, a display system, and a moving vehicle, all of which are configured to contribute to increasing the light extraction efficiency.

An optical system (1100, 1100A-1100C) according to a forty-first aspect includes a light guide member (1001) and a prism (1003, 1003A-1003J). The light guide member (1001) has: an incident surface (1010) on which light is incident; and a first surface (1011) and a second surface (1012, 1012A) facing each other. The second surface (1012, 1012A) of the light guide member (1001) is a light emergent surface. The prism (1003, 1003A-1003J) is provided for the first surface (1011) and reflects, toward the second surface (1012, 1012A), the light passing inside the light guide member (1001). The light guide member (1001) includes a direct optical path (L10), along which the light that has entered the light guide member (1001) through the incident surface (1010) is directly reflected from the prism (1003, 1003A-1003J) and allowed to emerge from the second surface (1012, 1012A). An optical axis (Ax1) of the light incident through the incident surface (1010) is tilted with respect to the first surface (1011) such that a gap distance between the optical axis (Ax1) and the first surface (1011) narrows as a distance from the incident surface (1010) increases.

According to this aspect, the light incident through the incident surface (1010) comes closer toward the first surface (1011) as the distance from the incident surface (1010) increases (i.e., as the light travels deeper inside the light guide member (1001)). This increases the chances of the incoming light being incident on the prism (1003, 1003A-1003J). In other words, this reduces the chances of most of the incoming light incident through the incident surface (1010) reaching the other end face, located opposite from the incident surface (1010), of the light guide member (1001), thus reducing leakage of the light from the end face. Consequently, this facilitates increasing the proportion of the light, traveling along the direct optical path (L10) to emerge from the second surface (1012, 1012A) out of the light guide member (1001), to the light that has been incident through the incident surface (1010), thus contributing to increasing the light extraction efficiency.

An optical system (1100, 1100A-1100C) according to a forty-second aspect, which may be implemented in conjunction with the forty-first aspect, further includes a light control member (1002, 1002B, 1002C). The light control member (1002, 1002B, 1002C) is located between a light source (1004) and the incident surface (1010) and controls light that has been emitted from the light source (1004) and is going to be incident on the incident surface (1010).

This aspect may contribute to further increasing the light extraction efficiency by making the light control member (1002, 1002B, 1002C) control the light that is going to be incident on the incident surface (1010).

In an optical system (1100, 1100A-100C) according to a forty-third aspect, which may be implemented in conjunction with the forty-second aspect, the light control member (1002, 1002B, 1002C) has the function of substantially collimating the light emitted from the light source (1004) into parallel rays.

This aspect may substantially collimate the light incident on the incident surface (1010) into parallel rays, thus contributing to further increasing the light extraction efficiency.

In an optical system (1100, 1100A-1100C) according to a forty-fourth aspect, which may be implemented in conjunction with the forty-second or forty-third aspects, the light control member (1002, 1002B, 1002C) is integrated with the light guide member (1001). The light control member (1002, 1002B, 1002C) includes a path generating portion (1023). The path generating portion (1023) extends along a line tilted with respect to the first surface (1011) when viewed from the incident surface (1010) and forms a path for the light between the light source (1004) and the incident surface (1010).

According to this aspect, the light emitted from the light source (1004) is incident on the incident surface (1010) after having passed inside the path generating portion (1023), thus allowing cutting down the loss of the light emitted from the light source (1004) before the light reaches the incident surface (1010).

In an optical system (1100, 1100A-1100C) according to a forty-fifth aspect, which may be implemented in conjunction with the forty-first or forty-fourth aspect, light rays reaching the second surface (1012, 1012A) after having traveled along the direct optical path (L10) are all incident on the second surface (1012, 1012A) at the same angle of incidence.

This aspect allows the directions of the light rays emerging from the second surface (1012, 1012A) to be aligned with each other.

In an optical system (1100, 1100A-1100C) according to a forty-sixth aspect, which may be implemented in conjunction with any one of the forty-first or forty-fifth aspect, the light emerging from the second surface (1012, 1012A) after having traveled along the direct optical path (L10) accounts for 50% or more of the light that has entered the light guide member (1001) through the incident surface (1010).

This aspect allows the light extraction efficiency to be increased significantly.

An illumination system (1200) according to a forty-seventh aspect includes the optical system (1100, 1100A-1100C) according to any one of the forty-first to forty-sixth aspects and a light source (1004). The light source (1004) emits light toward the incident surface (1010).

This aspect achieves the advantage of contributing to increasing the light extraction efficiency.

A display system (1300) according to a forty-eighth aspect includes the illumination system (1200) according to the forty-seventh aspect and a display (1005). The display (1005) receives the light emerging from the illumination system (1200) and displays an image thereon.

This aspect achieves the advantage of contributing to increasing the light extraction efficiency.

A moving vehicle (B1) according to a forty-ninth aspect includes the display system (1300) according to the forty-eighth aspect and a moving vehicle body (B11) to be equipped with the display system (1300).

This aspect achieves the advantage of contributing to increasing the light extraction efficiency.

Note that the constituent elements according to the forty-second to forty-sixth aspects are not essential constituent elements for the optical system (1100, 1100A-1100C) but may be omitted as appropriate.

The present disclosure has the following fiftieth to fifty-ninth aspects. The fiftieth to fifty-ninth aspects of the present disclosure generally relate to an optical system, an illumination system, a display system, and a moving vehicle. More specifically, the fiftieth to fifty-ninth aspects of the present disclosure relate to an optical system configured to control light which has been incident through an incident surface to make the light emerge from an emergent surface, an illumination system, a display system, and a moving vehicle. An object of the fiftieth to fifty-ninth aspects of the present disclosure is to provide an optical system, an illumination system, a display system, and a moving vehicle, all of which are configured to facilitate extracting light uniformly from the entire emergent surface.

An optical system (1100, 1100A-1100C) according to a fiftieth aspect includes a light guide member (1001), a prism (1003, 1003A-1003J), and a light control member (1002, 1002B, 1002C). The light guide member (1001) has an incident surface (1010) on which light is incident; and a first surface (1011) and a second surface (1012, 1012A) facing each other. The second surface (1012, 1012A) of the light guide member (1001) is a light emergent surface. The prism (1003, 1003A-1003J) is provided for the first surface (1011) and reflects, toward the second surface (1012, 1012A), the light passing inside the light guide member (1001). The light control member (1002, 1002B, 1002C) is located between a light source (1004) and the incident surface (1010). The light control member (1002, 1002B, 1002C) controls light that has been emitted from the light source (1004) and is going to be incident on the incident surface (1010). The light guide member (1001) includes a direct optical path (L10), along which the light that has entered the light guide member (1001) through the incident surface (1010) is directly reflected from the prism (1003, 1003A-1003J) and allowed to emerge from the second surface (1012, 1012A). The light control member (1002, 1002B, 1002C) has a shape transformation function of transforming a shape projected onto a projection plane (S1), provided parallel to the incident surface (1010), from a first shape (F1) of the light emitted from the light source (1004) into a second shape (F2) of the light that is going to be incident on the incident surface (1010).

This aspect allows the range that the light incident through the incident surface (1010) may reach inside the light guide member (1001) to be controlled irrespective of the first shape (F1) that is the shape of the light emitted from the light source (1004). That is to say, the range that the light incident through the incident surface (1010) may reach inside the light guide member (1001) derives from the second shape (F2) that is the shape of the light incident on the incident surface (1010). In addition, this optical system (1100, 1100A-1100C) may transform the shape from the first shape (F1) into the second shape (F2). Thus, this optical system (1100, 1100A-1100C) may control the light incident through the incident surface (1010) so that the light may reach a relatively broad range inside the light guide member (1001). Consequently, this optical system (1100, 1100A-1100C) increases the chances of the light reaching the entire first surface (1011), thus facilitating uniformly extracting the light from the entire second surface (1012, 1012A) serving as the emergent surface.

In an optical system (1100, 1100A-1100C) according to a fifty-first aspect, which may be implemented in conjunction with the fiftieth aspect, a circumcircle of the second shape (F2) is larger than a circumcircle of the first shape (F1).

According to this aspect, the second shape (F2) comes to have an expanded shape, compared to the first shape (F1), thus facilitating increasing the light extraction efficiency.

In an optical system (1100, 1100A-1100C) according to a fifty-second aspect, which may be implemented in conjunction with the fiftieth or fifty-first aspect, the second shape (F2) is formed by adding at least one corner portion (F21) to the first shape (F1) such that the first shape (F1) is made closer to a polygonal shape.

According to this aspect, the second shape (F2) comes to have an expanded shape, compared to the first shape (F1), thus facilitating increasing the light extraction efficiency.

An optical system (1100, 1100A-1100C) according to a fifty-third aspect, which may be implemented in conjunction with any one of the fiftieth to fifty-second aspects, includes a plurality of light sources (1004), one of which is the light source (1004), and a plurality of light control members (1002, 1002B, 1002C), one of which is the light control member (1002, 1002B, 1002C).

This aspect allows the light that has come from the plurality of light sources (1004) and the plurality of light control members (1002, 1002B, 1002C) to enter the light guide member (1001) more easily.

In an optical system (1100, 1100A-1100C) according to a fifty-fourth aspect, which may be implemented in conjunction with any one of the fiftieth to fifty-third aspects, the light control member (1002, 1002B, 1002C) has, on its surface facing the light source (1004), a plurality of lens surfaces (1201-1205).

This aspect allows the light emitted from the light source (1004) to enter the light control member (1002, 1002B, 1002C) more easily.

In an optical system (1100, 1100A-1100C) according to a fifty-fifth aspect, which may be implemented in conjunction with any one of the fiftieth to fifty-fourth aspects, a tilt angle defined by a counter surface, facing the light source (1004), of the light control member (1002, 1002B, 1002C) with respect to a counter axis facing the light source (1004) varies along a circumference around the counter axis.

This aspect allows the light emitted from the light source (1004) to enter the light control member (1002, 1002B, 1002C) more easily.

In an optical system (1100, 1100A-1100C) according to a fifty-sixth aspect, which may be implemented in conjunction with any one of the fiftieth to fifty-fifth aspects, a counter surface, facing the light source (1004), of the light control member (1002, 1002B, 1002C) has an asymmetric shape in one direction perpendicular to the counter axis facing the light source (1004).

This aspect facilitates reducing the thickness of the light control member (1002, 1002B, 1002C).

An illumination system (1200) according to a fifty-seventh aspect includes the optical system (1100, 1100A-1100C) according to any one of the fiftieth to fifty-sixth aspects and a light source (1004). The light source (1004) emits light to be incident on the incident surface (1010).

This aspect facilitates extracting light uniformly from the entire emergent surface.

A display system (1300) according to a fifty-eighth aspect includes the illumination system (1200) according to the fifty-seventh aspect and a display (1005). The display (1005) receives the light emerging from the illumination system (1200) and displays an image thereon.

This aspect facilitates extracting light uniformly from the entire emergent surface.

A moving vehicle (B1) according to a fifty-ninth aspect includes the display system (1300) according to the fifty-eighth aspect and a moving vehicle body (B11) to be equipped with the display system (1300).

This aspect facilitates extracting light uniformly from the entire emergent surface.

Note that the constituent elements according to the fifty-first to fifty-sixth aspects are not essential constituent elements for the optical system (1100, 1100A-1100C) but may be omitted as appropriate.

The present disclosure has the following sixtieth to sixty-ninth aspects. The sixtieth to sixty-ninth aspects of the present disclosure generally relate to an optical member, an optical system, an illumination system, a display system, and a moving vehicle. More specifically, the sixtieth to sixty-ninth aspects of the present disclosure relate to an optical member including an incident lens, an optical system, an illumination system, a display system, and a moving vehicle. An object of the sixtieth to sixty-ninth aspects of the present disclosure is to provide an optical member, an optical system, an illumination system, a display system, and a moving vehicle, all of which are configured to contribute to increasing the light harvesting efficiency.

An optical member (1020) according to a sixtieth aspect includes an incident lens (1021) and an outlet portion (1022). The optical member (1020) allows the light that has been incident on the incident lens (1021) from the light source (1004) to go out of the optical member (1020) from the outlet portion (1022). The incident lens (1021) has a main incident surface (1211) and an auxiliary incident surface (1212). The main incident surface (1211) is arranged to face the light source (1004). The auxiliary incident surface (1212) is arranged to face toward a normal (L21) to the main incident surface (1211) and located at least partially along a circumference of the main incident surface (1211). An optical axis (Ax2) of the light source (1004) is tilted with respect to the normal (L21) to the main incident surface (1211).

According to this aspect, the light emitted from the light source (1004) is incident on the incident lens (1021) of the optical member (1020) asymmetrically to the normal (L21) to the main incident surface (1211). This allows making the intensity of the light incident from the light source (1004) imbalanced between the main incident surface (1211) of the incident lens (1021) and the auxiliary incident surface (1212) located around the main incident surface (1211). Consequently, this allows the optical member (1020) to have increased light harvesting efficiency.

In an optical member (1020) according to a sixty-first aspect, which may be implemented in conjunction with the sixtieth aspect, light rays that have been incident on the incident lens (1021) from the light source (1004) include a principal ray (L11) and a first auxiliary ray (L12) and a second auxiliary ray (L13), both of which have a lower intensity than the principal ray (L11). The principal ray (L11), the first auxiliary ray (L12), and the second auxiliary ray (L13) are arranged in this order in a direction perpendicular to a normal (L21) to the main incident surface (1211).

According to this aspect, the principal ray (L11), the first auxiliary ray (L12), and the second auxiliary ray (L13) are arranged in the descending order of their intensity, thus enabling the principal ray (L11) with a relatively high intensity to be extracted more easily.

In an optical member (1020) according to a sixty-second aspect, which may be implemented in conjunction with the sixty-first aspect, an intensity of the principal ray (L11) is a maximum intensity among the light rays that have been incident on the incident lens (1021) from the light source (1004).

This aspect enables the principal ray (L11) with the maximum intensity to be extracted more easily.

In an optical member (1020) according to a sixty-third aspect, which may be implemented in conjunction with the sixty-first or sixty-second aspect, the principal ray (L11) is incident on the auxiliary incident surface (1212).

This aspect allows the principal ray (L11) to be extracted efficiently.

In an optical member (1020) according to a sixty-fourth aspect, which may be implemented in conjunction with any one of the sixtieth to sixty-third aspects, the auxiliary incident surface (1212) has an asymmetric shape with respect to a normal (L21) to the main incident surface (1211).

This aspect allows reducing the thickness of the optical member (1020) more easily than in a situation where the auxiliary incident surface (1212) has a symmetric shape.

An optical system (1100, 1100A-1100C) according to a sixty-fifth aspect includes the optical member (1020) according to any one of the sixtieth to sixty-fourth aspects, a light guide member (1001), and a prism (1003, 1003A-1003J). The light guide member (1001) has an incident surface (1010) on which light is incident; and a first surface (1011) and a second surface (1012, 1012A) facing each other. The second surface (1012, 1012A) of the light guide member (1001) is a light emergent surface. The prism (1003, 1003A-1003J) is provided for the first surface (1011) and reflects, toward the second surface (1012, 1012A), the light passing inside the light guide member (1001). The optical member (1020) is located between a light source (1004) and the incident surface (1010) and controls light that has been emitted from the light source (1004) and is going to be incident on the incident surface (1010).

This aspect may contribute to increasing the light harvesting efficiency.

In an optical system (1100, 1100A-1100C) according to a sixty-sixth aspect, which may be implemented in conjunction with the sixty-fifth aspect, the light guide member (1001) includes a direct optical path (L10), along which the light that has entered the light guide member (1001) through the incident surface (1010) is directly reflected from the prism (1003, 1003A-1003J) and allowed to emerge from the second surface (1012, 1012A).

This aspect may contribute to increasing the light harvesting efficiency.

An illumination system (1200) according to a sixty-seventh aspect includes the optical system (1100, 1100A-1100C) according to the sixty-fifth or sixty-sixth aspect and a light source (1004). The light source (1004) emits light to be incident on the incident surface (1010).

This aspect achieves the advantage of contributing to increasing the light harvesting efficiency.

A display system (1300) according to a sixty-eighth aspect includes the illumination system (1200) according to the sixty-seventh aspect and a display (1005). The display (1005) receives the light emerging from the illumination system (1200) and displays an image thereon.

This aspect achieves the advantage of contributing to increasing the light harvesting efficiency.

A moving vehicle (B1) according to a sixty-ninth aspect includes the display system (1300) according to the sixty-eighth aspect and a moving vehicle body (B11) to be equipped with the display system (1300).

This aspect achieves the advantage of contributing to increasing the light harvesting efficiency.

Note that the constituent elements according to the sixty-first to sixty-fourth aspects are not essential constituent elements for the optical member (1020) but may be omitted as appropriate.

Also, the constituent elements according to the sixty-sixth aspect are not essential constituent elements for the optical system (1100, 1100A-1100C) but may be omitted as appropriate.

The present disclosure has the following seventieth to eighty-fourth aspects. The seventieth to eighty-fourth aspects of the present disclosure generally relate to an optical system, an illumination system, a display system, and a moving vehicle. More specifically, the seventieth to eighty-fourth aspects of the present disclosure relate to an optical system configured to control light which has been incident through an incident surface to make the light emerge from an emergent surface, an illumination system, a display system, and a moving vehicle. An object of the seventieth to eighty-fourth aspects of the present disclosure is to provide an optical system, an illumination system, a display system, and a moving vehicle, all of which are configured to contribute to increasing the light extraction efficiency.

An optical system (1100, 1100A-1100C) according to a seventieth aspect includes a light guide member (1001) and a prism (1003, 1003A-1003J). The light guide member (1001) has an incident surface (1010) on which light is incident; and a first surface (1011) and a second surface (1012, 1012A) facing each other. The second surface (1012, 1012A) of the light guide member (1001) is a light emergent surface. The prism (1003, 1003A-1003J) is provided for the first surface (1011) and reflects, toward the second surface (1012, 1012A), the light passing inside the light guide member (1001). The light guide member (1001) includes a direct optical path (L10), along which the light that has entered the light guide member (1001) through the incident surface (1010) is directly reflected from the prism (1003, 1003A-1003J) and allowed to emerge from the second surface (1012, 1012A). At least one of the first surface (1011) or the second surface (1012, 1012A) includes a luminous intensity distribution control member (1014, 1014A, 1014B) to control a luminous intensity distribution of light to be extracted from the second surface (1012, 1012A).

According to this aspect, the luminous intensity distribution of the light to be extracted from the second surface (1012, 1012A) of the light guide member (1001) may be controlled by the luminous intensity distribution control member (1014, 1014A, 1014B) provided for the light guide member (1001). In particular, the light, passing through the direct optical path (L10) after having been incident through the incident surface (1010) on the light guide member (1001), is reflected only once from the prism (1003, 1003A-1003J), without being reflected by any members other than the prism (1003, 1003A-1003J), before emerging from the second surface (1012, 1012A) out of the light guide member (1001). Thus, the shapes of the first surface (1011) and the second surface (1012, 1012A) do not contribute to guiding the light inside the light guide member (1001). Therefore, even if the luminous intensity distribution control member (1014, 1014A, 1014B) is provided for the light guide member (1001), the light guiding performance of the light guide member (1001) hardly deteriorates. Consequently, this allows the light traveling along the direct optical path (L10) to be extracted efficiently from the second surface (1012, 1012A) out of the light guide member (1001) while enabling the luminous intensity distribution to be controlled, thus contributing to increasing the light extraction efficiency.

In an optical system (1100, 1100A-1100C) according to a seventy-first aspect, which may be implemented in conjunction with the seventieth aspect, the luminous intensity distribution control member (1014, 1014A, 1014B) is provided for the second surface (1012, 1012A).

According to this aspect, the light transmitted through the second surface (1012, 1012A) may have its luminous intensity distribution efficiently controlled by the luminous intensity distribution control member (1014, 1014A, 1014B).

In an optical system (1100, 1100A-1100C) according to a seventy-second aspect, which may be implemented in conjunction with the seventieth or seventy-first aspect, the luminous intensity distribution control member (1014, 1014A, 1014B) includes a lens.

This aspect may eliminate the need to separately provide a lens sheet or other suitable optical members by imparting a lens function to the luminous intensity distribution control member (1014, 1014A, 1014B), thus cutting down the number of parts required.

In an optical system (1100, 1100A-1100C) according to a seventy-third aspect, which may be implemented in conjunction with the seventy-second aspect, the luminous intensity distribution control member (1014, 1014A, 1014B) includes a multi-lens configured as a group of multiple small lenses (1141).

This aspect may eliminate the need to separately provide a multi-lens sheet or other suitable optical members by imparting a multi-lens function to the luminous intensity distribution control member (1014, 1014A, 1014B), thus cutting down the number of parts required.

In an optical system (1100, 1100A-1100C) according to a seventy-fourth aspect, which may be implemented in conjunction with the seventy-second aspect, the luminous intensity distribution control member (1014, 1014A, 101 4B) includes a Fresnel lens.

This aspect may contribute to reducing the thickness of the luminous intensity distribution control member (1014, 1014A, 1014B).

In an optical system (1100, 1100A-1100C) according to a seventy-fifth aspect, which may be implemented in conjunction with any one of the seventieth to seventy-fourth aspects, a tilt angle ($\theta 1$, $\theta 11$, $\theta 12$) defined by a reflective surface (1030) of the prism (1003, 1003A-1003J) with respect to the first surface (1011) is smaller than a maximum angle in a situation where the light incident through the incident surface (1010) is totally reflected toward the second surface (1012, 1012A) along the direct optical path (L10).

This aspect reduces, even when the angle of incidence of the light on the reflective surface (1030) varies to some degree, the chances of the angle of incidence becoming smaller than a critical angle, thus allowing the incident light to be totally reflected from the reflective surface (1030) more easily.

In an optical system (1100, 1100A-1100C) according to a seventy-sixth aspect, which may be implemented in conjunction with the seventy-fifth aspect, a normal to the second surface (1012, 1012A) is tilted with respect to an optical axis of the light incident on the second surface (1012, 1012A) along the direct optical path (L10).

This aspect allows the direction of the light emerging from the second surface (1012, 1012A) to be adjusted.

In an optical system (1100, 1100A-1100C) according to a seventy-seventh aspect, which may be implemented in conjunction with any one of the seventieth to seventy-sixth aspects, the prism (1003, 1003A-1003J) includes a plurality of prisms (1003, 1003A-1003J) arranged side by side in a direction in which the light is incident on the incident surface (1010). The plurality of prisms (1003, 1003A-1003J) have the same shape.

According to this aspect, the plurality of prisms (1003, 1003A-1003J) have the same shape, thus facilitating extracting the light uniformly from the second surface (1012, 1012A).

In an optical system (1100, 1100A-1100C) according to a seventy-eighth aspect, which may be implemented in conjunction with any one of the seventieth to seventy-sixth aspects, the prism (1003, 1003A-1003J) includes a plurality of prisms (1003, 1003A-1003J) arranged side by side in a direction in which the light is incident on the incident surface (1010). The plurality of prisms (1003, 1003A-1003J) includes a first prism (1301) and a second prism (1302). The first prism (1301) and the second prism (1302) define mutually different tilt angles ($\theta 1$, $\theta 11$, $\theta 12$) with respect to a first surface (1011) of the reflective surface (1030). According to this aspect, the plurality of prisms (1003, 1003A-1003J) have mutually different shapes, thus facilitating making the luminous intensity distributions of the light extracted from the second surface (1012, 1012A) different from each other.

In an optical system (1100, 1100A-1100C) according to a seventy-ninth aspect, which may be implemented in conjunction with the seventy-eighth aspect, the first surface (1011) includes a first zone (Z1) in which a plurality of first prisms (1301) are arranged and a second zone (Z3) in which a plurality of second prisms (1302) are arranged.

This aspect facilitates making the luminous intensity distribution of the light extracted from the second surface (1012, 1012A) different between the first zone (Z1) and the second zone (Z3).

In an optical system (1100, 1100A-1100C) according to an eightieth aspect, which may be implemented in conjunction with the seventy-ninth aspect, the first surface (1011) further includes a hybrid zone (Z2) between the first zone (Z1) and the second zone (Z3). The hybrid zone (Z2) is a zone in which both the first prisms (1301) and the second prisms (1302) are present in mixture.

This aspect reduces the chances of the luminous intensity distribution of the light extracted from the second surface (1012, 1012A) changing steeply in the boundary between the first zone (Z1) and the second zone (Z3).

In an optical system (1100, 1100A-1100C) according to an eighty-first aspect, which may be implemented in conjunction with the eightieth aspect, the hybrid zone (Z2) includes a first hybrid zone (Z21) and a second hybrid zone (Z22). The first hybrid zone (Z21) is located closer to the first zone (Z1) with respect to a halfway line (C10) between the first zone (Z1) and the second zone (Z3). The second hybrid zone (Z22) is located closer to the second zone (Z3) with respect to the halfway line (C10). In the first hybrid zone (Z21), the first prisms (1301) are arranged more densely than in the second hybrid zone (Z22).

This aspect more significantly reduces the chances of the luminous intensity distribution of the light extracted from the second surface (1012, 1012A) changing steeply in the vicinity of the boundary between the first zone (Z1) and the second zone (Z3).

An illumination system (1200) according to an eighty-second aspect includes the optical system (1100, 1100A-1100C) according to any one of the seventieth to eighty-first aspects and a light source (1004). The light source (1004) emits light to be incident on the incident surface (1010).

This aspect achieves the advantage of contributing to increasing the light extraction efficiency.

A display system (1300) according to an eighty-third aspect includes the illumination system (1200) according to the eighty-second aspect and a display (1005). The display (1005) receives the light emerging from the illumination system (1200) and displays an image thereon.

This aspect achieves the advantage of contributing to increasing the light extraction efficiency.

A moving vehicle (B1) according to an eighty-fourth aspect includes the display system (1300) according to the eighty-third aspect and a moving vehicle body (B11) to be equipped with the display system (1300).

This aspect achieves the advantage of contributing to increasing the light extraction efficiency.

Note that the constituent elements according to the seventy-first to eighty-first aspects are not essential constituent elements for the optical system (1100, 1100A-1100C) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An optical system comprising:
a light guide member having: an incident surface on which light is incident; and a first surface and a second surface facing each other, the second surface being a light emergent surface;
a prism provided for the first surface and configured to reflect, toward the second surface, the light passing inside the light guide member; and
a light control member located between a light source and the incident surface and configured to control light that has been emitted from the light source and is going to be incident on the incident surface,
the light guide member including a direct optical path, along which the light that has entered the light guide member through the incident surface is directly reflected from the prism and allowed to emerge from the second surface,
at least one of the first surface or the second surface including a luminous intensity distribution control member configured to control a luminous intensity distribution of light to be extracted from the second surface,
the light control member having a shape transformation function of transforming a shape projected onto a projection plane, provided parallel to the incident surface, from a first shape of the light emitted from the light source into a second shape of the light that is going to be incident on the incident surface,
a circumcircle of the second shape being larger than a circumcircle of the first shape.

2. The optical system of claim 1, wherein
the direct optical path includes an optical path of light to be totally reflected from the prism.

3. The optical system of claim 1, wherein
the light control member is integrated with the light guide member.

4. The optical system of claim 1, wherein
the first surface and the second surface are tilted with respect to each other.

5. The optical system of claim 1, wherein
the light guide member further includes an indirect optical path, along which the light that has entered the light guide member through the incident surface is once reflected from the second surface, reflected again from the prism, and then allowed to emerge from the second surface.

6. The optical system of claim 1, wherein
the prism includes a plurality of prisms arranged side by side in a direction in which the light is incident on the incident surface.

7. The optical system of claim 1, wherein
the prism is tilted at least partially with respect to the incident surface when viewed in a direction in which the first surface and the second surface are arranged.

8. The optical system of claim 1, wherein
an optical axis of the light incident through the incident surface is tilted with respect to the first surface such that a gap distance between the optical axis and the first surface narrows as a distance from the incident surface increases.

9. The optical system of claim 1, wherein
the light control member has a function of substantially collimating the light emitted from the light source into parallel rays.

10. The optical system of claim 1, further comprising a plurality of light control members,
a plurality of light sources are arranged to be spaced from each other in a width direction of the light guide member,
each of the plurality of light control members is provided one to one for an associated one of the plurality of light sources,
the light beams emitted from the plurality of light sources are incident on the incident surface through the plurality of light control members.

11. The optical system of claim 1, wherein
the light control member is integrated with the light guide member, and
the light control member includes a path generating portion extending along a line tilted with respect to the first surface when viewed from the incident surface and configured to form a path for the light between the light source and the incident surface.

12. The optical system of claim 1, wherein
the luminous intensity distribution control member is provided for the second surface.

13. The optical system of claim 1, wherein
the second shape is formed by adding at least one corner portion to the first shape such that the first shape is made closer to a polygonal shape.

14. The optical system of claim 1, wherein
the light control member has a plurality of lens surfaces on a counter surface thereof facing the light source.

15. An illumination system comprising:
the optical system of claim 1; and
a light source configured to emit light toward the incident surface.

16. The optical system of claim 1, wherein
the prism includes a plurality of small prisms divided to be spaced apart from each other.

17. The optical system of claim 16, wherein
two or more of the plurality of small prisms are arranged side by side to draw a curve when viewed in a direction in which the first surface and the second surface are arranged.

18. A display system comprising:
the illumination system of claim 15; and
a display configured to receive the light emerging from the illumination system and display an image thereon.

19. A moving vehicle comprising:
a moving vehicle body; and
the display system of claim 18,
wherein the moving vehicle body is equipped with the display system.

20. The optical system of claim 1, wherein
the luminous intensity distribution control member includes a lens.

21. The optical system of claim 20, wherein
the luminous intensity distribution control member includes a multi-lens configured as a group of multiple small lenses.
22. The optical system of claim 20, wherein
the luminous intensity distribution control member includes a Fresnel lens.

\* \* \* \* \*